(12) United States Patent
Benedetto et al.

(10) Patent No.: US 11,439,917 B2
(45) Date of Patent: Sep. 13, 2022

(54) VOICE HELP SYSTEM USING ARTIFICIAL INTELLIGENCE

(71) Applicant: Sony Interactive Entertainment LLC, San Mateo, CA (US)

(72) Inventors: Warren Benedetto, Foothill Ranch, CA (US); Landon Noss, San Mateo, CA (US); Tom Srisook, Mission Viejo, CA (US); Andrew Herman, Lake Forest, CA (US); Chad Rolinski, Rancho Santa Margarita, CA (US); Parsa Shirazi, Long Beach, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/992,092

(22) Filed: May 29, 2018

(65) Prior Publication Data

US 2019/0291011 A1     Sep. 26, 2019

Related U.S. Application Data

(60) Provisional application No. 62/647,541, filed on Mar. 23, 2018.

(51) Int. Cl.
| | |
|---|---|
| *G06F 7/00* | (2006.01) |
| *G06F 16/00* | (2019.01) |
| *A63F 13/86* | (2014.01) |
| *A63F 13/87* | (2014.01) |
| *A63F 13/35* | (2014.01) |

(Continued)

(52) U.S. Cl.
CPC .............. *A63F 13/86* (2014.09); *A63F 13/30* (2014.09); *A63F 13/35* (2014.09); *A63F 13/79* (2014.09);

(Continued)

(58) Field of Classification Search
None
See application file for complete search history.

(56) References Cited

U.S. PATENT DOCUMENTS

| | | | |
|---|---|---|---|
| 2007/0087798 A1* | 4/2007 | McGucken | A63F 13/58 463/1 |
| 2008/0004117 A1* | 1/2008 | Stamper | A63F 13/30 463/42 |

(Continued)

FOREIGN PATENT DOCUMENTS

| | | |
|---|---|---|
| CN | 106075912 A | 11/2016 |
| WO | WO 2017071371 A1 | 5/2017 |

(Continued)

OTHER PUBLICATIONS

Kuhnen, Leila_PCT Notification of Transmittal of the International Search Report and the Written Opinion of the International Searching Authority, or the Declaration _ PCT/US2019/023352_dated Jul. 3, 2019 _ 14 pages.

(Continued)

*Primary Examiner* — Tuan A Pham
(74) *Attorney, Agent, or Firm* — Penilla IP, APC

(57) ABSTRACT

A method for gaming assistance. Information related to a plurality of game plays of players for a gaming application is received over a network at a back-end server. A query is received from a first player playing the gaming application, wherein the query is related to a first game play of the first player. A current game context of a first game play of a first player is determined from the information. A response to the query and the current game context is generated based on the information related to the plurality of game plays. The response is delivered back to a device of the first player.

22 Claims, 50 Drawing Sheets

(51) Int. Cl.
    *G06F 16/432*      (2019.01)
    *A63F 13/30*      (2014.01)
    *A63F 13/79*      (2014.01)
    *A63F 13/85*      (2014.01)
    *G06N 3/08*      (2006.01)
    *G10L 15/26*      (2006.01)
    *A63F 13/497*      (2014.01)
    *A63F 13/67*      (2014.01)

(52) U.S. Cl.
    CPC .............. *A63F 13/85* (2014.09); *A63F 13/87* (2014.09); *G06F 16/433* (2019.01); *G06N 3/08* (2013.01); *G10L 15/26* (2013.01); *A63F 13/497* (2014.09); *A63F 13/67* (2014.09); *A63F 2300/303* (2013.01)

(56) References Cited

U.S. PATENT DOCUMENTS

| | | | | |
|---|---|---|---|---|
| 2012/0142429 A1* | 6/2012 | Muller | ................... | A63F 13/35 463/42 |
| 2013/0035164 A1 | 2/2013 | Osvald et al. | | |
| 2013/0304758 A1* | 11/2013 | Gruber | ................ | G06F 16/9535 707/769 |
| 2014/0357352 A1* | 12/2014 | Van Luchene | .......... | A63F 13/55 463/29 |
| 2015/0067745 A1 | 3/2015 | Fear | | |
| 2016/0001181 A1* | 1/2016 | Marr | ................... | G07F 17/3272 463/42 |
| 2017/0282063 A1* | 10/2017 | Krishnamurthy | ....... | A63F 13/69 |
| 2017/0361233 A1* | 12/2017 | Stirling | ................. | A63F 13/213 |

FOREIGN PATENT DOCUMENTS

WO    WO 2017218305 A1    12/2017
WO    WO 2018004812 A1    1/2018

OTHER PUBLICATIONS

Intl Prelim Report PCT/US2019/023352, dated Sep. 29, 2020, 9 pages.

* cited by examiner

VOICE HELP SYSTEM USING ARTIFICIAL INTELLIGENCE

CLAIM OF PRIORITY

The present application claims priority to and the benefit of the commonly owned, provisional patent application, U.S. Ser. No. 62/647,541, entitled "CONNECTING A PLAYER TO EXPERT HELP IN REAL-TIME DURING GAME PLAY OF A GAMING APPLICATION," with filing date of Mar. 23, 2018, which is herein incorporated by reference in its entirety.

CROSS-REFERENCE TO RELATED APPLICATIONS

The present application is related to U.S. Ser. No. 15/476,597, entitled "GAME PLAY COMPANION APPLICATION," with filing date of Mar. 31, 2017, which is herein incorporated by reference in its entirety. The present application is related to U.S. Ser. No. 15/474,331, entitled "IN-GAME LOCATION BASED GAME PLAY COMPANION APPLICATION," with filing date of Mar. 30, 2017, which is herein incorporated by reference in its entirety.

TECHNICAL FIELD

The present disclosure is related to gaming applications. Among other things, this disclosure describes methods and systems for providing gaming assistance in response to a user's query relating to a gaming application.

BACKGROUND OF THE DISCLOSURE

With higher processing power video games are becoming more complex and expansive. However with the increased complexity, users may find it increasingly difficult to navigate through and/or complete the video game. For example, video games may become more expansive and include millions and even trillions of available options available to users. As such, a user could not possibly even try each of those available options, or even understand which of those options are available. In other cases, a user may reach a point in a video game that is seemingly impossible to navigate through or solve. For users, this occurs quite frequently where the user increasingly becomes frustrated with a game due to its difficulty or an inability to advance through the game and eventually ends up quitting the video game. For instance, in the game play of a video game the user may be trying to pass through an obvious gateway to reach another part of the gaming world in order to advance the game play. To illustrate, a user may need to go through a waterfall acting as the gateway, and has seemingly exhausted all available options in trying to pass. However, even though a solution is available and simple if known (e.g., pick up stabilizing rock and run through the waterfall), for whatever reason the user is unable to find the correct path or sequence of operations to gain entry. After hours of futility, the user may end up quitting the game because the user can find no way to advance.

It is in this context that embodiments of the disclosure arise.

SUMMARY

Embodiments of the present disclosure relate to providing gaming assistance in response to a player's query relating to a gaming application, wherein the response is provided to a device of a player that may or may not be displaying the game play of the user, wherein the response may provide assistance during game play of the user, and wherein the response may provide assistance independent of any game play of the user. Several inventive embodiments of the present disclosure are described below.

In one embodiment, a method for providing gaming assistance is disclosed. The method includes receiving over a network at a back-end server information related to a plurality of game plays of players for a gaming application. The method includes receiving a query from a first player playing the gaming application, the query being related to a first game play of the first player. The method includes determining from the information a current game context of the first game play. The method includes generating a response to query and the current game context based on the information related to the plurality of game plays. For example, the response may be generated by a deep learning engine configured to match the query to the response given the current game context. The method includes sending the response to a device of the first player.

In another embodiment, a non-transitory computer-readable medium storing a computer program for providing gaming assistance is disclosed. The computer-readable medium includes program instructions for receiving over a network at a back-end server information related to a plurality of game plays of players for a gaming application. The computer-readable medium includes program instructions for receiving a query from a first player playing the gaming application, the query being related to a first game play of the first player. The computer-readable medium includes program instructions for determining from the information a current game context of the first game play. The computer-readable medium includes program instructions for generating a response to query and the current game context based on the information related to the plurality of game plays. For example, the response may be generated by a deep learning engine configured to match the query to the response given the current game context. The computer-readable medium includes program instructions for sending the response to a device of the first player.

In still another embodiment, a computer system is disclosed having a processor and memory coupled to the processor, the memory having stored therein instructions that, if executed by the computer system, cause the computer system to execute a method for providing gaming assistance. The method includes receiving over a network at a back-end server information related to a plurality of game plays of players for a gaming application. The method includes receiving a query from a first player playing the gaming application, the query being related to a first game play of the first player. The method includes determining from the information a current game context of the first game play. The method includes generating a response to query and the current game context based on the information related to the plurality of game plays. For example, the response may be generated by a deep learning engine configured to match the query to the response given the current game context. The method includes sending the response to a device of the first player.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
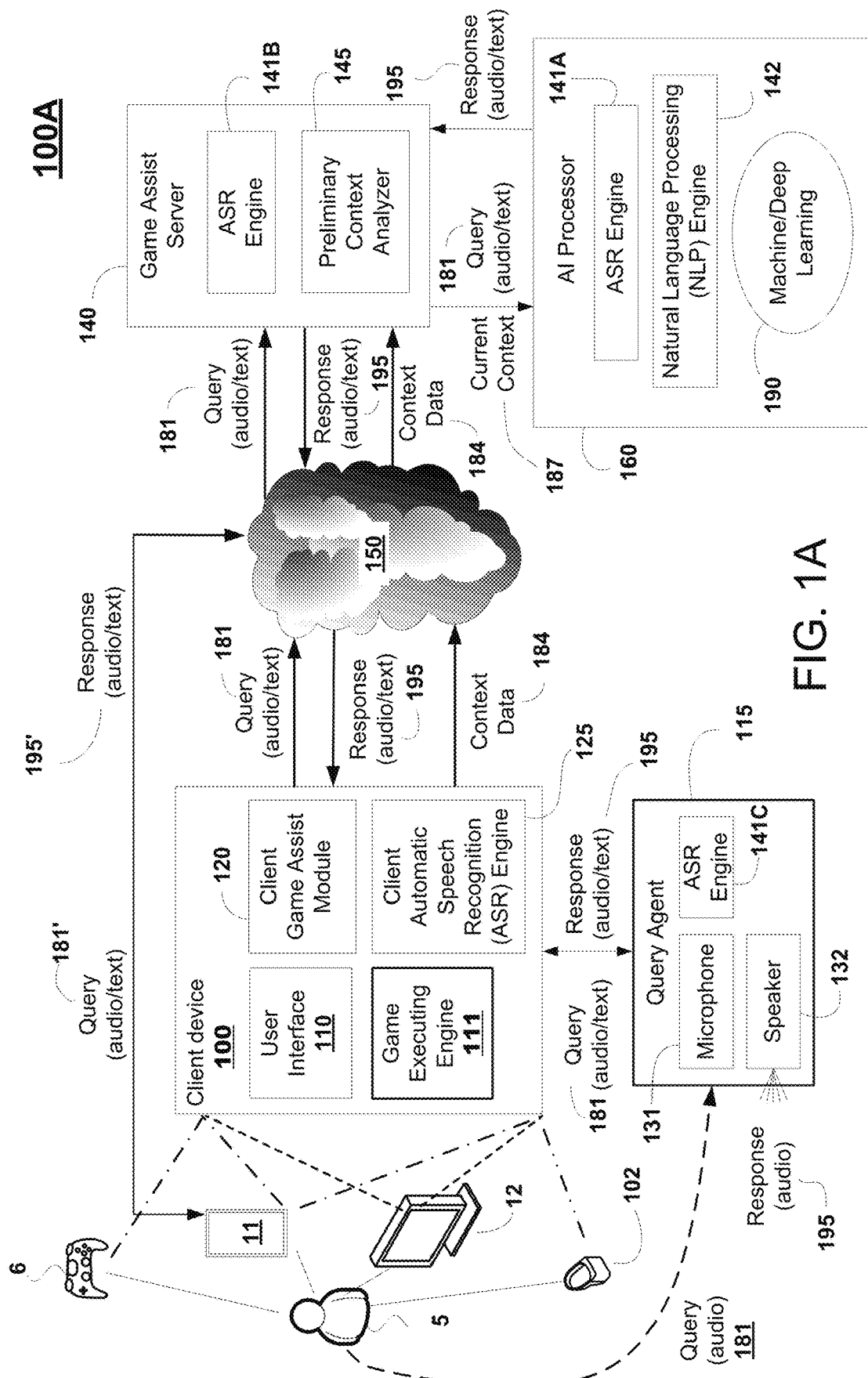
FIG. 1A illustrates a system providing gaming assistance during game play of a player playing a gaming application, wherein the gaming application can be executing on a local computing device or over a cloud game network, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing gaming assistance during or independent of game play of a gaming application by the player. For example, when a player gets stuck on a part of a gaming application, the player can request help through a query to a back-end game assist server. The query may be of any format, or a combination of formats, including audio, text, video, etc. The game assist server is configured to match the query to modeled responses based on a current game context from which the query was presented. The matching is performed by a deep learning engine, for example, performed by the game assist server or by a third party providing artificial intelligence (AI) to include deep learning. The response may be presented to the user in any format, or a combination of formats, including audio, text, video, etc. In this manner, the gaming experience of the player is improved. During game play of a gaming application, the player may generate a query at any time for any reason. The player may want to gain more information about some aspect of the gaming application, such as character information, strategy information, overall popularity of the gaming application, scheduling a time to play with friends in a multi-player format through a cloud gaming service, gaining information about social network friends who are playing the same gaming application or another gaming application (e.g., discover what gaming application a friend is playing, obtaining information about that gaming application, obtaining purchasing information about that gaming application, etc.), obtaining information about how to overcome some obstacle preventing the player from advancing in the gaming application, etc. As a result, the player has a more immersive experience with the gaming application, such that rather than just playing the gaming application out-of-the-box, so to speak, the player can enhance his or her game play with information that is presented (e.g., audio, text, video, etc.) simultaneously with the game play, and/or a running conversation with an automated gaming assistant (e.g., gaming butler/navigator) during the game play that is configured to provide psychological and informational support to the player. In addition, the role of the gaming console is expanded with regards to providing a fuller and richer set of information from which to build models of information for purposes of responding to queries. That is, low level operating system (OS) information can be delivered from the gaming console during game play of the player for purposes of determining contextual information about the gaming application and/or the player. That is, not only is information about the game play being used, but information related to the play is also being used to fill out the contextual information for purposes of responding to one or more queries. OS level information may include button sequences, speed of button actuation, speed of play, when the player is playing, how long the player is playing, which games the player is playing, etc. Also, the gaming console is able to distribute the gaming assist functionality to one or more devices. For instance, response modeling and query to response matching is performed by a back-end gaming assist server instead of the gaming console. In addition, the gaming console is able to distribute the response delivered by the gaming assist server to one or more other devices for presenting to the player. For example, the response may be provided on a display simultaneously with a current game play, or the response may be provided to a companion device (e.g., mobile phone) that acts in concert with a display that presents the game play, or through a separate set of speakers (e.g., stand-alone, situated on a gaming controller, etc.) that is dedicated to providing the response independent of the audio of the game play. In that manner, there is minimal interference with the game play of the gaming application, as there is no mixing of audio, no or minimal mixing of video, etc.

With the above general understanding of the various embodiments, example details of the embodiments will now be described with reference to the various drawings.

Throughout the specification, the reference to "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

FIG. 1A illustrates a system 100A providing gaming assistance during game play of a player 5 playing a gaming application, wherein the gaming application can be executing on a local computing device 100 or over a cloud game network (not shown for purposes of clarity), in accordance with one embodiment of the present disclosure. The gaming assistance may be provided in conjunction with the game play, such as when player 5 is requesting information about an object in the gaming application, or requesting assistance in overcoming an obstacle in the gaming application. In other embodiments, the gaming assistance may be provided independent of the game play, such as when the player is in an environment that does not involve any game play (e.g., at work, riding in a taxi, riding public transportation, etc.) but is interested in making queries about a gaming application, or generally about a gaming environment.

In particular, as is shown in FIG. 1A, the gaming application may be executing locally at a client device 100 of the player 5, or may be executing at a back-end game executing engine operating at a back-end game server (not shown) of a cloud game network or game cloud system.

In addition, the client device 100 acts as a front end for a game assist server 140 at the back-end of system 100A. In particular, client device 100 includes a client game assist module 120 that is configured to receive queries from player 5 and to deliver responses to those queries back to player 5 with the cooperation of the back-end game assist server 140, as will be described below. The user interface 110 at client device 100 supports the client game assist module 120 by receiving queries (e.g., text) and presenting responses (e.g., audio, video, etc.)

Also, game assist module 120 works in cooperation with the client automatic speech recognition (ASR) engine 125 to optionally translate queries from a first format to a second format. For example, a query may come in the form of audio from the player 5, and the ASR engine 125 is configured to translate the audio query to a text format that is more suitable for a downstream device to handle (e.g., analyze, transport, etc.). The ASR engine 125 may also be configured to transform text to audio, such that a response received in text is broadcast in audio.

Client device 100 is configured for requesting access to a gaming application over a network 150, such as the internet, and for rendering instances of video games or gaming applications executed by the game executing engine 111 or a back-end game server 205 (see FIG. 2) and delivering the rendered instances (e.g., audio and video) to the display device 12 and/or head mounted display (HMD) 102 associated with a player 5. For example, player 5 may be interacting through client device 100 with an instance of a gaming application executing on cloud gaming game processor 201. As shown, game executing engine 111 is configured for local execution of the gaming application, as previously described. The client device 100 may receive input from various types of input devices, such as game controllers 6, tablet computers 11, keyboards, and gestures captured by video cameras, mice, touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a video game. In embodiments, the HMD 102 can be configured to perform the functions of the client device 100.

Client device 100 may interact with a local query agent 115 that acts as an interface with player 5. For example, query agent 115 includes a microphone 131 that is configured for receiving and/or recording audio from the player 5. In that manner, a verbal query 181 presented by player 5 can be entered into the system 100A through the query agent 115. In one embodiment, the query agent 115 passes the query 182 to the client game assist module 120 of the client device 100 in the same format without any transformation. In another embodiment, client device 100 also includes an ASR engine 141C to transform the query from a first format to a second format (e.g., audio to text, text to audio, etc.), and then deliver the query 182 in the second format to the client game assist module 120.

In other embodiments, the query 181 may be presented through another communication path. For example, the query may be in the form of a text or video, and received through mobile device 11 or display 12 (e.g., through a keyboard, etc.), or through an interface of the HMD 102. The query 181 may be delivered to client device directly (e.g., from mobile device 11), or through the user interface 110. In another embodiment, the query 181' is delivered from mobile device 11 (or another type of device) directly to the game assist server 140 through network 150. Similarly, the response 195' is delivered back directly to the mobile device or any other device.

The query 181 of a particular format (e.g., first or second, text or audio, format) is delivered from the client game assist module 120 through network 150 to the back-end game assist server 140 that is configured for providing gaming assistance to player 5 in response to a query. The game assist server 140 includes an ASR engine 141B that is optionally configured to transform the query 181 from one format to another format. For example, the ASR engine 141B may transform the query from audio to text (e.g., perform speech recognition using a deep learning engine), or the reverse. It is important to note that the transformation may occur at any point along the path taken by the query 181 of the player 5, including at the game assist server 140, or downstream from the game assist server 140. In some embodiments, because the ASR engine may require a significant amount of resources (e.g., including a deep learning engine), the ASR engine may be located at the game assist server 140 or at another third party server that performs ASR.

In addition, the game assist server 140 includes a preliminary context analyzer 145 that is configured to provide at least gaming context in association with the query 181. Context data 184, including game context data (including low-level OS context data) and global context data (e.g., user profile related information), is delivered from the client device 100 (e.g., in part generated by game executing engine 111) to the game assist server 140. The preliminary context analyzer 145 may determine current context 187 (e.g., current gaming context) that is associated with the query 181. For example, the preliminary context analyzer 145 may determine that the query 181 is presented in association with a first gaming application. Additional context may be determined, such as what scene or level is the player engaged with in the game play. In that manner, the query is given some context from which a response may be matched or generated. For example, the first gaming application and a second gaming application may generally have the same obstacle (e.g., scaling a wall of a mountain), and a generic query (how do I scale this wall) without additional context could return a response that is incorrect as being for the wrong gaming application. However, the query along with the proper current context 187 would return an appropriate response.

In one embodiment, the response 195 is generated by a third party artificial intelligence (AI) processor 160 that includes an ASR engine 141A, a natural language processing (NLP) engine 142, and a machine or deep learning engine 190. In particular, the query 181 and the current context 187 are delivered from the game assist server 140 to the AI processor 160. If the query 181 has not been transformed into the proper format suitable for processing by the AI processor 141A, then ASR engine 141A is enabled to perform the proper transformation (e.g., audio/speech to text, etc.), such as using speech recognition techniques. In another embodiment, the response 195 is generated by the game assist server 140, which also includes an NLP engine and a deep learning engine.

In addition, once the query 181 has been transformed to the proper format (e.g., text), then the NLP engine 142 is configured to interpret the nature of the query, or understand what is requested by player 5 (e.g., the content of the query). For example, NLP engine may analyze the query in text form using a deep learning engine to determine the meaning of the query. In that manner, a suitable response for the interpreted query can be matched or generated by the AI processor 160 for the given current context 187, as will be described below.

In particular, based on the context information collected from the player 5, as well as other players playing the gaming application, player 5 may be presented with a pregenerated response 195 that responds directly to the query 181 for the given current context 187. The pregenerated response 195 may be a modeled response for this particular query 181, or for similar queries, as learned by a deep learning engine 190. As such, the deep learning engine 190 is configured for matching the query 181 to the appropriate modeled response 195. In particular, the deep learning engine 190 is configured to match the interpreted query to models of responses or queries/responses in order to provide a response to the query. In one embodiment, when no response (e.g., text, audio, video, etc.) is matched to the query, then a new response may be generated based on one or more closest matched models.

As such, the deep learning engine 190 returns the response 195 back to the game assist server 140. The response 195 may be of a suitable format. For example, the response 195 may be of a first format, such as text. At some point during the delivery back to the player 5, the response 195 may be transformed to a suitable format for the player 5. In one implementation, the response 195 is transformed from text to audio at some point (e.g., at the ASR engine 141A of the AI processor 141A, at the ASR engine 141B of the game assist server 140, at the ASR engine 125 of the client device 100, or ASR engine 141C of the local query agent 115). In that manner, the speaker 132 at the local query agent is able to broadcast the response 195 to the player 5. In another implementation, the response 195 is passed through in text form back to the client device 100 and passed on to an appropriate device interfacing with the player 5, such as display 12, mobile device 11, HMD 102, etc. Still other embodiments are supported, such as presenting the response via a display, or through another appropriate device, in video.

Figure 1B:
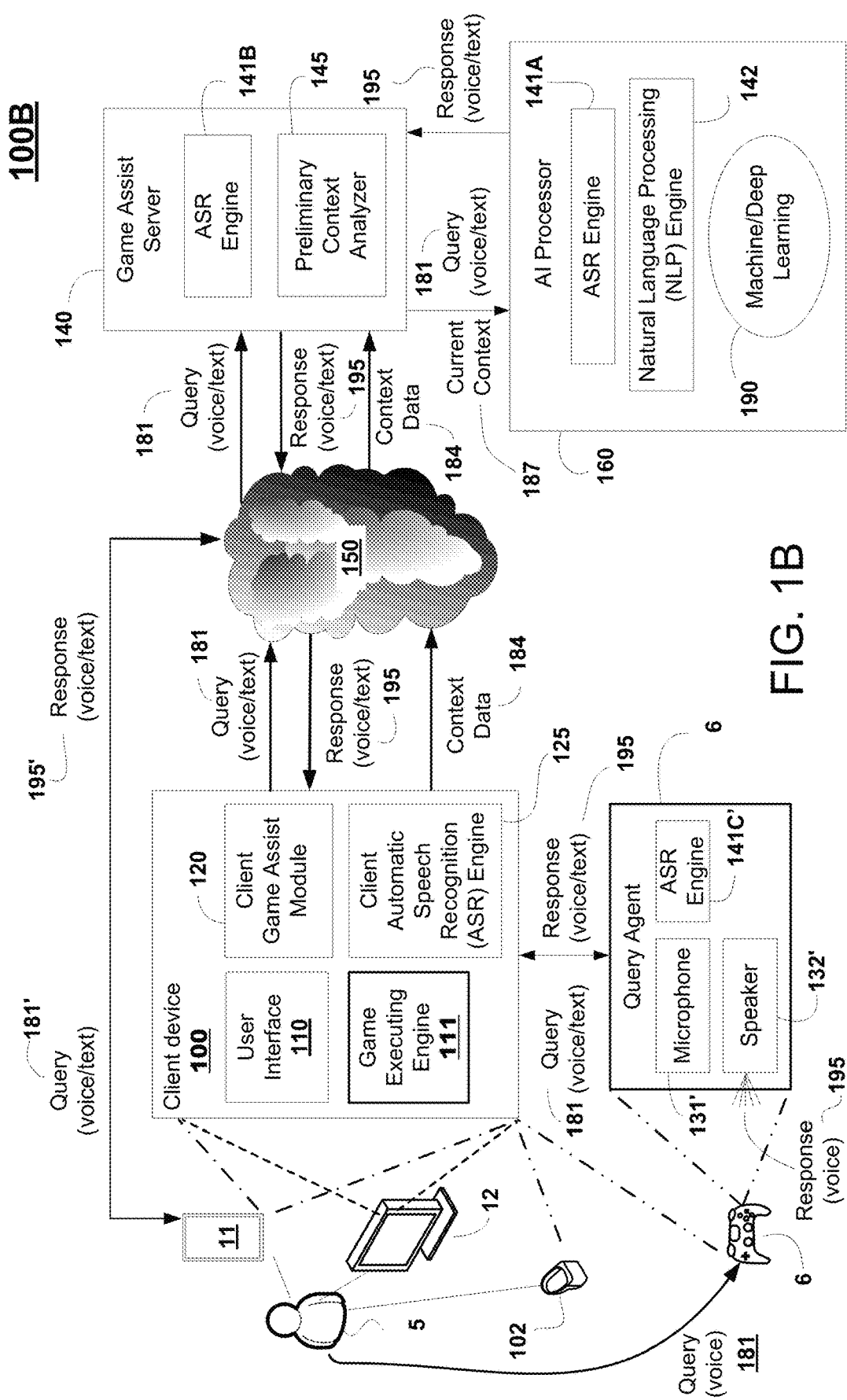
FIG. 1B illustrates a system providing gaming assistance in response to a user asking a verbal query as received by a gaming controller during game play of a player playing a gaming application, wherein the gaming application can be executing on a local computing device or over a cloud game network, in accordance with one embodiment of the present disclosure.

FIG. 1B illustrates a system 100B providing gaming assistance in response to a user asking a verbal query as received by a gaming controller during game play of a player playing a gaming application, wherein the gaming application can be executing on a local computing device or over a cloud game network, in accordance with one embodiment of the present disclosure. The functionality of system 100B is the same as that performed by system 100A of FIG. 1A, except that the controller 6 is configured as the local query agent. In particular, client device 100 may interact with controller 6 that acts as an interface with player 5. For example, controller 6 includes a microphone 131' that is configured for receiving and/or recording audio from the player 5 (e.g., to receive query 181). Controller 5 may include an ASR engine 141C' configured to optionally transform the query from a first format to a second format (e.g., audio to text, text to audio, etc.). In addition, the controller 6 includes a speaker 132' that is configured to broadcast the response 195 for the benefit of the player 5.

Figure 1C:
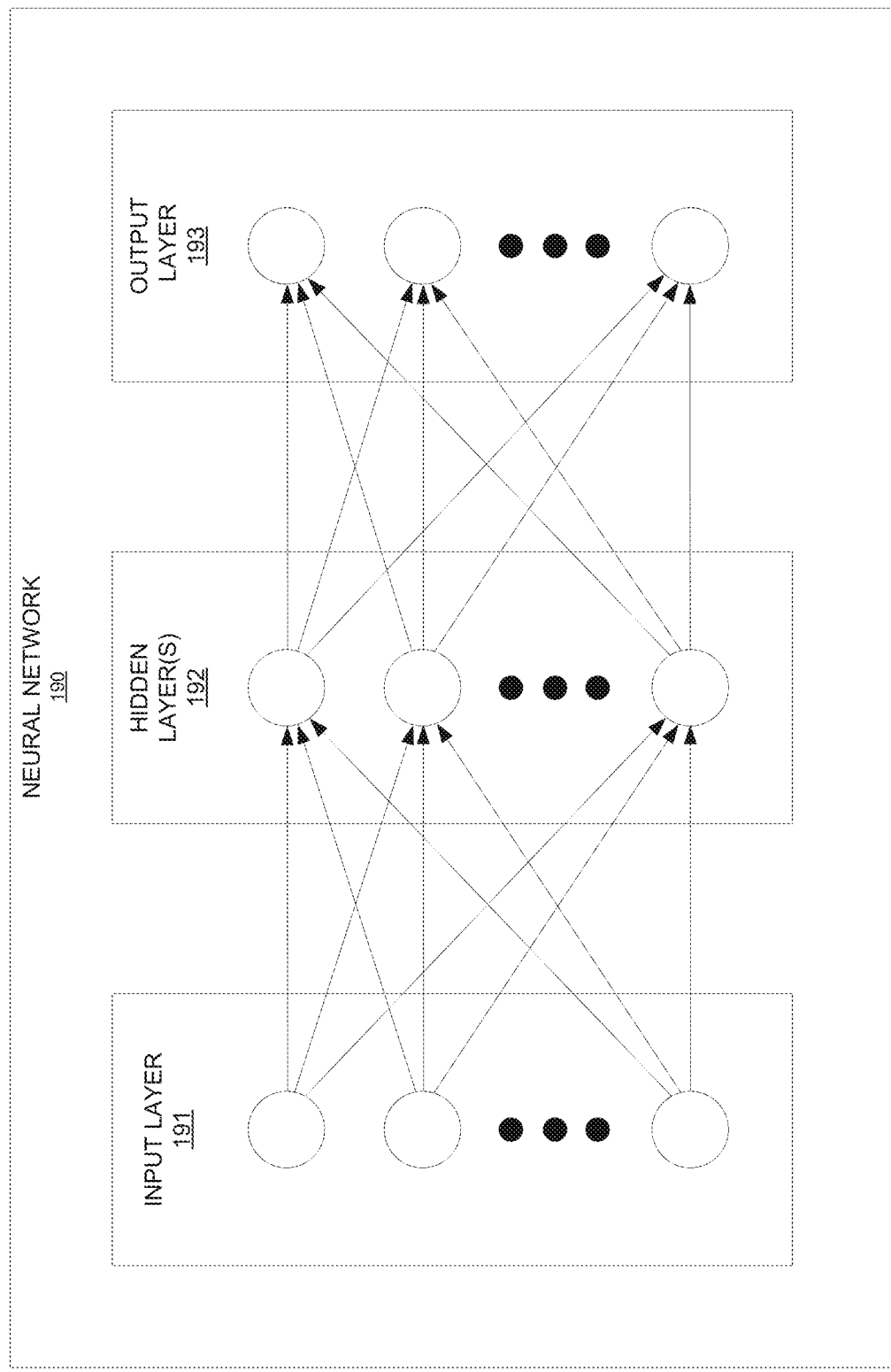
FIG. 1C illustrates an example neural network used for building models of saccade movement for one or more users viewing VR scenes in an HMD, in accordance with one embodiment of the present disclosure.

FIG. 1C illustrates an example neural network used to build response models and/or query/response models based on contextual information of a gaming application and the corresponding queries, in accordance with one embodiment of the present disclosure. Specifically, the deep learning or machine learning engine 190 in the AI processor 160 is configured as input to receive information related to context data, queries, and base responses, for example. The deep learning engine 190 utilizes artificial intelligence, including deep learning algorithms, reinforcement learning, or other artificial intelligence-based algorithms to build the response and/or query/response models. That is, during learning and/or modeling phases, input data is used by the deep learning engine 190 to create response and/or query/response models that can be used to respond to one or more queries. In some embodiments, the deep learning engine 190 is also configured for ASR and NLP processing.

In particular, neural network 190 represents an example of an automated analysis tool for analyzing data sets to determine the responses, actions, behavior, wants and/or needs of a corresponding user. Different types of neural networks 190 are possible. In an example, the neural network 190 supports deep learning. Accordingly, a deep neural network, a convolutional deep neural network, and/or a recurrent neural network using supervised or unsupervised training can be implemented. In another example, the neural network 190 includes a deep learning network that supports reinforcement learning. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to local data 115 collected actively through actuators or passively by sensors during monitoring of a test user/subject (e.g., eye orientation data) that is undergoing a corresponding saccade.

At the highest hierarchical level, an output layer 193 exists. The output layer 193 includes a set of output nodes. An output node represents a decision (e.g., prediction) that relates to information of a response (e.g., for a given context, etc.). As such, the output nodes may match a query to a particular response given a corresponding context.

These results can be compared to predetermined and true results obtained from previous interactions and monitoring of test subjects in order to refine and/or modify the parameters used by the deep learning engine 190 to iteratively determine the appropriate response and/or query/response models. That is, the nodes in the neural network 190 learn the parameters of the models that can be used to make such decisions when refining the parameters. In that manner, a given query may be associated with ever refined modeled responses, and possibly to a new modeled response.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a linear rectifier function $f(x) = \max(0,x)$.

The neural network 190 also uses a cost function c to find an optimal solution. The cost function measures the deviation between the prediction that is output by the neural network 190 defined as $f(x)$, for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the patterns and/or characteristics of similar queries based on a given set of inputs or input data. For example, the data domain includes queries related to a specific scene in a gaming application for a given gaming context. In another example, the training dataset is from different data domains to include input data other than a baseline. As such, the neural network 190 may recognize a query using other data domains, or may be configured to generate a response model for a given query based on those data domains.

Figure 2A:
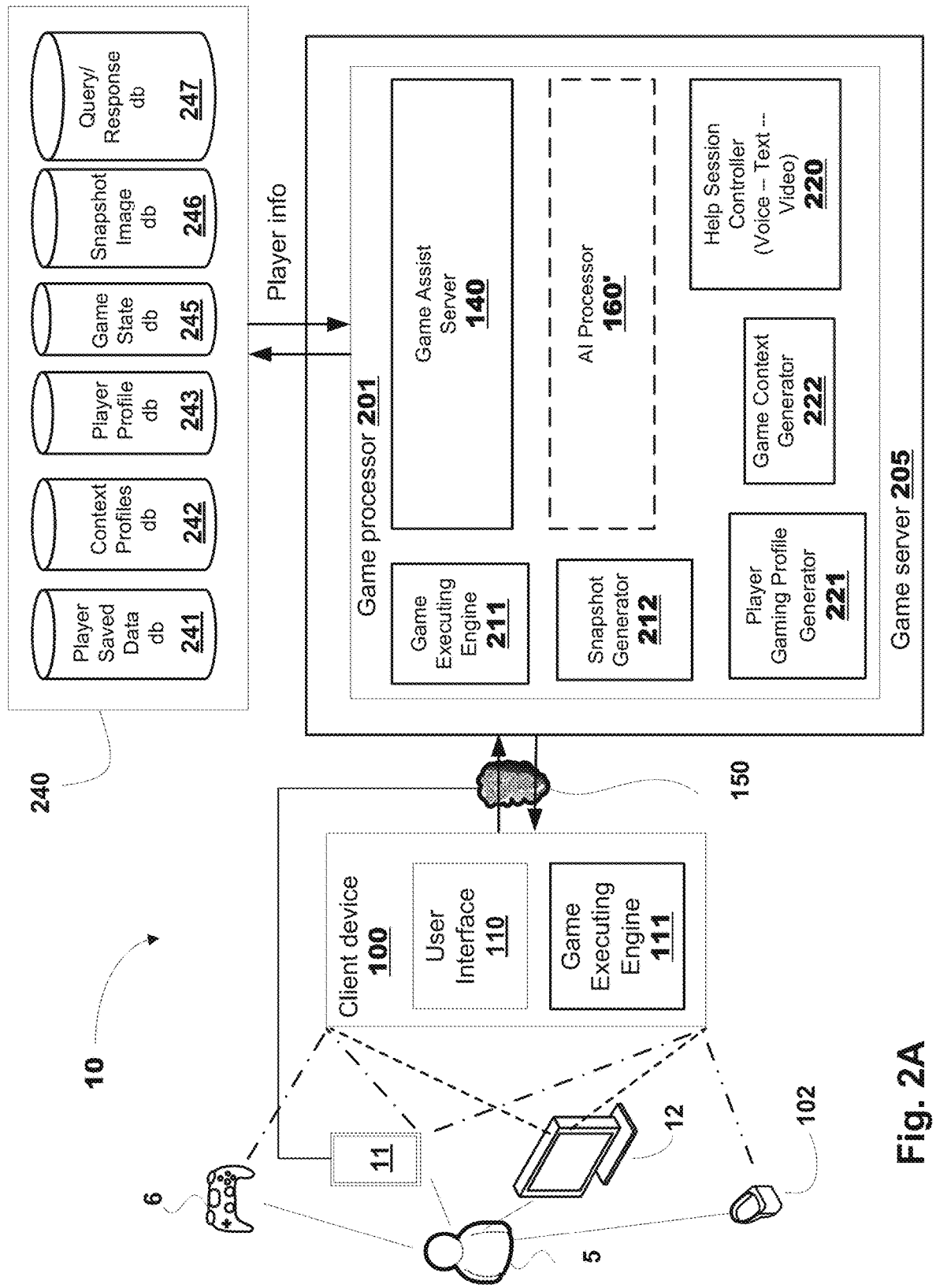
FIG. 2A illustrates a system providing gaming assistance during game play of a player playing a gaming application, in accordance with one embodiment of the present disclosure.

FIG. 2A illustrates a system 10 providing gaming assistance during game play of a player playing a gaming application, in accordance with one embodiment of the present disclosure. For example, the assistance may be provided through a user interface configured to support the game play (e.g., through a companion device—mobile phone—or a speaker, controller speaker, etc.). The gaming application can be executing on a local computing device or over a cloud game network, in accordance with one embodiment of the present disclosure.

As shown in FIG. 2A, the gaming application may be executing locally at a client device 100 of the player 5, or may be executing at a back-end game executing engine 211 operating at a back-end game server 205 of a cloud game network or game cloud system. The game executing engine 211 may be operating within one of many game processors 201 of game server 205. In either case, the cloud game network is configured to provide gaming assistance to player by providing responses to queries. For example, the game server 205 and/or the game processor 201 may include a game assist server 140 configured for providing gaming assistance to the player 5, and may include an AI processor 160', as previously described. In some embodiments, AI is performed by a third party (e.g., AI processor 160 of FIGS. 1A-1B.

In one implementation, the user interface 110 at client device 100 may support the provision of gaming assistance, such that the player is able to present a query through the user interface 110, and interact with (e.g., view, hear, present, etc.) the response provided in the user interface 110. In other embodiments, the user interface is provided in a different device, such as a mobile device (e.g., phone), or a speaker, as previously described. Further, the gaming application may be executing in a single-player mode, or multi-player mode, wherein embodiments of the present invention provide for multi-player enhancements (e.g., assistance, communication, etc.) to both modes of operation.

In some embodiments, the cloud game network may include a plurality of virtual machines (VMs) running on a hypervisor of a host machine, with one or more virtual machines configured to execute a game processor module 201 utilizing the hardware resources available to the hypervisor of the host in support of single player or multi-player video games. In other embodiments, the cloud game network is configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment.

As shown, system 10 includes a game server 205 executing the game processor module 201 that provides access to a plurality of interactive gaming applications. Game server 205 may be any type of server computing device available in the cloud, and may be configured as one or more virtual machines executing on one or more hosts, as previously described. For example, game server 205 may manage a virtual machine supporting the game processor 201. Game server 205 is also configured to provide additional services and/or content to user 5. For example, game server 205 is configurable to provide gaming assistance to a player 5 that is either playing a corresponding gaming application, or is not currently playing but is interested in information related to the gaming application. The assistance may be in the form of a response to a query. In some embodiments, if no response is matched to a given query, the game server is configurable to connect a player playing a gaming application to an expert over a communication session to provide real-time assistance, wherein the game server is configured to receive a request for assistance, match the player with an appropriate expert, and establish the help session that connect the player to the expert in real-time during the game play of the player, such as through the help session controller 220).

Client device 100 is configured for requesting access to a gaming application over a network 150, such as the internet, and for rendering instances of video games or gaming applications executed by the game server 205 and delivered to the display device 12 and/or head mounted display (HMD) 102 associated with a user 5. For example, user 5 may be interacting through client device 100 with an instance of a gaming application executing on game processor 201. Client device 100 may also include a game executing engine 111 configured for local execution of the gaming application, as previously described. The client device 100 may receive input from various types of input devices, such as game controllers 6, tablet computers 11, keyboards, and gestures captured by video cameras, mice, touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a video game. In embodiments, the HMD 102 can be configured to perform the functions of the client device 100.

Client device 100 is configured for receiving rendered images, and for displaying the rendered images on display 12 and/or HMD 102. For example, over a network 150 the rendered images may be delivered by an instance of a gaming application executing on game executing engine 211 of game server 205 in association with user 5. In another example, through local game processing, the rendered images may be delivered by the local game executing engine 111. In either case, client device 100 is configured to interact with the executing engine 211 or 111 in association with the game play of user 5, such as through input commands that are used to drive game play.

Further, client device 100 is configured to interact with the game server 205 to capture and store one or more game contexts (e.g., low level OS contexts) of the game play of user 5 when playing a gaming application, and global context information. Each game context includes information (e.g., game state, user information, etc.) related to the game play, and may include low level OS information related to hardware operations (e.g., buttons actuated, speed of actuation, time of game play, etc.). More particularly, game processor 201 of game server 205 is configured to generate and/or receive game and/or OS level context of the game play of user 5 when playing the gaming application. In addition, global context data is also collected, and related generally to user profile data (e.g., how long the player plays a gaming application, when the last time the player played a gaming application, how often the player requests assistance, how skilled the player is compared to other players, etc.). In another implementation, game contexts including OS level contexts and global contexts may be generated by the local game execution engine 111 on client device 100, outputted and delivered over network 150 to game processor 201. In addition, game contexts including OS level contexts and global contexts may be generated by game executing engine 211 within the game processor 201 at the cloud network, such as through the game context generator 222. Game contexts including OS level contexts and global contexts may be locally stored on client device 100 and/or stored at the context profiles database 242 of the game server 205.

In particular, each game context includes metadata and/or information related to the game play. Game contexts may be captured at various points in the progression of playing the gaming application, such as in the middle of a level. For illustration, game contexts may help determine where the player (e.g., character of the player) has been within the gaming application, where the player is in the gaming application, what the player has done, what assets and skills the player or the character has accumulated, what quests or tasks are presented to the player, and where the player will be going within the gaming application. Further, the metadata and information in each game context may provide and/or be analyzed to provide support related to the game play of the player, such as when matching a query to a response, wherein the game play has a particular context related to the query, and the matched response is best suited to answering the query, as determined through deep learning. Specifically, based on the game contexts, client device 100 is configured to interact with game server 205 to display a user interface that is able to display responses in association with queries to provide gaming assistance during game play of the player, or independent from any game play. In some embodiments, the response is provided through a separate device (e.g., speaker).

More particularly, game context also includes game state data that defines the state of the game at that point. For example, game state data may include game characters, game objects, game object attributes, game attributes, game object state, graphic overlays, location of a character within a gaming world of the game play of the player 5, the scene or gaming environment of the game play, the level of the gaming application, the assets of the character (e.g., weapons, tools, bombs, etc.), the type or race of the character (e.g., wizard, soldier, etc.), the current quest and/or task presented to the player, loadout, skills set of the character, game level, character attributes, character location, number of lives left, the total possible number of lives available, armor, trophy, time counter values, and other asset information, etc. In that manner, game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may include low level OS data, such as buttons actuated, speed of actuation, which gaming application was played, and other hardware related data. The game state data is stored in game state database 245.

Also, game context may include user and/or player information related to the player. Generally, user/player saved data includes information that personalizes the video game for the corresponding player. This includes information associated with the player's character, so that the video game is rendered with a character that may be unique to that player (e.g., shape, race, look, clothing, weaponry, etc.). In that manner, the user/player saved data enables generation of a character for the game play of a corresponding player, wherein the character has a state that corresponds to the point in the gaming application associated with the game context.

In one implementation, the game context is related to snapshot information that provides information enabling execution of an instance of the video game beginning from a point in the video game associated with a corresponding snapshot. Access to a particular snapshot that is captured during game play of a player, and that is stored allows another instance of the gaming application to be executed using information in the snapshot, such as game state and possibly user information relating to the previously described game context. For example, another user is able to jump into a parallel version of the game play associated with the snapshot. A full discussion on the creation and use of snapshots is provided within U.S. application Ser. No. 15/411,421, entitled "Method And System For Saving A Snapshot of Game Play And Used To Begin Later Execution Of The Game Play By Any User As Executed On A Game Cloud System," which is incorporated by reference in its entirety.

In one embodiment, the snapshot includes a snapshot image of the scene that is rendered at that point. The snapshot image is stored in snapshot image database 246. The snapshot image may be presented in the form of a thumbnail with respect to a timeline, wherein the snapshots provide various views into the game play of a user at corresponding points in the progression by the user through a video game as indicated by the timeline. Snapshot generator 212 may be configured to generate snapshot during a game play.

In still other embodiments, context data includes global context data. For example, global context data may include the skill or ability of the player, the overall readiness that the player seeks help, recency of playing the gaming application by the player, game difficulty selected by the user 5 when playing the game, etc. User/player saved data may also include user profile data that identifies player 5, for example. User/player saved data is stored in database 241 or player profile database 243.

In addition, a player profile that includes information related to the corresponding player may be generated and stored in profile database 243. Profile information may include name, age, residence, account information, user related information from game context (e.g., user saved data stored in database 241), etc. The player/expert gaming profile generator 221 is configured to create and manage the player profile.

As previously introduced, the game processor 201 may include a game assist server 140 configured for providing gaming assistance to the player. In particular, the game assist server 140 receives a query, optionally transforms the query to an appropriate format, and sends the query to an AI engine (e.g., including an ASR engine, NLP engine, and a deep learning engine) to match the query to an appropriate modeled response. For example, when a player requests help in getting past an obstacle (e.g., scaling a wall), the game assist server 140 either handles the query within its system (e.g., locally through a local AI processor 160'), or sends the query to a third-party AI processor 160 for handling, as previously described. Once the modeled response is matched, that response is returned back to the client device 100 for further distribution, for example to a display or a speaker, etc. In some embodiments, the gaming assistance may be delivered to a device 11 (e.g., tablet) for display and interaction, wherein device 11 (e.g., companion device) may be separate from client device 100 that is configured to execute and/or support execution of the gaming application for user 5 interaction. For instance, a first communication channel may be established between the game server 205 and client device 100, and a separate, second communication channel may be established between game server 205 and device 11 to deliver the gaming assistance. Modeled responses and/or modeled queries/responses may be stored in database 247, as they are generated through deep learning.

Figure 2B:
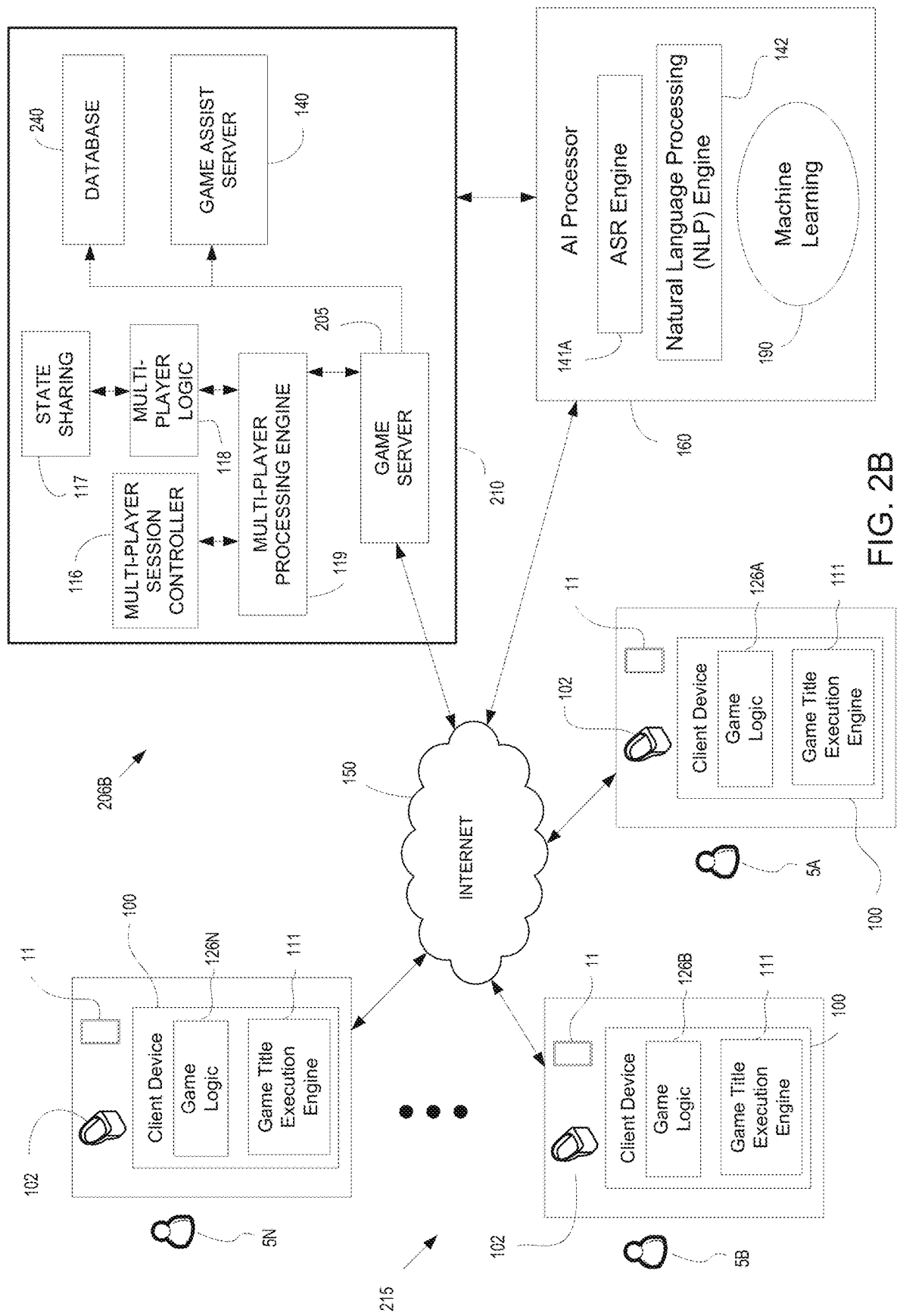
FIG. 2B illustrates a system providing gaming assistance during game play of a player playing a gaming application that is executing locally to the player, in accordance with one embodiment of the present disclosure.

FIG. 2B illustrates a system 206B providing gaming assistance to a player during game play or outside of the game play of a player playing a gaming application using a game assist server 140 at a back-end server configured for matching queries (e.g., text, audio, video, etc.) of the player to an appropriate response (e.g., text, audio, video, etc.). As shown in FIG. 2B, the gaming application is executing locally to the corresponding player, and wherein back-end server support (e.g., accessible through game server 205) may implement the establishing and managing of a help session. In one embodiment, system 206B works in conjunction with system 10 of FIG. 2A to provide gaming assistance to a player by providing responses to queries at the game-cloud system 210, as previously described. Referring now to the drawings, like referenced numerals designate identical or corresponding parts.

As shown in FIG. 2B, a plurality of players 215 (e.g., player 5A, player 5B . . . player 5N) is playing a plurality of gaming applications, wherein each of the gaming applications is executed locally on a corresponding client device 100 (e.g., game console) of a corresponding user. The system 206B supports game play by the plurality of players 215 at one or more moments in time, such as over a period of time. In addition, each of the plurality of players 215 has access to a device 11 or other device (e.g., speaker), previously introduced, configured to receive information providing gaming assistance, as previously described. Each of the client devices 100 may be configured similarly in that local execution of a corresponding gaming application is performed. For example, player 5A may be playing a first gaming application on a corresponding client device 100, wherein an instance of the first gaming application is executed by a corresponding game title execution engine 111. Game logic 126A (e.g., executable code) implementing the first gaming application is stored on the corresponding client device 100, and is used to execute the first gaming application. For purposes of illustration, game logic may be delivered to the corresponding client device 100 through a portable medium (e.g., flash drive, compact disk, etc.) or through a network (e.g., downloaded through the internet 150 from a gaming provider). In addition, player 5B is playing a second gaming application on a corresponding client device 100, wherein an instance of the second gaming application is executed by a corresponding game title execution engine 111. The second gaming application may be identical to the first gaming application executing for player 5A or a different gaming application. Game logic 126B (e.g., executable code) implementing the second gaming application is stored on the corresponding client device 100 as previously described, and is used to execute the second gaming application. Further, player 115N is playing an Nth gaming application on a corresponding client device 100, wherein an instance of the Nth gaming application is executed by a corresponding game title execution engine 111. The Nth gaming application may be identical to the first or second gaming application, or may be a completely different gaming application. Game logic 126N (e.g., executable code) implementing the third gaming application is stored on the corresponding client device 100 as previously described, and is used to execute the Nth gaming application.

As previously described, each of client device 100 may receive input from various types of input devices, such as game controllers, tablet computers, keyboards, gestures captured by video cameras, mice touch pads, etc. Client device 100 can be any type of computing device having at least a memory and a processor module that is capable of connecting to the game server 205 over network 150. Also, client device 100 of a corresponding player is configured for generating rendered images executed by the game title execution engine 111 executing locally or remotely, and for displaying the rendered images on a display. For example, the rendered images may be associated with an instance of the first gaming application executing on client device 100 of player 5A. For example, a corresponding client device 100 is configured to interact with an instance of a corresponding gaming application as executed locally or remotely to implement a game play of a corresponding player, such as through input commands that are used to drive game play.

In one embodiment, client device 100 is operating in a single-player mode for a corresponding player that is playing a gaming application.

In another embodiment, multiple client devices 100 are operating in a multi-player mode for corresponding players that are each playing a specific gaming application. In that case, back-end server support via the game server may provide multi-player functionality, such as through the multi-player processing engine 119. In particular, multi-player processing engine 119 is configured for controlling a multi-player gaming session for a particular gaming application. For example, multi-player processing engine 130 communicates with the multi-player session controller 116, which is configured to establish and maintain communication sessions with each of the users and/or players participating in the multi-player gaming session. In that manner, players in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database 240 of FIG. 2A, and is accessible by state sharing module 117.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user when playing the game, game level, character attributes, character location, number of lives left, the total possible number of lives available, armor, trophy, time counter values, etc. User saved data may also include user profile data that identifies a corresponding player, for example. User saved data may be stored in database 240.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

Back-end server support via the game server 205 may provide assistance supporting game play of a corresponding player, such as providing matched responses to queries of the player, as will be described below, in accordance with one embodiment of the present disclosure. For example, game assist server 140 is configured to provide gaming assistance in cooperation with game server 205. In particular, game assist server 140 works in conjunction with the AI processor 160 to match queries to responses using a deep learning engine, as previously described. For example, AI processor 160 includes ASR engine 141A configured for optionally transforming the query to a format suitable for use, and an NLP engine configured for interpreting the query. In addition, a deep learning engine 190 is configured to match the query to modeled responses that were previously learned through the deep learning engine.

Figure 2C:
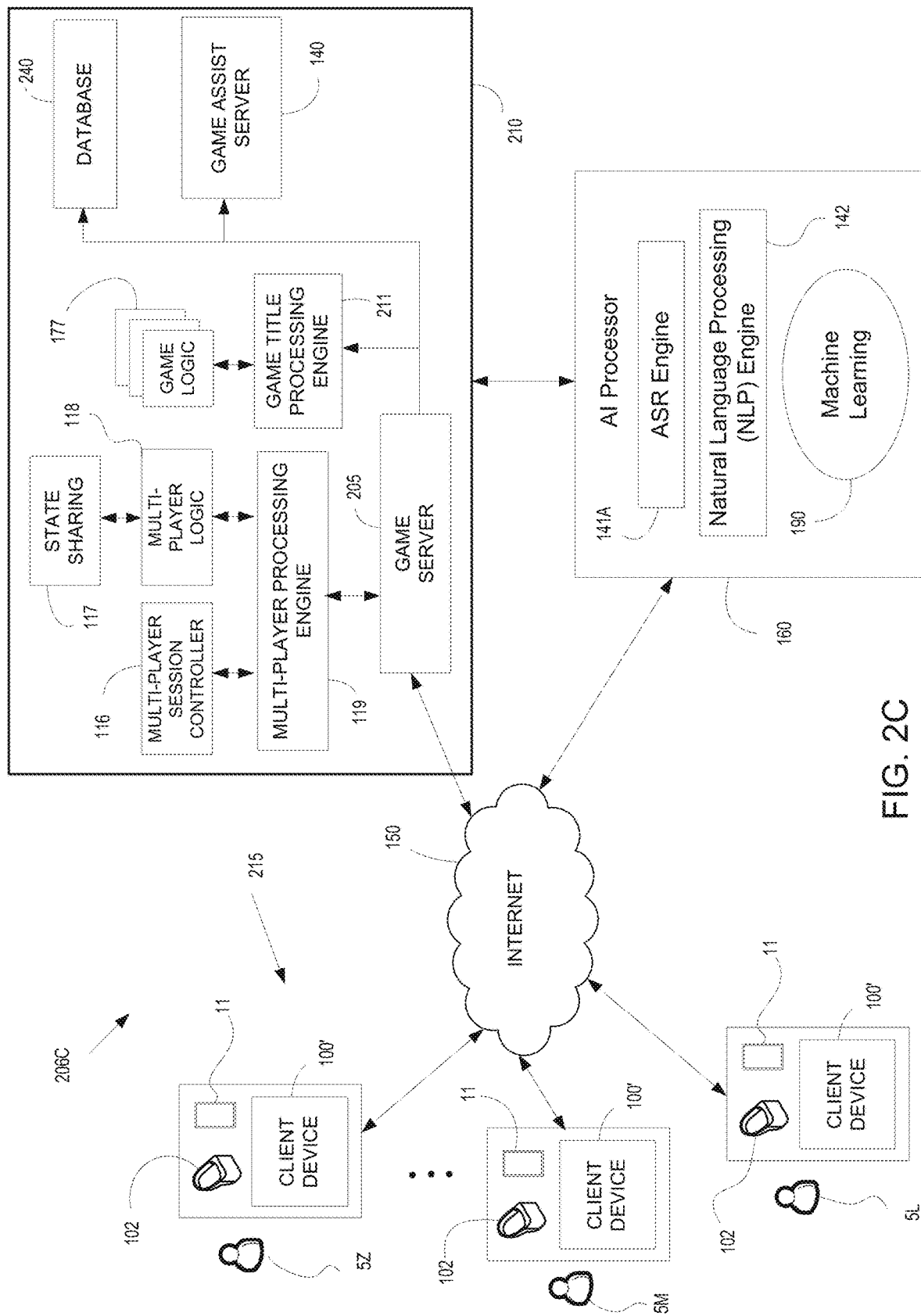
FIG. 2C illustrates a system providing gaming assistance during game play of a player playing a gaming application that is executed over a cloud game network, in accordance with one embodiment of the present disclosure.

FIG. 2C illustrates a system 206C providing gaming assistance during game play of a player playing a gaming application that is executed over a cloud game network, in accordance with one embodiment of the present disclosure. As shown, system 106C provides gaming control to a plurality of players 215 (e.g., players 5L, 5M ... 5Z) playing a gaming application as executed over a cloud game network, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host. In one embodiment, system 206C works in conjunction with system 10 of FIG. 2A to provide gaming assistance associated with a query. Referring now to the drawings, like referenced numerals designate identical or corresponding parts.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. As such, a plurality of game processors of game server 205 associated with a plurality of virtual machines is configured to execute multiple instances of the gaming application associated with game plays of the plurality of users 215. In that manner, back-end server support provides streaming of media (e.g., video, audio, etc.) of game plays of a plurality of gaming applications to a plurality of corresponding users.

A plurality of players 215 accesses the game cloud system 210 via network 150, wherein players (e.g., players 5L, 5M ... 5Z) access network 150 via corresponding client devices 100', wherein client device 100' may be configured similarly as client device 100 of FIGS. 1A-1B and 2A-2B (e.g., including game executing engine 111, etc.), or may be configured as a thin client providing that interfaces with a back end server providing computational functionality (e.g., including game executing engine 211). In addition, each of the plurality of players 215 has access to a device 11 or any other device (e.g., speaker), previously introduced, configured to present gaming assistance (e.g., responses) to answer a one or more queries, as previously described. In particular, a client device 100' of a corresponding player 5L is configured for requesting access to gaming applications over a network 150, such as the internet, and for rendering instances of gaming application (e.g., video game) executed by the game server 205 and delivered to a display device associated with the corresponding player 5L. For example, player 5L may be interacting through client device 100' with an instance of a gaming application executing on game processor of game server 205. More particularly, an instance of the gaming application is executed by the game title execution engine 211. Game logic (e.g., executable code) implementing the gaming application is stored and accessible through data store 140, previously described, and is used to execute the gaming application. Game title processing engine 211 is able to support a plurality of gaming applications using a plurality of game logics 177, as shown.

As previously described, client device 100' may receive input from various types of input devices, such as game controllers, tablet computers, keyboards, gestures captured by video cameras, mice touch pads, etc. Client device 100' can be any type of computing device having at least a memory and a processor module that is capable of connecting to the game server 205 over network 150. Also, client device 100' of a corresponding player is configured for generating rendered images executed by the game title execution engine 211 executing locally or remotely, and for displaying the rendered images on a display. For example, the rendered images may be associated with an instance of the first gaming application executing on client device 100' of player 5L. For example, a corresponding client device 100' is configured to interact with an instance of a corresponding gaming application as executed locally or remotely to implement a game play of a corresponding player, such as through input commands that are used to drive game play.

In another embodiment, multi-player processing engine 119, previously described, provides for controlling a multi-player gaming session for a gaming application. In particular, when the multi-player processing engine 119 is managing the multi-player gaming session, the multi-player session controller 116 is configured to establish and maintain communication sessions with each of the users and/or players in the multi-player session. In that manner, players in the session can communicate with each other as controlled by the multi-player session controller 116.

Further, multi-player processing engine 119 communicates with multi-player logic 118 in order to enable interaction between players within corresponding gaming environments of each player. In particular, state sharing module 117 is configured to manage states for each of the players in the multi-player gaming session. For example, state data may include game state data that defines the state of the game play (of a gaming application) for a corresponding player 115A at a particular point, as previously described. Further, state data may include user/player saved data that includes information that personalizes the video game for the corresponding player, as previously described. For example, state data includes information associated with the user's character, so that the video game is rendered with a character that may be unique to that user (e.g., shape, look, clothing, weaponry, etc.). In that manner, the multi-player processing engine 119 using the state sharing data 117 and multi-player logic 118 is able to overlay/insert objects and characters into each of the gaming environments of the users participating in the multi-player gaming session. This allows for interaction between users in the multi-player gaming session via each of their respective gaming environments (e.g., as displayed on a screen).

In addition, back-end server support via the game server 205 may provide assistance supporting game play of a corresponding player, such as providing matched responses to queries of the player, as will be described below, in accordance with one embodiment of the present disclosure. For example, game assist server 140 is configured to provide gaming assistance in cooperation with game server 205. In particular, game assist server 140 works in conjunction with the AI processor 160 to match queries to responses using a deep learning engine, as previously described. For example, AI processor 160 includes ASR engine 141A configured for optionally transforming the query to a format suitable for use, and an NLP engine configured for interpreting the query. In addition, a deep learning engine 190 is configured to match the query to modeled responses that were previously learned through the deep learning engine.

Figure 3A:
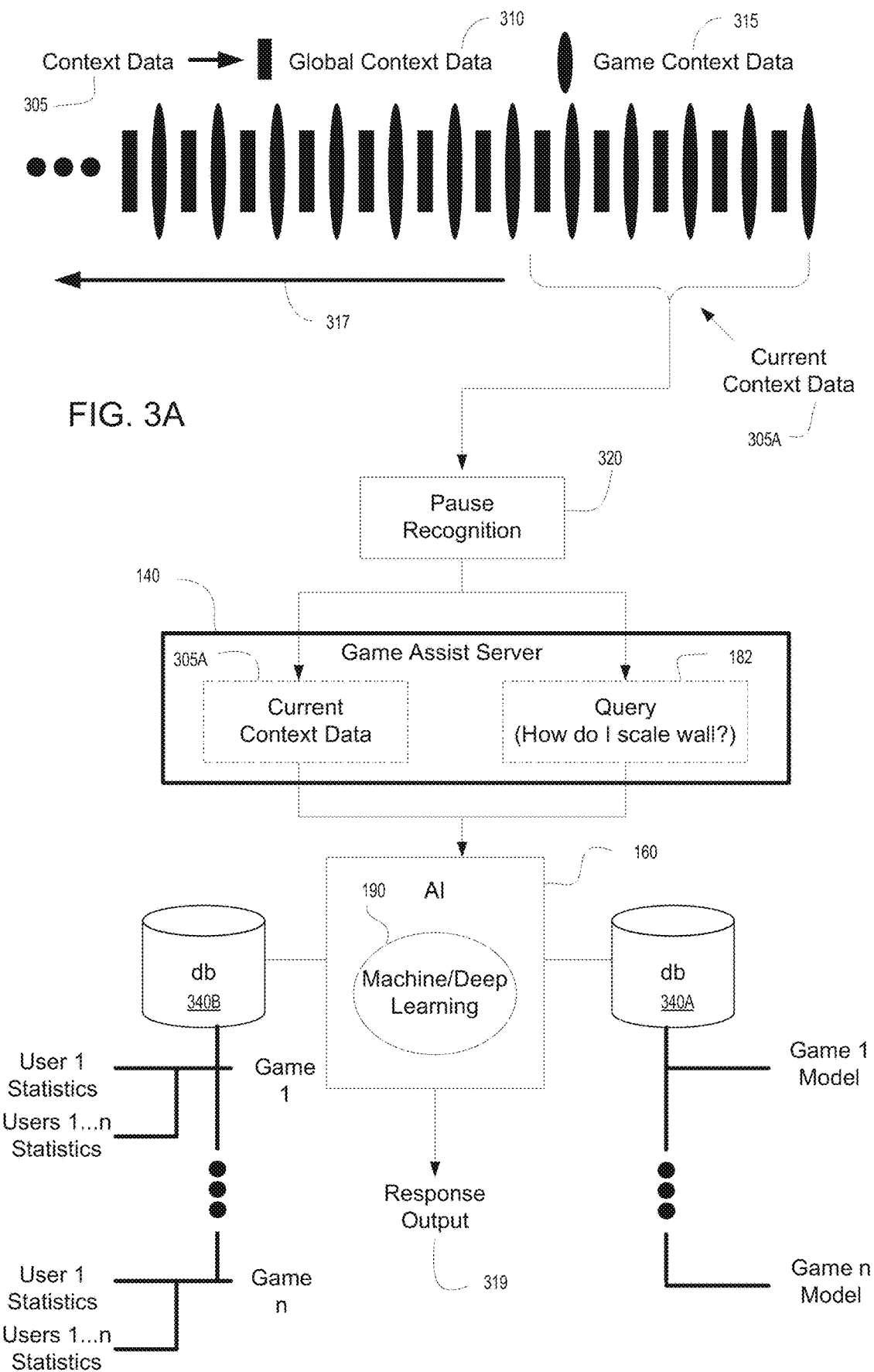
FIG. 3A illustrates a data flow diagram illustrating the flow of data between a user and a back-end server providing gaming assistance during game play of a player playing a gaming application, wherein the gaming application can be executing on a local computing device or over a cloud game network, in accordance with one embodiment of the present disclosure

FIG. 3A illustrates a data flow diagram illustrating the flow of data between a user and a back-end server providing gaming assistance during game play of a player playing a gaming application, wherein the gaming application can be executing on a local computing device or over a cloud game network, in accordance with one embodiment of the present disclosure.

As shown, context information 305 collected from the game plays of a plurality of players may be used to provide a newly generated or matched response to a query. The context information 305 collected may include game context data 315 and global context data 310, as previously described. The context information 305 is delivered to the game assist server 140 along with the query 182.

Game context data 315 may include metadata and/or information related to the game play, such as game state data that defines the state of the game, user/player information related to the player, and system level data (e.g., OS data), as previously described. For example, game state data includes information that allows for the generation of the gaming environment that existed at a corresponding point in the video game or gaming application (e.g., game objects, object attributes, graphic overlays, game characters, scene/gaming environment, game path information, rate information kill to death ratios and others location of character information, accuracy, rate or speed of accomplishing tasks, etc.). In addition, game context data may include user/player information including information that personalizes the video game for the corresponding player (e.g., character assets for user customization—shape, race, look clothing, weaponry, etc.). Game context data may include system level data (e.g., OS data), such as controller input data, speed of controller input actuation, how many times a gaming input was actuated, motions of the controller induced by the user, times the gaming console was used and for what purpose—gaming, internet, streaming, etc. —other game independent actions, etc. Global context data 310 may include user profile data for the user, such as overall gaming skill of the player, game controller skill and handling characteristics, how often the user plays the game, how often the user starts and uses the console for gaming and/or other features offered by the gaming console, date and time when the video game was played, duration of a corresponding game play, etc.

The context data 305 is collected in a database 340B that is accessible by the AI engine 160 for purposes of generating modeled responses, and for matching queries to corresponding responses. As shown, database 340B includes user data and statistics for each of the user/players. For example, database 340B includes information related to user 1 for each of the games 1 . . . N. Database 340B also includes information related to other users. Further, database 340A includes modeled responses for each of the gaming applications 1 . . . N.

Based on the history 317 of context information (e.g., game and global context data) collected from the player requesting assistance, and other players playing the same gaming application, modeled responses may be generated that answer one or more queries related to the gaming application, or to other general gaming questions, such as through a deep learning process. In particular, each gaming application has its own set of modeled responses. In that manner, a generic query (how do I scale a wall of a mountain) can be matched with an appropriate response given a current context data 305A. For example, the query now can be matched to the response for the corresponding gaming application, instead of a response for a different gaming application that also has a wall in a mountain posing as an obstacle.

Thereafter, when a query 182 is presented by a player, a pregenerated or modeled response 319 may be presented to the requesting player for a given current context data 305A. In one embodiment, the game play is paused while servicing the query, as indicated in the pause recognition box 320. A data collector is configured to collect the current context data 305A and the query 182 (e.g., how do I scale a wall of a mountain) and deliver such to the game assist server 140.

In addition, the player requesting help may be presented with a newly modeled response (text, audio, video, etc.) that directly answers the request for help. For example, the request or query may be presented by the user in a first format (e.g., text, audio, video, etc.) and is translated into a format that is understood by the server providing help. In one implementation, the query is presented in audio format and is translated into a text format that can be understood by the game assist server (e.g., using speech recognition techniques). The reformatted request/query is then interpreted to understand the nature of the query (e.g., the content of the help query).

Artificial intelligence (AI) as applied by the AI engine 160 may be used to match the interpreted query and current context data 305A to pregenerated content (recorded help session, text answer, audio answer, video answer, etc.). The AI engine 160 includes a machine learning or deep learning engine 190 used for matching the query to models of responses and/or queries/responses in order to provide a response to the query. In one embodiment, the modeled response is provided in a particular format, such as text, audio, video, etc. In addition, in other embodiments, the pregenerated or modeled response may be a recorded help session (e.g., audio and video recording) between another user and an expert, wherein the expert provides assistance for the same or related help query provided in the request. The pregenerated response may be a pregenerated response (e.g., text, audio, video, etc.) that was previously generated to provide assistance to another user for the same or related help query. When no pregenerated response is available, the AI may be used to generate a newly modeled response (e.g., text answer, audio answer, video answer, etc.) to the query, in part based on one or more closest matched models.

Further, when no pregenerated response or newly generated response is available, embodiments of the present disclosure provide real-time assistance (e.g., live help session with an expert) to the user/player requesting help.

Figure 3B:
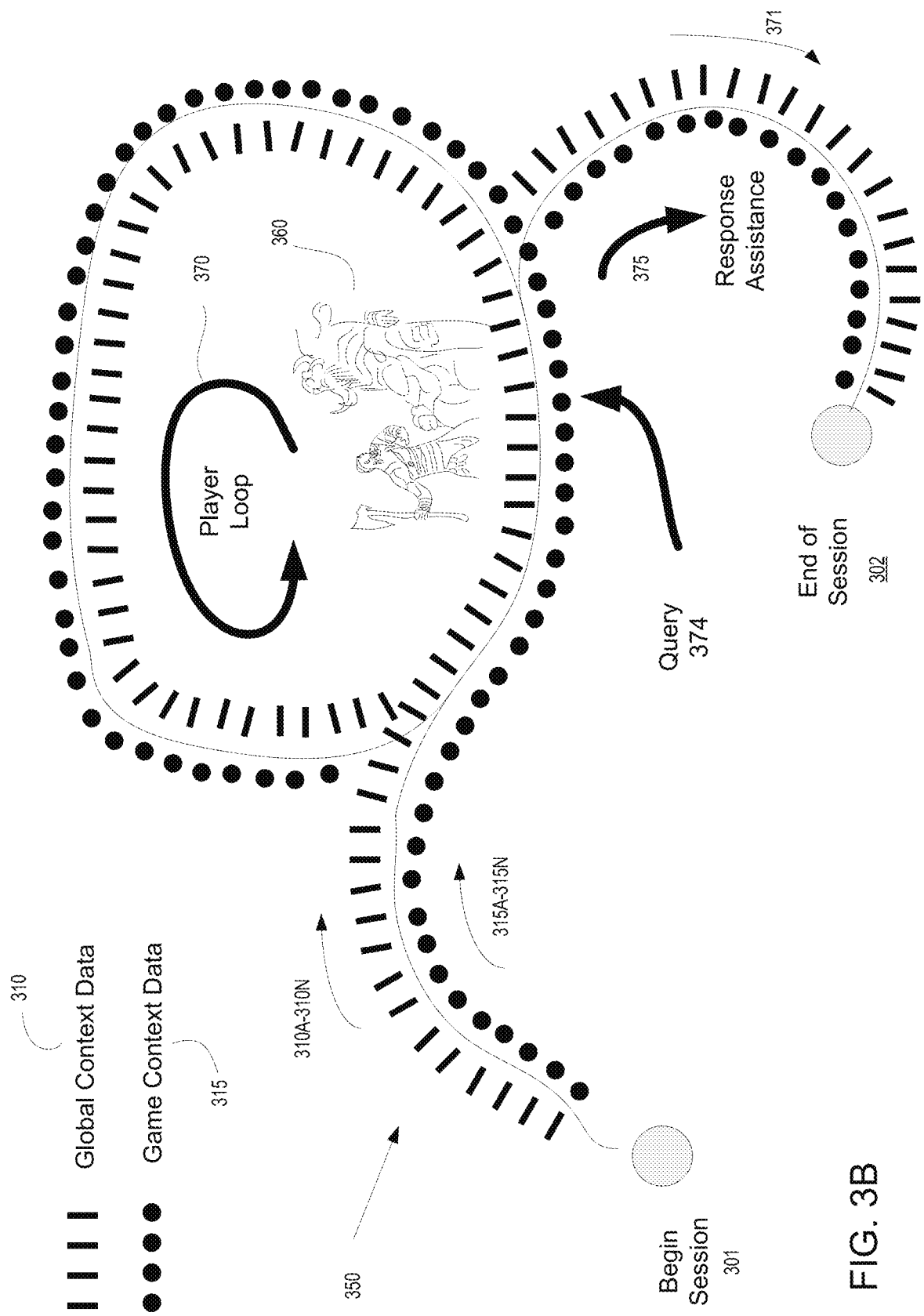
FIG. 3B illustrates game play of a player playing a gaming application and the periodic collection of information including game context data and global context data, in accordance with one embodiment of the present disclosure.

FIG. 3B illustrates game play of a player playing a gaming application and the periodic collection of context data including game context data and global context data, in accordance with one embodiment of the present disclosure. The context data is used for providing a response to one or more queries presented by the player during the game play as implemented through a back-end game assist server, as previously described.

In particular, a current session of the player is shown in a timeline 350 that indicates game play progress through the gaming application. Timeline 350 includes a beginning point 301 of the session, and an end point 302 of the session. Various actions and tasks are performed by a character of the player during the session.

Further, context data is collected throughout the session as indicted in timeline 350. In one embodiment, the context data is collected periodically, and/or at significant moments during the game play. For example, global context data 310A-310N is collected at various points during the timeline 350, wherein the global context data may include user profile data for the user, and other metric data associated with the user, as previously described. In addition, game context data 315A-315N is collected at various points during the timeline 350, wherein the game context data may include metadata and/or information related to the game play, such as game state data that defines the state of the game, user/player information related to the player, and system level data (e.g., OS data), as previously described.

As shown in FIG. 3B, the player is experiencing a recurring loop 370 during the game play, where the player is unable to proceed past a particular point or obstacle (e.g., beating a mini-boss or boss, etc.) in the gaming application. For example, in screen shot 360 the player is unable to beat the Boss at the end of Level 3, wherein screen shot 360 may show an interaction between Kratos and a giant-sized Boss in the gaming application—God of War, published by SONY Interactive Entertainment. In the God of War gaming application, Kratos is a Spartan warrior of Greek mythology, who is tasked with killing Ares, the God of War. After multiple tries, the player may make a query 374 that asks "how do I beat the boss," which is then delivered back to the back-end game assist server, as previously described. Along with the query 374, applicable context data is also delivered, such that at least gaming context is provided to the game assist server for purposes of matching the query 374 to an appropriate response 375, at least through application of a deep learning engine.

For example, the response 375 may indicate that the key to beating the Boss is performing the "hammer blow sequence." In addition, to help the player understand the sequence, the response 375 may include the sequence of controller inputs (e.g., right button, left button, A button, A button, O button, X button, etc.). The response may be provided through one or more formats, such as audio, text, video, etc. In one implementation, the sequence of controller inputs may be provided through an instructional video that visually shows how to execute the hammer blow sequence. In addition, ghost hands may be presented showing how the ghost hand interacts with each of the buttons or actuators in the sequence.

After the player follows the instruction and/or tips provided in response 375 and beats the Boss, the player is freed from the loop 370, and is able to advance the progress of the game play, as indicated in tail section 371 of the game play timeline 350. For example, after beating the Boss at the end of Level 3, the player is able to advance to Level 4.

Figure 3C:
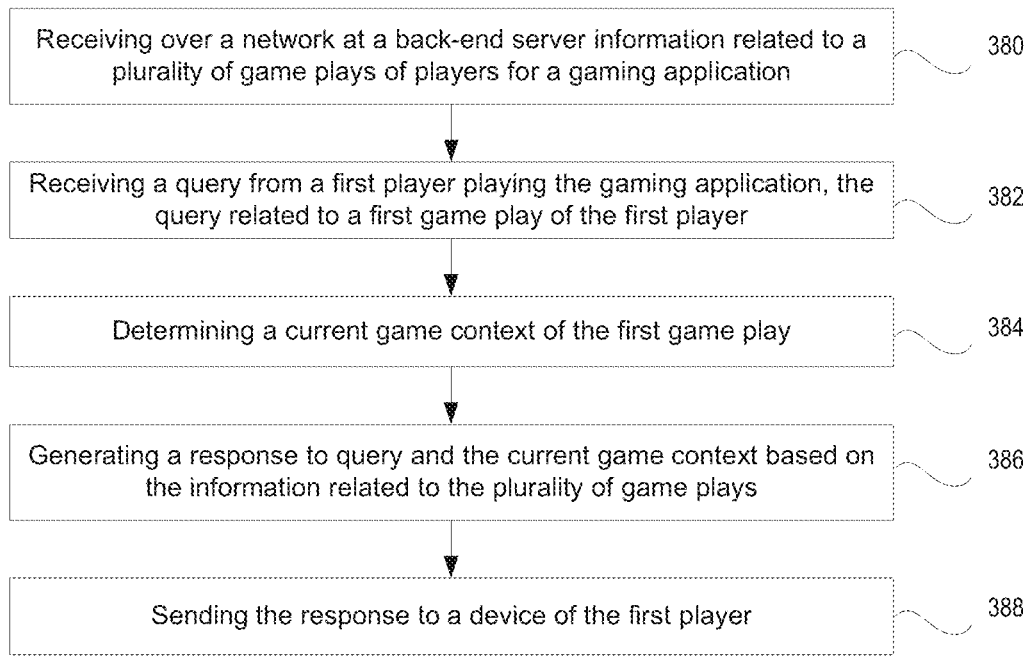
FIG. 3C is a flow diagram illustrating steps in a method for providing gaming assistance during game play of a player playing a gaming application, wherein the gaming application can be executing on a local computing device or over a cloud game network, in accordance with one embodiment of the present disclosure.

With the detailed description of the various modules of the game assist server and client device communicating over a network, a method for providing gaming assistance supporting game play of a corresponding player wherein the gaming application can be executing on a local computing device or over a cloud game network is now described in relation to flow diagram 300C of FIG. 3C, in accordance with one embodiment of the present disclosure. Flow diagram 300C illustrates the process and data flow of operations involved at the game assist server side for purposes of matching a query to a response through a deep learning engine. The response may be transmitted to a device of the player that may be separate from another device displaying the game play of the player playing a gaming application, or may be transmitted to the device displaying the game play. In particular, the method of flow diagram 300C may be performed at least in part by the game assist server140 of FIGS. 1A-1B and 2A-2C.

At 380, the method includes receiving over a network at a back-end server information related to a plurality of game plays of players for a gaming application. The information may include context data, such as global context data and game context data, as previously described.

For example, the global context data may include user profile data for the user, and other metric data associated with the user. As an illustration, global context data may include player profile data; playing style of the player; skill level of the player; whether or not the player is currently playing the gaming application; whether or not the player is online; the title of the gaming application; co-players the player is playing with; frequency of input controller actuation; friends of the player, etc.

In addition, game context data may include metadata and/or information related to the game play, such as game state data that defines the state of the game, user/player information related to the player, and system level data (e.g., OS data). For example, the game state information may define the state of the game play at a corresponding point, to include character information (e.g., type, race, etc.), the gaming application, where the character is located, what level is being played, assets of the character, game objects, game object attributes, game attributes, game object state, graphic overlays, character assets (e.g., clothing, weapons, etc.), loadout, skill set of character, geographic location of character in gaming environment/world, the current quest and/or task presented to a first character in the game play; next quest for the first character in the game play loadout, skills set of the character, location of the game play in a gaming environment; etc. Further, the game context data may include OS level data, wherein the OS level data may include gaming input; controller input; timestamps of controller input, etc. Game state data may include user/player information that may include information that personalizes the video game for the corresponding player, such as skill or ability of the player, the overall readiness that the player seeks help, recency of playing the gaming application by the player, game difficulty selected by the user 5 when playing the game, game level, character attributes, character location, number of lives left, the total possible number of lives available, armor, trophy, time counter values, and other asset information, etc. Generally, the game state data allows for generation of the gaming environment that existed at the corresponding point in the game play.

At 382, the method includes receiving a query from a player playing the gaming application, wherein the query is related to game play of the player. For example, the query may request information informing the player how to tackle an obstacle, general information about a gaming environment encountered by the player, information about a gaming character, information about friends playing the gaming application, information about the gaming application, degree of how well the player is doing with respect other players, etc.

In some embodiments, the query is transformed to a format that is suitable for processing. For example, the query is transformed from a first format to a second format. In one embodiment, the query is presented in one of audio, text, video format, though other formats are supported. In one implementation, the first format is audio, and the second format is text, such that the query may be presented by the player through a microphone system (e.g., standalone transceiver) which is transmitted in an audio format. In that manner, the query in text format can be interpreted to determine the content of the query, such as using an NPL engine, as previously described.

At 384, the method includes determining a current game context of the game play. Context data is continually collected during the game play, and includes global context data and game context data. A current game context can be determined from the context data and used to match the query to the appropriate response. In particular, at 386, the method includes generating a response to query and the current game context based on the information related to the plurality of game plays. For example, the current game context includes the title of the gaming application, the current scene or gaming environment encountered by the player, etc. In that manner, a generalized query (e.g., how to kill boss) can be given a gaming context to better understand just what the query is asking, and how best to respond to that query. As an illustration, the query may be unanswerable, but with the context of a particular gaming application, and level, and which boss at the level, the appropriate response indicating the weaknesses of the boss can be returned to the player.

In one embodiment, the interpreted query and the current game context for the gaming application is provided as input into a deep learning engine configured to match the interpreted query and current game context to the response. The deep learning engine previously was trained on queries and responses in order to generate a plurality of modeled responses and/or queries/responses, wherein the matched response is one of the modeled responses for the gaming application. In one embodiment, the deep learning engine is part of a third party AI engine. As such, the query and the current game context is delivered to the third party AI engine that may be configured for optionally interpreting the query and matching the interpreted query and current game context to the response.

At 388, the method includes sending the response to a device of the player. The device may include a companion mobile device that is separate from a display presenting the game play, in one embodiment. For example, the companion device may be a mobile phone that can be used to receive and deliver the query to the back-end game assist server, and to receive and present the response back to the player. Also, the companion device may be a standalone speaker. For example, the companion device may include audio, text and/or video presentations. In another embodiment, the device may be a display that is simultaneously displaying the response and the game play.

In one embodiment, when no response is available for matching, the game assist server may find an expert that is able to provide real-time (e.g., live) help to the player. In particular, the current game context may be matched to game contexts of other players that are classified as experts. An expert who has recently played the gaming application in a similar manner (e.g., using the same weapons to kill a boss of the query) based on contexts (e.g., global and/or game contexts) may be matched to the current game context of the query. For example, the current game context of the player (requesting help) may be compared to a plurality of historical expert game contexts to see how closely the expert matches the player. The matching may be done through a deep learning engine, in one embodiment. That is, the comparison determines how closely the game play of each expert matches the game play of the first player. Experts may be selected based on a variety of factors, including the highest matching rating, availability, quickness in expert responding to a broadcast notification of help needed, etc. If the player agrees, then the expert is connected to the player via a communication session and between devices of the player and the expert in order for the expert to render assistance to the player.

Figure 3D:
FIG. 3D is a flow diagram illustrating steps in a method for providing real-time assistance during game play of a player playing a gaming application by connecting the player to an expert over a communication session, in accordance with one embodiment of the present disclosure.

FIG. 3D is a flow diagram illustrating steps in a method for providing real-time assistance during game play of a player playing a gaming application by connecting the player to an expert over a communication session, in accordance with one embodiment of the present disclosure. The help session may be transmitted to a device of the player that may be separate from another device displaying the game play of the player playing a gaming application.

In some embodiments, before the user is matched with an expert in a response for help from the user, the context information collected from the game plays of a plurality of players and/or experts may be used to provide a newly generated or re-generated response. The context information collected may include metadata and/or information related to the game play, such as game state data that defines the state of the game, user/player information related to the player, and system level data (e.g., OS data), as previously described. For example, game state data includes information that allows for the generation of the gaming environment that existed at a corresponding point in the video game or gaming application (e.g., game objects, object attributes, graphic overlays, game characters, scene/gaming environment, game path information, rate information—kill to death ratios and others—location of character information, accuracy, rate or speed of accomplishing tasks, etc.) User/player information includes information that personalizes the video game for the corresponding player (e.g., character assets for user customization—shape, race, look clothing, weaponry, etc.). User/player information may also include user profile data for the user, such as overall gaming skill of the player, game controller skill and handling characteristics, how often the user plays the game, how often the user starts and uses the console for gaming and/or other features offered by the gaming console, etc. Also, the system level data (e.g., OS data) includes controller input data, speed of controller input actuation, date and time when the video game was played, duration of a corresponding game play, how many times a gaming input was actuated, motions of the controller induced by the user, times the gaming console was used and for what purpose—gaming, internet, streaming, etc.—other game independent actions, etc.

Based on the context information collected from the user/player requesting help, and other users playing the video game, the user/player may be presented with a pregenerated response that responds directly to the request for help. The pregenerated response may be a recorded help session (e.g., audio and video recording) between another user and an expert, wherein the expert provides assistance for the same or related help query provided in the request. The pregenerated response may be a pregenerated response (e.g., text, audio, video, etc.) that was previously generated to provide assistance to another user for the same or related help query provided in the request. In addition, the user/player requesting help may be presented with a newly generated response (text, audio, video, etc.) that directly answers the request for help. For example, the request or query may be presented by the user in a first format (e.g., text, audio, video, etc.) and is translated into a format that is understood by the server providing help. In one implementation, the request is presented in audio format and is translated into a text format that can be understood by the help server (e.g., using speech recognition techniques). The reformatted request/query is then interpreted to understand the nature of the query (e.g., the content of the help query). Artificial intelligence may be used to match the interpreted query to a pregenerated response.

If no response is generated, then the method of FIG. 3D is implemented. In particular, at 390, the method includes receiving over a network at a back-end server information related to a plurality of game plays of a plurality of players for a gaming application. The players may be currently playing the gaming application, or have played the gaming application. In some embodiments, the information includes the game plays. In some embodiments, the information includes metadata and/or information generated relating to the game play, such as game state data. For example, the information may include game state information and user/player saved information, as previously described. The information may include snapshot information that could provide information enabling execution of an instance of the video game beginning from a point in the video game associated with a corresponding snapshot. For example, the game state information may define the state of the game play at a corresponding point, to include character information (e.g., type, race, etc.), the gaming application, where the character is located, what level is being played, assets of the character, game objects, game object attributes, game attributes, game object state, graphic overlays, character assets, skill set of character, geographic location of character in gaming environment/world, the current quest and/or task presented to the player, loadout, skills set of the character, etc. The game state data allows for generation of the gaming environment that existed at the corresponding point in the game play. Further, user/player information that related to the player may include information that personalizes the video game for the corresponding player, such as skill or ability of the player, the overall readiness that the player seeks help, recency of playing the gaming application by the player, game difficulty selected by the user 5 when playing the game, game level, character attributes, character location, number of lives left, the total possible number of lives available, armor, trophy, time counter values, and other asset information, etc.

At 391, the method includes determining from the information a current game context of a first game play of a first player. The first game context is related to the current state of the game play of the first player. Specifically, information is received relating to a current game play of a first player. In one case, the current game play is live, such that the first player is currently playing the gaming application. Game context defines the gaming environment at a particular point in the game play. A current game context defines the gaming environment at a current point in a corresponding game play. Game contexts may be defined for one or more points in a corresponding game play. For example, the game context may define the character of a player, the various characteristics of that player, the assets associated with that player, the tasks presented to the player, etc. The game context may be based or closely related to the previously received metadata and/or information generated relating to the game play.

At 392, the method includes determining from the information a plurality of historical expert game contexts of a plurality of expert game plays of experts that have played the gaming application. In one implementation, an expert may also be currently playing the gaming application and generating new historical expert game contexts through the corresponding game play. The expert game plays are generated from players classified as experts for the gaming application. As previously described, generally game contexts may be defined for one or more points in a corresponding game play, such as those for one or more experts. The expert game plays are taken from the plurality of game plays, and specifically from game plays of players classified as experts. A player may be classified through self-registration, through qualification, or through any other method. In one embodiment, the expert game contexts have been simultaneously determined when determining game contexts of the plurality of game plays of all the players. As such, once a player is classified as an expert, the game context information of the corresponding game player of the expert can be identified as one or the expert game contexts. In addition, the game context information may be determined for multiple points during the corresponding game play. For example, game context information for a first expert may include first game context at a first point in the game play, second game context at a second point in the game play . . . and Nth game context at an Nth point in the game play. For example, the game play for a corresponding expert may have a plurality of game contexts, including game contexts for facing a boss at level 1, facing a boss at level 2, progress within a given side quest, etc. When multiple players have been classified as experts, the game context information for each expert may be determined.

Classified experts for a particular gaming application make up a set of the plurality of players. As previously described, the experts may be self-registered, such as without any qualifying criteria. In another implementation, the experts may have some qualification, such as skill of player, accomplishing a task, finishing a quest, finishing a portion of the game within a time period, finishing the game within a time period, etc., as previously described. After reaching the qualification, the expert may self-register, and/or may automatically be labeled as an expert (e.g., with authorization).

Different players and/or experts playing the same gaming application may have the same or similar game contexts within their corresponding game plays. For example, by collecting game contexts of multiple players all playing the same gaming application, game plays of different players may be aligned as having similar characters with the same assets, similar playing styles of different players, similar routing through the gaming world of a gaming application, etc. Game context information may be used to match a player with another player that is classified as an expert (e.g., self-registration, qualified, etc.), such that the expert is able to provide assistance in the game play of the player requesting the assistance, as will be described below.

At 393, the method incudes receiving an assistance query related to the first game play. That is, the first player is also making a request for assistance, or making a request notification, etc. For example, the query may be specifically directed to how to beat a particular point in the game (e.g., level boss, quest, task, etc.), or may be directed to gaining information about an object (e.g., a boss's name, an object encountered in the game play, or may be directed to an overall objective for the player at this point in the gaming application.

In addition, the current game context of the first player is related to the state of the game that is closest to the point in the game play from which the request is made. For example, the game context may provide information relating to the character of the first player, the assets held by the character, the level in the gaming application encountered by the character, and the scene in the level. Any query or request for assistance by the first player would necessarily be related to the current game context. As such, the game play of another player (e.g., a classified expert, friend, etc.) that has a game context that closely matches the current game context of the first player may have knowledge of the gaming application that is helpful to the first player.

At 394, the method includes comparing the current game context of the first player (requesting help) to the plurality of historical expert game contexts to see how closely the expert matches the first player, such as in relation to game context of respective game players. That is, the comparison determines how closely the game play of each expert matches the game play of the first player. In one embodiment, the comparison is performed for each game context captured for a particular expert, and the closest game context to the first game context of the first player is used as being representative of that expert. In another embodiment, the game context information collected at various points during the game play of a particular expert may be combined and used for comparison to the first game context of the first player. In one implementation, at least one expert is determined having a corresponding historical expert game context that matches the first game context.

At 395, the method includes assigning to the first player a first expert for obtaining assistance. That is, the first expert can then provide assistance to the first player in relation to his or her game play. Various methods of selection can be implemented for purposes of selecting the first expert from the pool of experts. For example, the first expert is selected based on the game contexts of the first player and experts in the set/pool of experts.

In one embodiment, the first expert is selected based on the quality of the matching between game contexts. For instance, the set of matched expert game contexts has matching values indicating the quality of matching the corresponding expert game context to the first game context, as will be further described in relation to FIG. 3E. For example, the method determines a first matching value having the highest value. The first matching value corresponds to an expert game context. In one case, the first matching value corresponds to the first expert game context of the first expert. As such, the first expert is selected for the help session, wherein the first expert is best suited from the pool of experts to provide help to the first player, based on game contexts.

In another embodiment, the first expert from the pool of experts is selected based on an availability factor. This provides a straightforward approach to matching experts to players requesting help. In particular, this approach may be beneficial when the gaming application is first released. Because of the recent release, there may not be many experts who have registered, and it may be difficult to do any comparisons between experts due to the lack of information. In one implementation, the first available expert is selected and assigned to the first player for the help session.

Figure 3E:
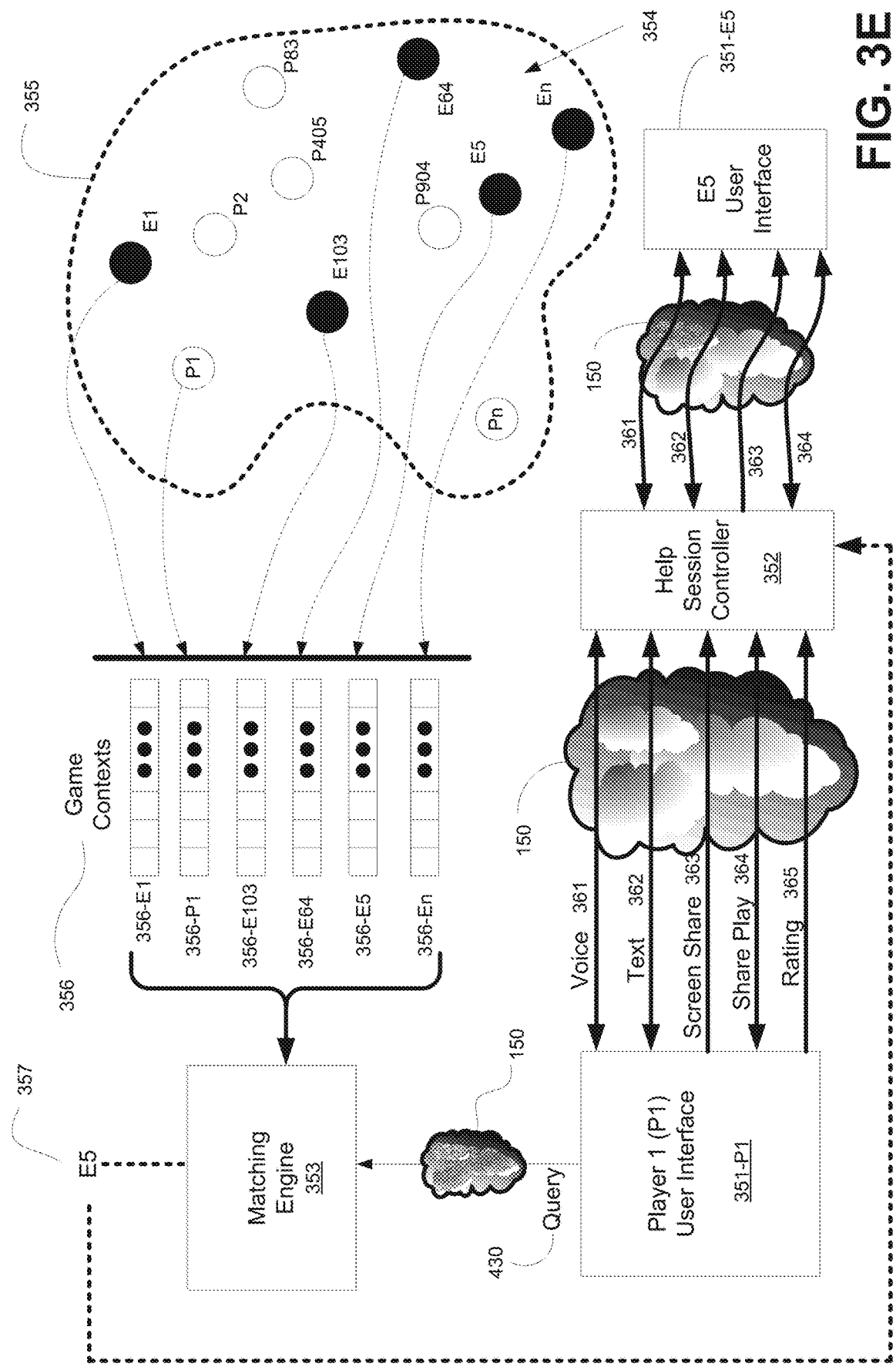
FIG. 3E is a data flow diagram illustrating the flow of data in a system or method providing real-time assistance during game play of a player playing a gaming application by connecting the player to an expert over a communication session, in accordance with one embodiment of the present disclosure.

In other embodiments, an expert is selected based on response times, such as in a race to respond from qualified and/or available experts who are most likely to be able to help, as will be further described in FIG. 3E. In another embodiment, experts are polled one at a time to determine whether they want to provide assistance. During the polling process, the first expert to respond affirmatively is assigned to provide assistance, as will be further described in FIG. 3E.

In particular, at 396, the method includes generating a communication session that connects the first player and the first expert. In one embodiment, a communication session manager at the back-end server acts as an intermediary for establishing and managing the communication session. At least, the communication session is established between a device of the first expert and a device of the first player. The communication session is used to enable the expert to provide assistance to the player, such as through a help session between the first expert and the first player. In one embodiment, the communication session is configured for text, audio, video, embedded audio and video, etc. For example, the method may include one or more of establishing a voice channel, may include establishing a text channel in the communication session, may include establishing a video channel (e.g., embedded video) configured for a video chat. Also, the communication session manager may act to create new sessions to allow for the different forms of communication, such as providing ShareScreen functionality, SharePlay functionality, etc. In one embodiment, the communication session may be a peer-to-peer connection or may include the back-end server acting as an intermediate node. That is, once created by the communication session manager the communication session is a direct communication path between devices of the first player and the first expert. In another embodiment, the communication session may flow through the back-end server.

In one embodiment, the first expert may share the screen of the first player, such as through a share screen functionality, as previously described. By viewing the game play of the first player, the first expert may gain a better sense of the problem facing the first player, and therefore provide better help. The share screen functionality is implemented through the communication session, in one embodiment. The request to share the screen may be made by either the first player or the first expert. For example, the first expert may make a request to share video of the game play of the first player. In one implementation, the request is received by the help session controller at a back-end server. A notification of the request is sent to the device of the first player. For instance, the notification may be delivered from the help session controller. Authorization is received by the help session controller from the device of the first player, wherein the authorization is provided by the first player to share the video of the game play with the expert. As such, the game play of the first player is streamed to the device of the first expert. For example, the help session controller is able to facilitate the streaming through the communication session, or through an independent streaming channel.

In another embodiment, the first expert may take control the game play of the first player, such as through a share play functionality, as previously described. By share play, the expert may take over control of the game play, for example to complete an objective that the first player is unable to perform. The request to share play may be made by either the first player or the first expert. For example, a request from the device of the first expert is received, wherein the request asks to share control of the game play of the first player. The request from the expert may be in the form of an offer of assistance from the expert to accomplish the objective within the game play of the user. The request may be received by the help session controller at the back-end server. A notification of the request may be generated by the help session controller, and delivered to the device of the first player from the help session controller. Authorization is received by the help session controller from the device of the first player, wherein the authorization is provided by the first player to share control of the game play with the expert. In that manner, the expert is able to take control of the game play by submitting gaming input commands In one embodiment, a set of input controls or commands are received by the help session controller from the device of the first expert. A block is placed on input commands from the input controller of the first player, such that the gaming engine (e.g., local console or back-end gaming processor) blocks input commands originating from the controller device of the first player, and passes through input commands originating from the controller device of the first expert. For example, the help session controller may send an instruction to the processor (e.g., gaming engine) executing the gaming application for the game play of the first player to block input controls associated with the first player. As such, the set of input controls from the controller device of the first expert is delivered to the processor (e.g., gaming processor) executing the gaming application for the game play of the first player. In addition, control may be passed back to the first player at any point. For example, the first player may have the ability to take back control the game play at any time (such as, using a kill command), as previously described.

FIG. 3E is a data flow diagram illustrating the flow of data in a system or method providing real-time assistance during game play of a player playing a gaming application by connecting the player to an expert over a communication session, in accordance with one embodiment of the present disclosure.

As shown, player 1 (P1) is playing a gaming application. Player P1 may encounter a roadblock during his or her game play, and request information and/or assistance. For instance, a query from player P1 is made through user interface 351-P1 and delivered through network 150 back to the help session controller 352 of a back-end server, as previously described. In particular, the matching engine 353 in cooperation with the help session controller 352 is configured to match game contexts of the player P1 and a pool of experts 354. The pool of experts is taken from a plurality of players 355, wherein the players are playing one or more gaming applications. The experts in the pool 355 all have played the gaming application, and for example are registered as experts of the gaming application. For example, pool 355 includes one or more experts $E1 \ldots E5 \ldots E103 \ldots E_n$.

Game contexts 356 are input into the matching engine 123 for comparison. For example, the input includes game context 356-P1 for player P1, game context 356-E1 for expert E1, game context 356-E103 for expert E103, game context 356-E64 for expert E64, game context 356-E5 for expert E5 . . . and game context 356-En for expert En. The matching process performed by matching engine was previously described. Basically, the game context 356-P1 of player P1 is compared to each of the game contexts associated with the pool of experts 354. Matching vectors are determined for each of the game contexts, wherein each matching vector has a corresponding matching value (e.g., quality factor or Q-factor) indicating the quality of matching the corresponding expert game context to the game context 356-P1 of player P1.

The matching engine 353 is configured to select one of the experts from the pool of experts 354. As shown, expert E5 is selected, and provided as an output 357 from the matching engine 353. The output 357 is provided to the help session controller 352 for purposes of generating and managing the help session providing assistance to player P1. As previously described, one or more methods may be implemented for selection of the expert. For example, the pool of experts 354 may be further filtered by applying a threshold to the matching values, wherein experts associated with matching values that meet the threshold criteria are considered for selection. In one implementation, the highest quality matching value is used for selection of the expert. That is, the highest matching value is used for selection. In another example, a notification of a help session request is delivered to experts associated with matching values that meet the threshold criteria. The expert that responds first to the notification may be selected for the help session. In still another example, any of the experts associated with matching values that meet the threshold criteria may be selected, such as through random selection, first selection, etc.

In one embodiment, rather than matching the player P1 to an expert, the matching engine 353 may select a friend of the expert from a pool of friends. For example, the friends may be social network friends established through one or more social networks.

The help session controller is configured to establish and manage a help session to provide real-time assistance to player P1. For example, a communication session is generated between a device of player P1 (e.g., the user interface 351-P1) and a device of the expert E5 (e.g., the user interface 351-E5). In one embodiment, the communication session is generated between a communication session manager of the help session controller 352, the device of the player P1 and a device of the expert E5. In another embodiment, the communication session is generated and establishes direct communication between the device of player P1 and the device of expert E5.

One or more communication channels may be established in the communication session. For example, one or more of a voice channel 361, a text channel 362, a screen share channel 363, and/or a share play channel may be established. As shown, the voice channel 361 is a two-way communication path so that player P1 and expert E5 can talk to and listen to each other's voice communication. Also, the text channel 362 is a two-way communication path so that the player P1 and expert E5 can communicate with each other by texting. In addition, the screen share channel 363 may be a one-way communication path so that video from the game play of player P1 is delivered to the device of expert E5 for viewing. Further, the share play channel 364 may be a two-way communication path so that input controls may be communicated from the expert E5 to the gaming engine local to the player P1, or to another gaming engine at a back-end server.

Separate control channel may be established to pass control and other information between the help session controller 352 and user interface 351-P1 or to user interface 351-E5. For example, instructions may be delivered to the user interface 351-P1 that block input controls originating from player P1, or to send video over the screen share channel 363. In addition, rating information may be delivered over the channel 365 providing rating information. For example, after the help session, the player P1 may provide a rating of the help session over channel 365. In addition, player P1 may provide a rating of the overall performance of expert E5 (e.g., personality, helpfulness, ability to control the release of spoilers, depth of knowledge for the gaming application, etc.). Also, expert E5 may provide a rating of the player P1 (e.g., level of cooperation, ability to accept help, personality, gratitude, etc.).

In one embodiment, the help session is implemented on a second computing device associated with the player P1 concurrent with the game play of the user. For example, in one embodiment there may be two communication channels delivering information, such as a first communication channel established to deliver data representative of game play of the user to a first computing device of player P1, and a second communication channel established to deliver data associated with the help session to the second computing device of player P2. For example, the first computing device may be a local gaming console and/or display, and the second computing device may be a smartphone. In another embodiment, the help session may be delivered along with the data representative of game play of the user, such as through a split screen including a first screen showing the game play and a second screen showing the help session.

FIGS. 4-13 are illustrations of various examples of a player entering a query or sequence of related queries in association with one or more gaming applications. The player may be when playing a corresponding gaming application, or may be acting independently of playing the gaming application (e.g., when traveling, or in a meeting, or in class, etc.).

Figure 4A:
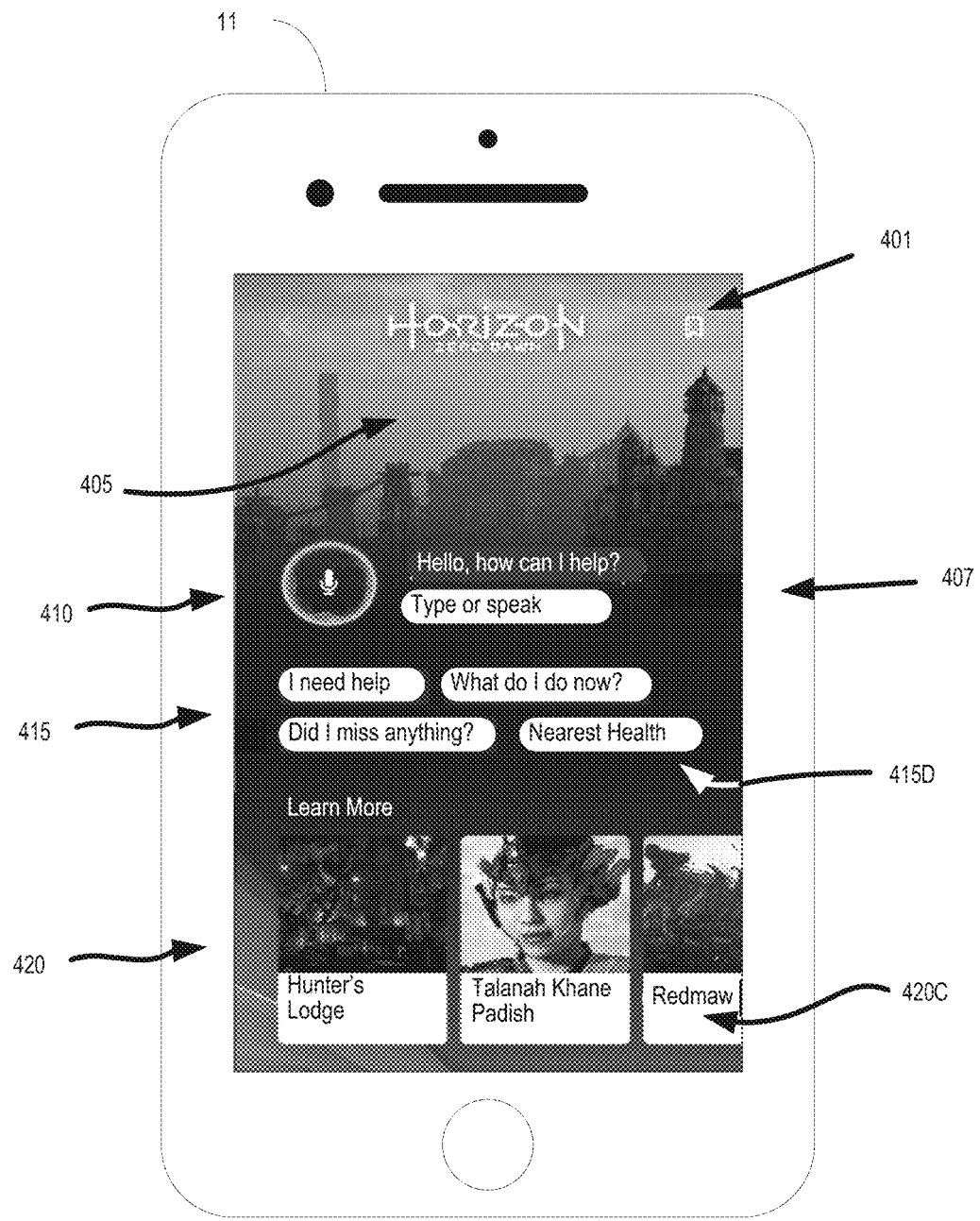
FIG. 4A illustrates an home page screen of a companion mobile device configured to provide gaming assistance to a player playing a gaming application executing on a local gaming console or a cloud game network, in accordance with one embodiment of the present disclosure.

FIG. 4A illustrates an home page screen 405 of a companion mobile device 11 configured to provide gaming assistance to a player playing a gaming application executing on a local gaming console or a cloud game network, in accordance with one embodiment of the present disclosure. The companion mobile device 11 supports the game play that is presented on a different display than that found on device 11. The home page screen 405 includes a background image that can change based on the current location of the game play in the gaming application. For example, the back image may be a silhouette of a town found in the gaming application Horizon Zero Dawn, for purposes of illustration.

Icon 401 provides access to bookmarks. In one embodiment, the bookmarks may include content that is pushed from a display presenting the game play. For example, the content may be pushed from an onscreen display user interface that may be accessed through bookmarks for "further reading."

Icon 410 shows a microphone feature that enables the player to enter a query through speaking. The game assist feature may be activated through a trigger word that indicates that at least one of the next few sentences may include a query. General field 407 indicates that the game assist feature is turned ON. However, the game assist feature may be entered through any number of methods, including manually typing in queries in text format into a search field (e.g., "Type or speak" bubble). Typing may be performed when speaking is not an option (e.g., sitting in class).

Quick search buttons 415 allow the player to select a query just by selecting one of the quick search buttons 415. For example, the player may select between various buttons including queries, such as "I need help" or "What do I do now?" or "Did I miss anything?" For example, a quick search button 415D provides the query "Nearest health." The quick search buttons may progressively change as they are selected to help steer the player without providing textual instructions or audio instructions. The quick search buttons may act as an educational tool for shortcut actions that can be used in the user interface of the television or display presenting the game play.

In addition, contextual cards 420 provide information on a group of topics or objects. For example, a contextual card may provide information on a particular location (e.g., Hunter's Lodge), or may provide information on a particular character (e.g., Talanah Khane Padish). In another example, a contextual card 420C may provide information on a particular enemy beast, such as a Redmaw, which is a Thunderjaw beast in the gaming application Horizon Zero Dawn.

Figure 4B:
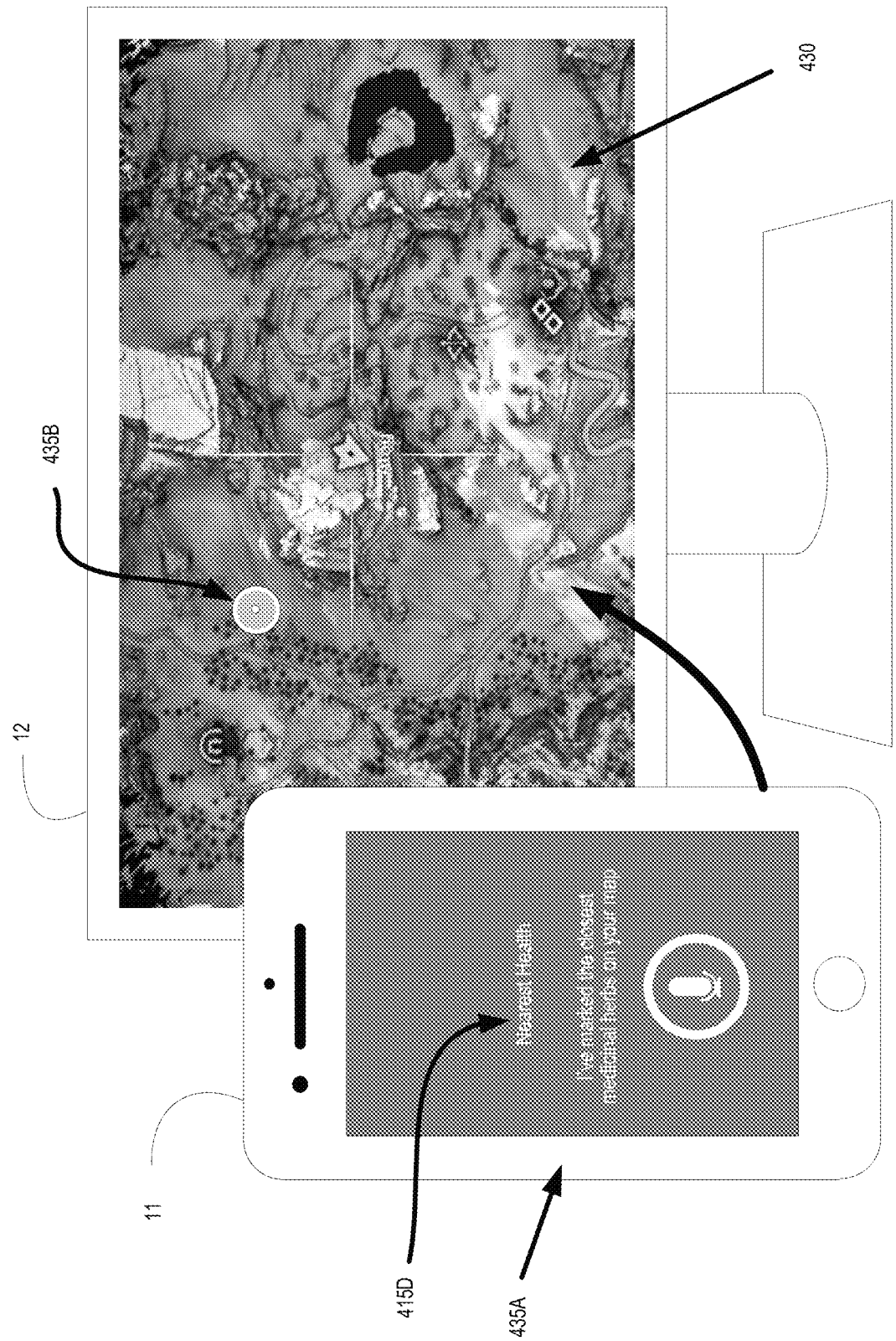
FIG. 4B illustrates the selection of a quick search button on the companion mobile device of FIG. 4A that is configured to provide gaming assistance, and the presentation of the information provided in response to the query of the quick search button on a display separate from the mobile device, in accordance with one embodiment of the present disclosure.

FIG. 4B illustrates the selection of the quick search button 415D on the companion mobile device 11 of FIG. 4A that is configured to provide gaming assistance, in accordance with one embodiment of the present disclosure. In particular, FIG. 4B shows the interaction between the companion mobile device and a display 12 when displaying a response to a query by the player, wherein the display 12 is configured for presenting the game play of the player. In particular, the query is presented from the companion mobile device (e.g., selection of quick search button 415D) asking for the "nearest health" location, such that the character of the user can heal or gain additional lives, etc. The response to the query of the quick search button is presented on display 12 that is separate from the mobile device 11. For example, the screen of mobile device 11 shows that the query 415D is "Nearest Health," and also provides instructions 435A indicating that the response (map) is presented on the display 12. In particular, the map 430 of the gaming environment for Horizon Dawn shows a current location "Aloy" and a marker 435B showing the closest health location. As such, the player may enter a query on one device and receive a response on another device.

Figure 4C:
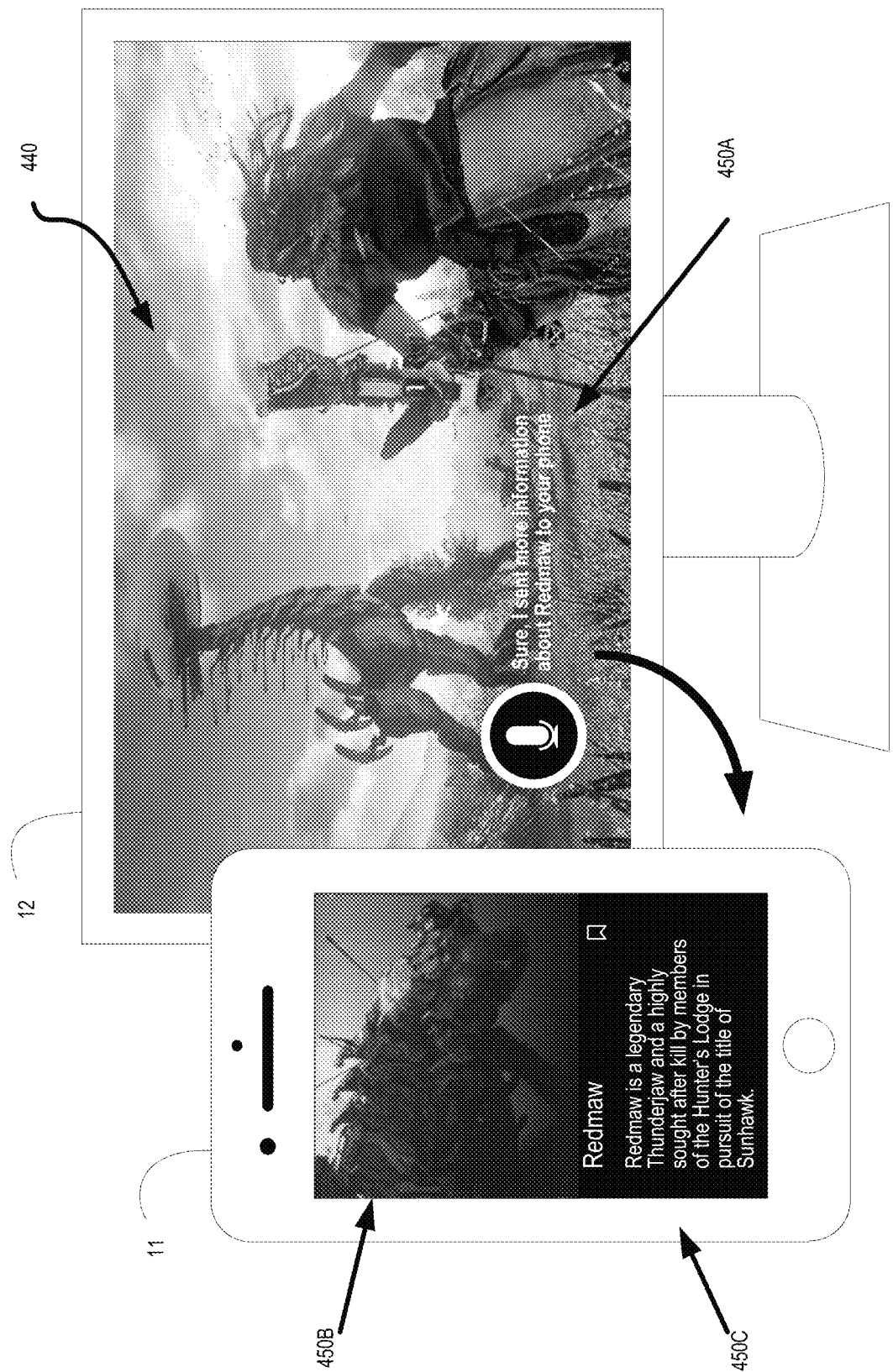
FIG. 4C illustrates the interaction between a companion mobile device of FIG. 4A configured to provide gaming assistance, and a display presenting game play of a player playing a gaming application and directing the player to the mobile device for requested information, in accordance with one embodiment of the present disclosure.

FIG. 4C illustrates the interaction between a companion mobile device of FIG. 4A configured to provide gaming assistance and a display 12 presenting game play of a player playing a gaming application and directing the player to the mobile device for requested information, in accordance with one embodiment of the present disclosure. In particular, a query may be entered by the player through selection of quick search button 420C ("Redmaw") on the companion mobile device 11 of FIG. 4A. The query may be entered through any other method, such as through a stand-alone speaker, or speaker connected to the gaming console, etc. In one embodiment, the query is entered through a speaker on display 12, or through a search box on display 12. The response to the query may also be presented on the screen of the companion mobile device 11. For example, image 450B shows a picture of a Redmaw, and window 450C provides accompanying information about the Redmaw: "Redmaw is a legendary Thunderjaw . . . ."

In addition, a pointer instruction may be provided on the display 12 that is showing the game play. For example, instruction 450A indicates that the response to the query is presented on the companion mobile device 11—"I sent more information about Redmaw to your phone." In that manner, if the player is preoccupied with the game play, the player is gently reminded that the response is on the companion mobile device 11. As such, the player may enter a query on one device and receive a response on another device.

Figure 4D:
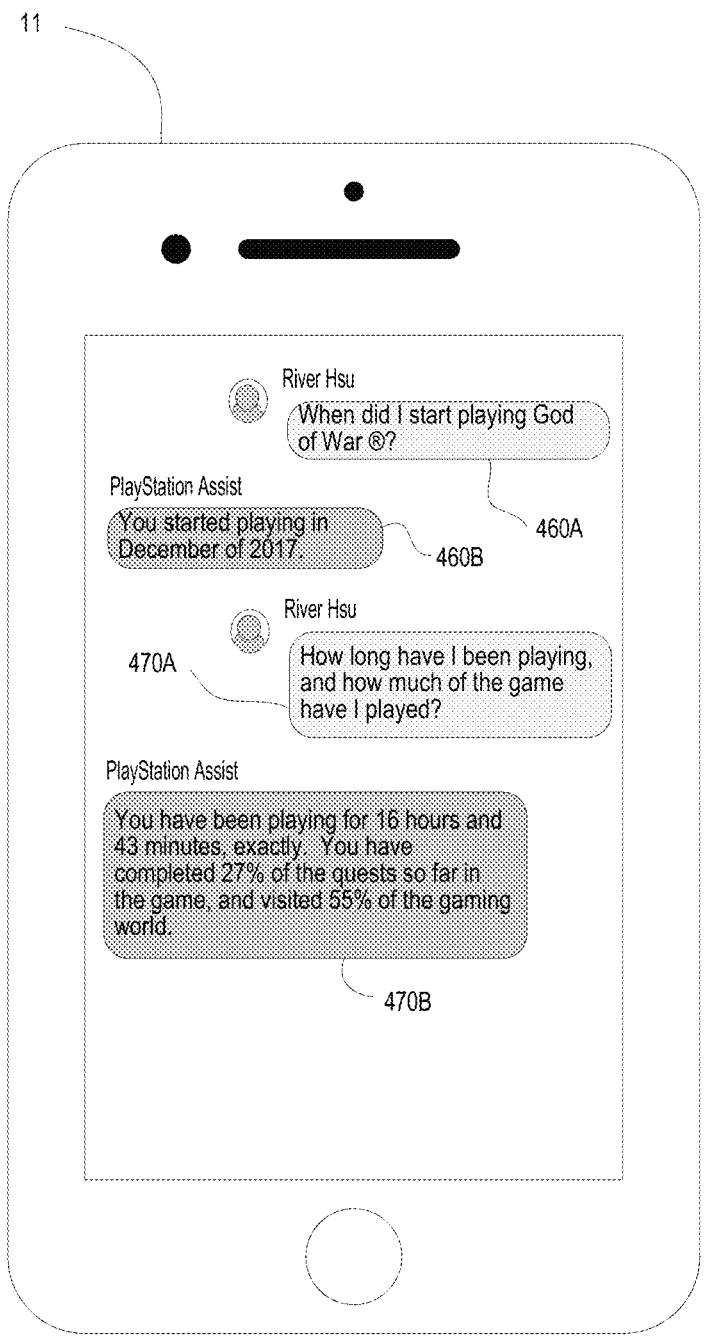
FIG. 4D illustrates a companion mobile device configured to provide gaming assistance to a user that is not currently playing a gaming application, but can present a query related to the gaming application to a back-end server for support, in accordance with one embodiment of the present disclosure.

FIG. 4D illustrates a companion mobile device configured to provide gaming assistance to a user that is not currently playing a gaming application, but can present a query related to the gaming application to a back-end server for support, in accordance with one embodiment of the present disclosure. For example, the user may be at work, or in the middle of traveling. The user may want some general information about a gaming application, or information related to social network friends playing one or more gaming applications, or may want to schedule a gaming session with one or more friends. Other more specific information may also be requested by the user. For example, the user—River Hsu—may initiate a help session with the game assist server through the mobile device 11 by speaking the trigger words, such as "Hey PlayStation" (not shown). In that manner, a gaming assistance application (e.g., PlayStation Assist) is launched or relaunched locally in anticipation of a query, wherein the gaming assistance application may provide the interfacing between remote devices. The user may then enter the query 460A (e.g., verbally through a microphone on the mobile device 11), which asks "When did I start playing God of War®. The query is then received and delivered to the back-end game assist server, which processes the query. For example, the back-end game assist server may implement a deep learning engine to match the query to an appropriate response given a current context. Since the query is presented outside of playing a gaming application, the context may not be overly sufficient, and as such, the query may require more fuller information, rather than just a generalized question. Because the query includes the title of the gaming application (e.g., God of War®), sufficient context is provided for matching the query. As such, based on information collected from the user throughout the user's game play of the gaming application (e.g., global and game contexts), a response may be matched and/or generated. For example, the response 460B may indicate that the user started playing the gaming application in December of 2017.

In addition, a follow on question is entered as a second query 470A, which asks how long has the user been playing, and how much of the game has the user completed. A response 470B is matched and/or generated by the game assist server, wherein the response indicates that the user has been playing for a total of approximately 16 hours and has completed approximately 27% of the tasks in the gaming application, and visited 55% of the gaming world (e.g., an open world environment).

Figure 4E:
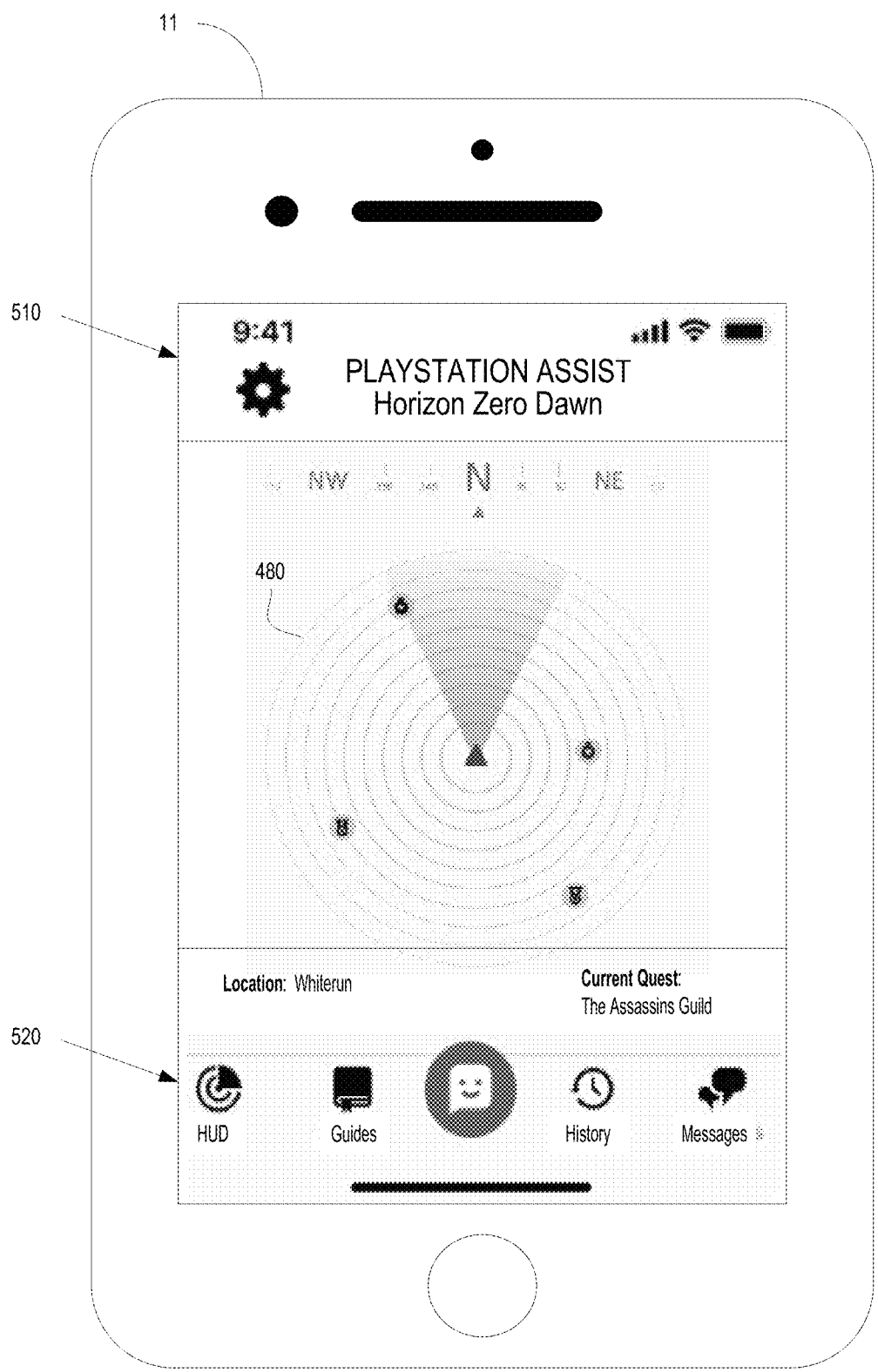
FIG. 4E illustrates a companion mobile device 11 configured to provide gaming assistance to a user in support of game play of a player, in accordance with one embodiment of the disclosure.

FIG. 4E illustrates a companion mobile device 11 configured to provide gaming assistance to a user in support of game play of a player, in accordance with one embodiment of the disclosure. The user interface of mobile device 11 includes a header 510 that indicates that the game play is for the gaming application Horizon Zero Dawn®, and that the information provided is from the PlayStation Assist application. A footer region 520 includes links to various features provided by the PlayStation Assist, such as a heads up display feature (HUD), a link to guides, a link to the history of queries and responses, and a link to messaging. For example, the player may be playing in a particular location of a gaming environment of the gaming application, and enters a query asking for locations of potions and battles. The back-end game assist server processes the query using a current context of the game play through a deep learning engine. A response may be generated to include a map of the gaming environment, including a center location showing the character of the player within the gaming environment. In addition, locations of potions and battles are presented with respect to the location of the character of the player.

Figure 5A:
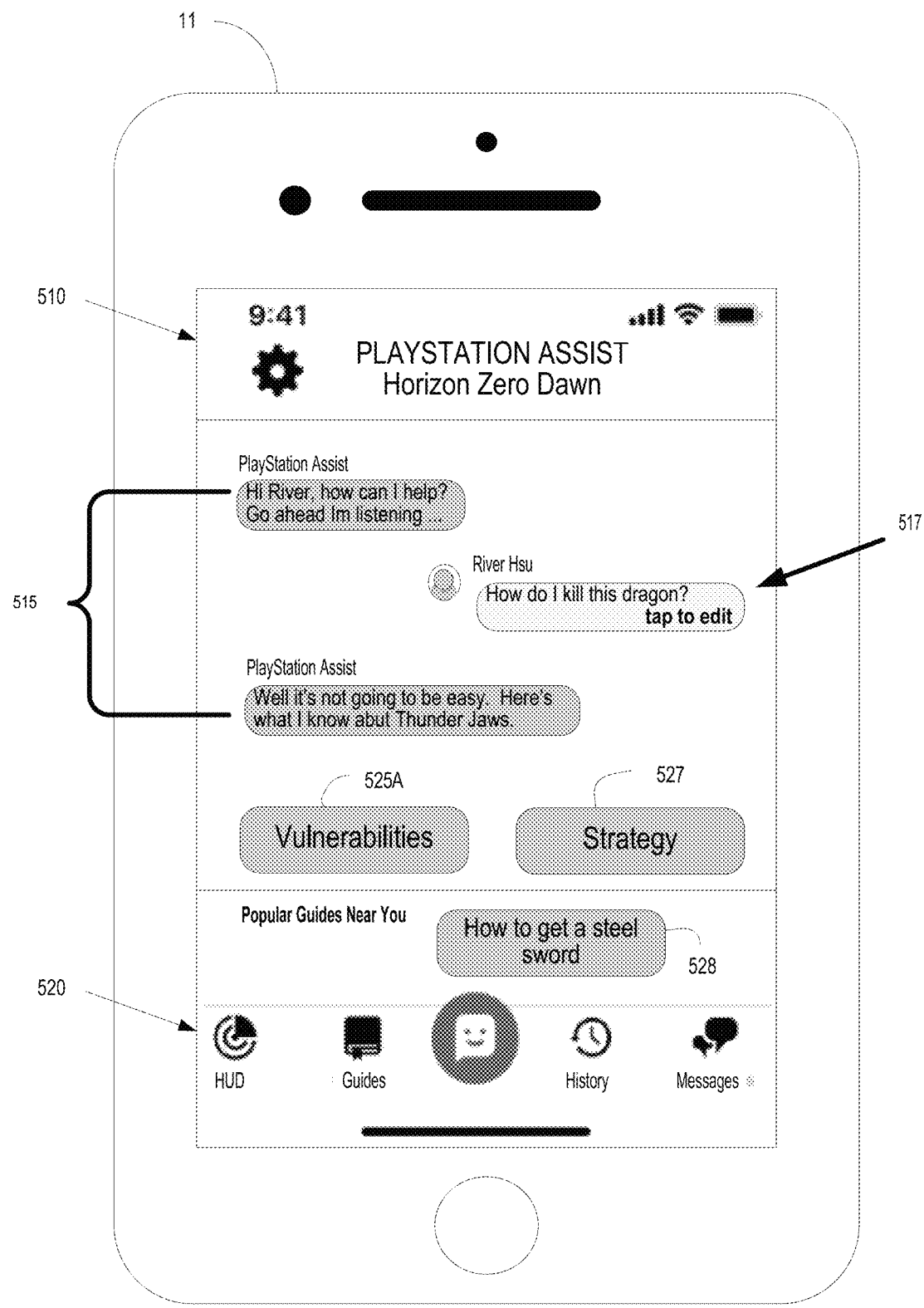
FIGS. 5A-5B illustrate the use of a companion mobile device for gaming assistance related to a game play of a gaming application presented on a separate display, in accordance with one embodiment of the present disclosure.
Figure 5B:
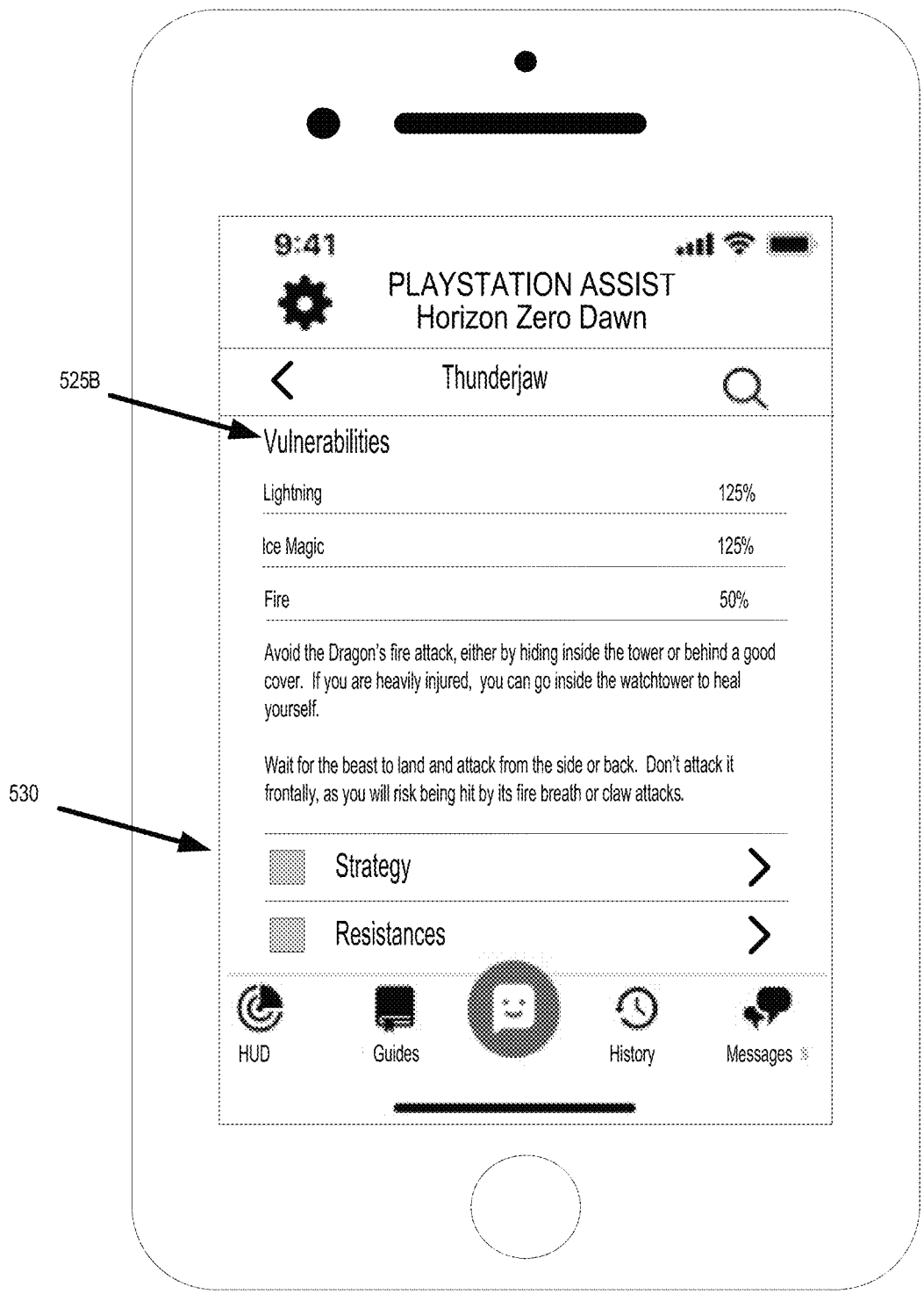

FIGS. 5A-5B illustrate the use of a companion mobile device 11 for gaming assistance related to a game play of a gaming application presented on a separate display, in accordance with one embodiment of the present disclosure. In particular, the screen shot of the mobile device 11 includes a header 510 that indicates that the game play is for the gaming application Horizon Zero Dawn®, and that the information provided is from the PlayStation Assist application, and includes a footer region 520 that includes links to various features provided by the PlayStation Assist, such as a heads up display feature (HUD), a link to guides, a link to the history of queries and responses, and a link to messaging. Header 510 and footer region 520 may be shown in user interfaces of FIGS. 6-7. The player—River Hsu—has already triggered the PlayStation Assist application, such as through a trigger word, as previously described. As such, communication 515 from the PlayStation Assist indicates that the application is ready to accept queries from the player. The player is playing the gaming application, wherein the game play may be presented on a separate display. As such, the query may be in support of the game play. In particular, the query 517 by the player asks "How do I kill this dragon?" Because the query is entered with context data (including game context and global context data), the query can be matched to an appropriate response. The game assist server through the PlayStation Assist application generates a response, such as through a deep learning engine process. For example, the response is introduced by communication 515 from the PlayStation Assist indicating that information is available, either by selecting button 525A to obtain information about vulnerabilities of the dragon, or by selecting button 527 to obtain information about strategies for defeating the dragon. In addition, given the game context of the game play (e.g., current location of a character of the player), the PlayStation Assist may present "guides" to help the player through difficulties presented that are close in time or location to the game play (e.g., providing a heads up to what is coming up, or providing some tips). For example, button 528 provides access to a guide that explains how to get a steel sword.

Player—River Hsu—may select the vulnerabilities button 525A to obtain more information. As shown in FIG. 5B, the heading 525B shows vulnerabilities of the Thunderjaw dragon. Additional information may also be provided providing tips on how to fight the dragon. Furthermore, if the player wants more information relating to the Thunderjaw dragon, buttons 530 provide links to "strategy" which provides tips on how to beat the dragon, and "resistances" that provide information on how strong the dragon is in certain areas, which may provide information on how to beat the dragon.

Figure 6A:
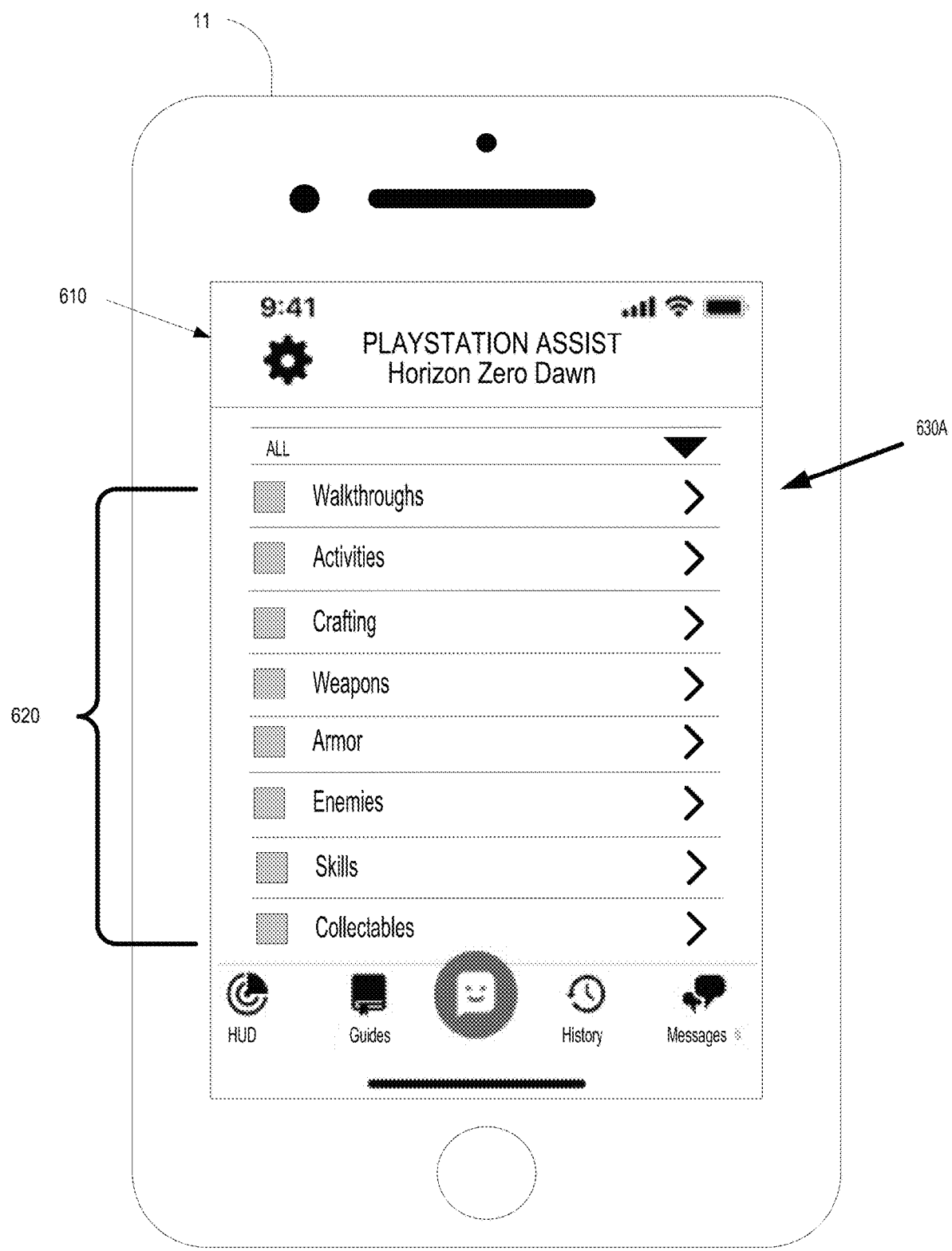
FIGS. 6A-6G illustrate the use of a companion mobile device for gaming assistance related to a game play of a gaming application presented on a separate display to navigate through a series of connected layers of information provided in response to a query, in accordance with one embodiment of the present disclosure.

FIGS. 6A-6G illustrate the use of a companion mobile device for gaming assistance related to a game play of a gaming application presented on a separate display to navigate through a series of connected layers of information provided in response to a query, in accordance with one embodiment of the present disclosure. In particular, as shown in each of the figures screen shots of the mobile device 11 includes a header 510 that indicates that the game play is for the gaming application Horizon Zero Dawn®, and that the information provided is from the PlayStation Assist application. A footer region 520 includes links to various features provided by the PlayStation Assist, as previously described. Various categories of information are provided to the player, each accessible through a link or corresponding button as is shown in FIG. 6A. For example, button 630A provides access to walkthroughs for the gaming application, which when selected provides access to a tree of information related to walkthroughs, as provided in FIGS. 6A-6G.

Figure 6B:
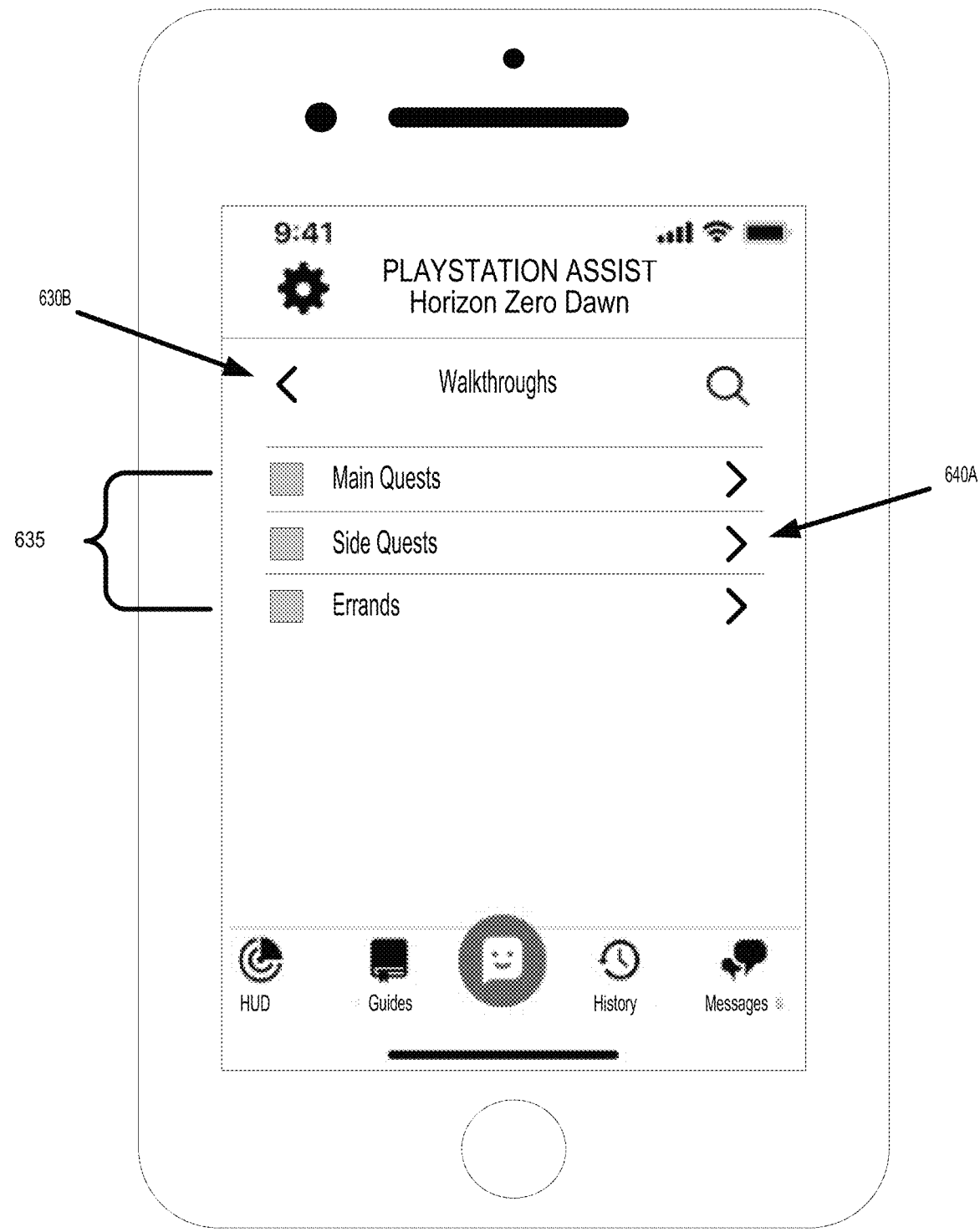
Figure 6C:
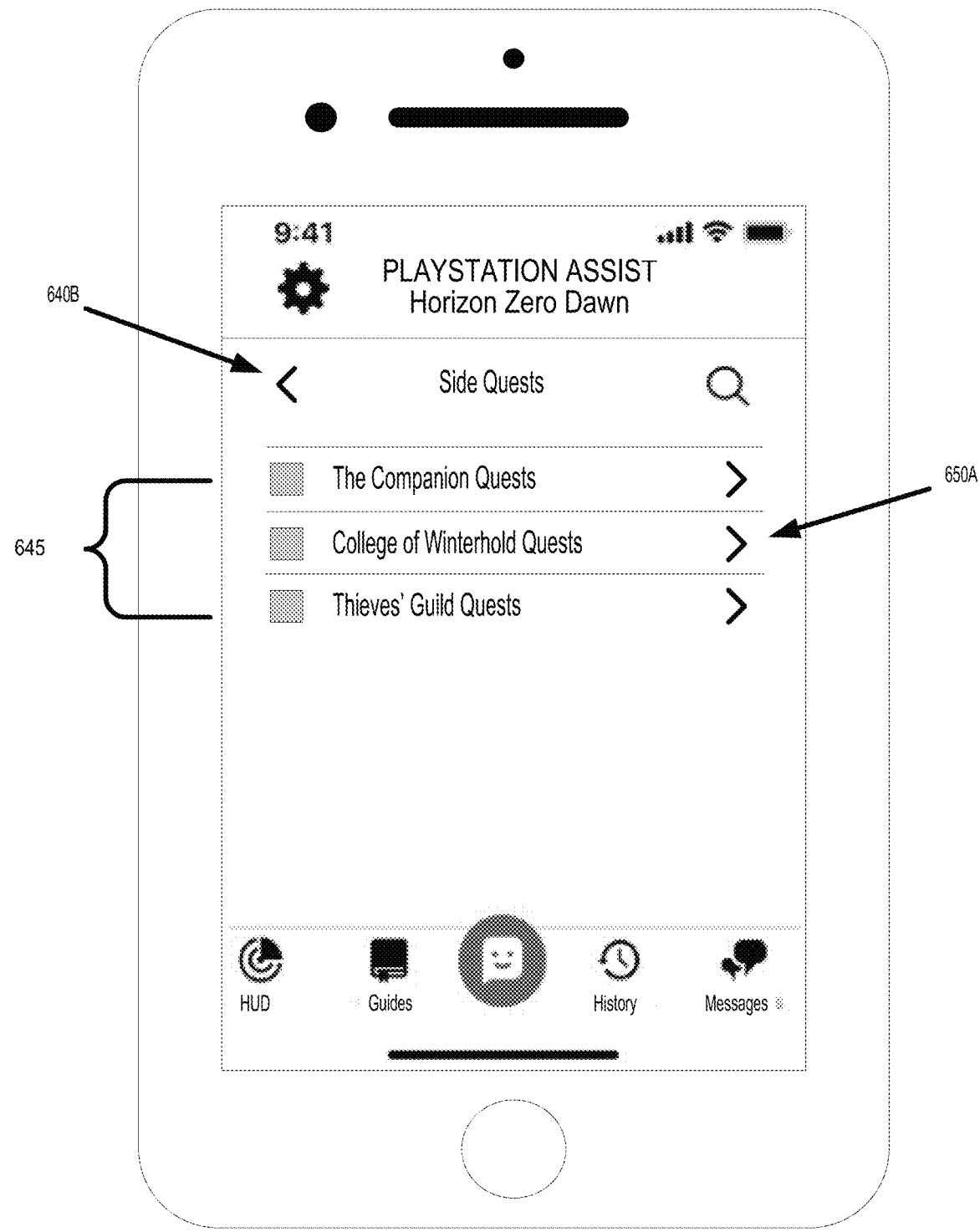

FIG. 6B shows one or more walkthroughs on a screen shot of the mobile device 11, after selection of button 630A of FIG. 6A. Button 630B is a back button that returns the user to the screen of FIG. 6A. As shown, walkthroughs 635 include a main quests walkthrough, a side quest walkthrough (selectable through button 640A), and an errands walkthrough, each of which is selectable through a corresponding button. At another layer, FIG. 6C shows one or more side quests and their walkthroughs after selection of button 640A in FIG. 6B. As shown, side quests 645 include a Companion side quest, a College of Winterhold side quest (selectable through button 650A), and a Thieves' Guild side quest, each of which is selectable through a corresponding button. Back button 640B returns the player back to the user interface of FIG. 6B.

Figure 6D:
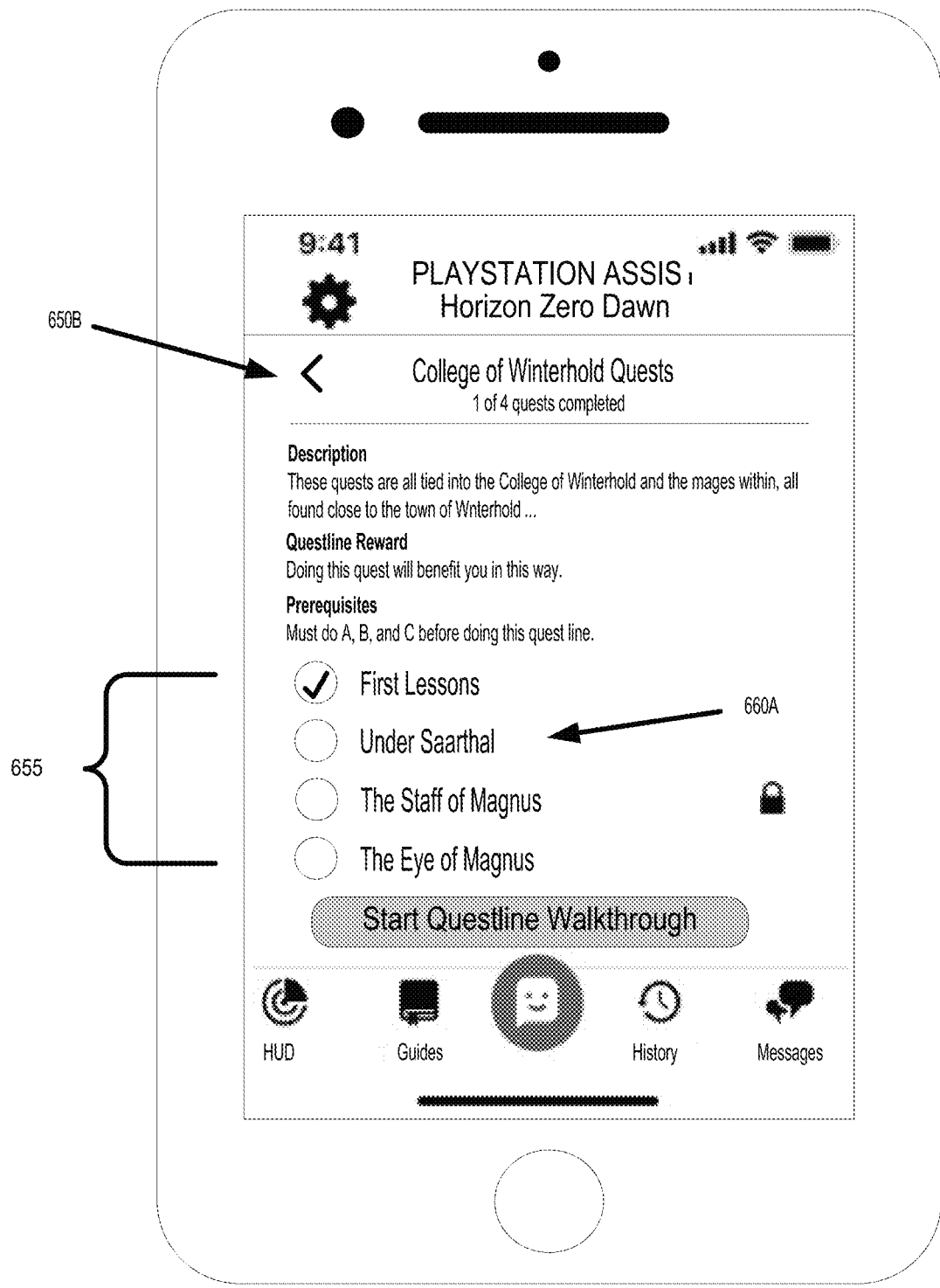
Figure 6E:
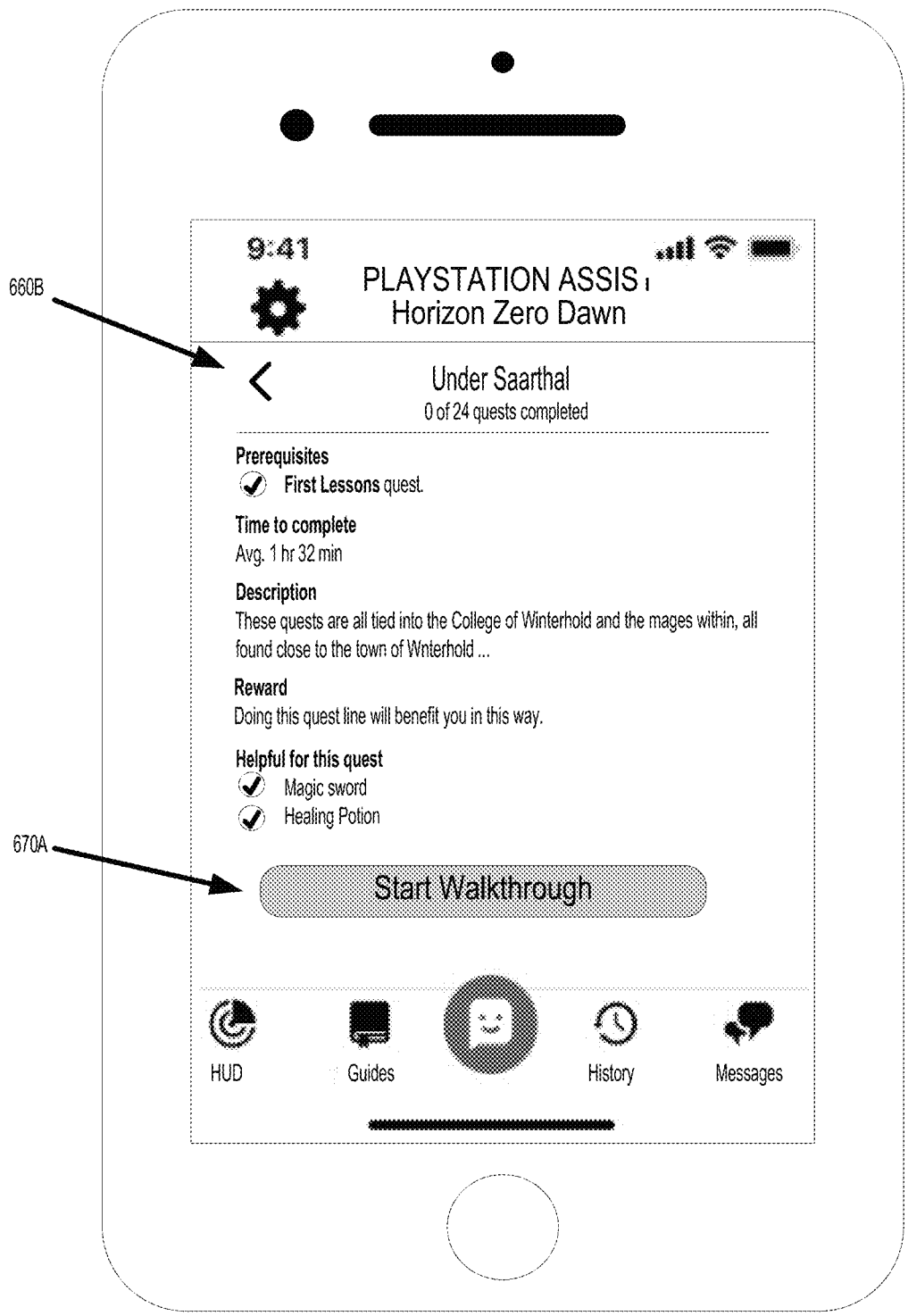

At another layer, FIG. 6D shows the walkthrough for the College of Winterhold side quest, wherein button 650B returns player to user interface shown in FIG. 6C. In particular, step-by-step procedures are provided in section 655, including First Lessons (completed), Under Saarthal (selectable through button 660A), etc., each of which is selectable through a corresponding button. At another layer, FIG. 6E shows the particular walkthrough for the "Under Saarthal" step, after selection of button 660A), wherein button 660B returns the player back to the user interface provided in FIG. 6D. General information is provided including how long it should take to accomplish this step, and what reward is obtained after completing this step. Button 670A launches the walkthrough.

Figure 6F:
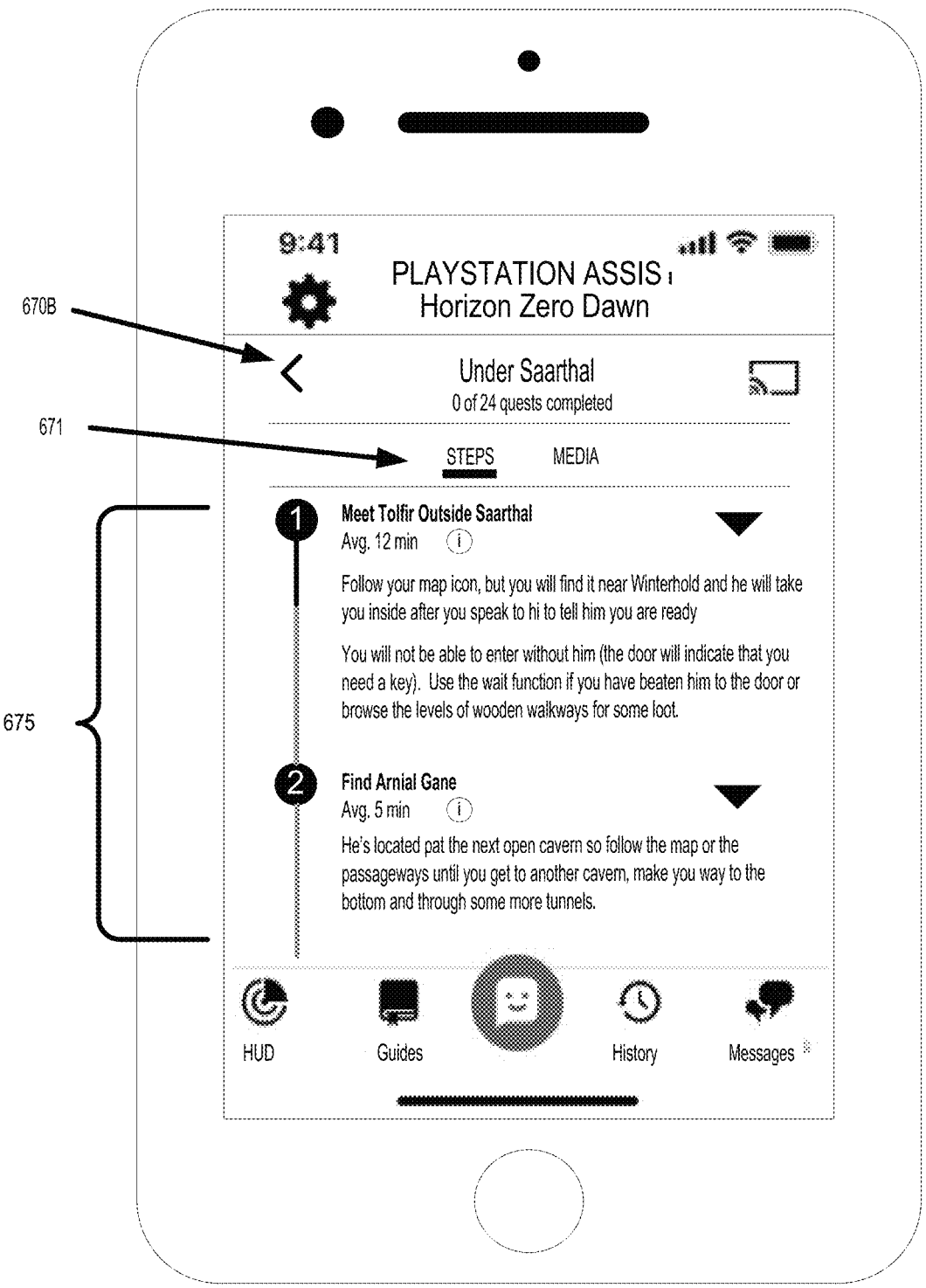
Figure 6G:
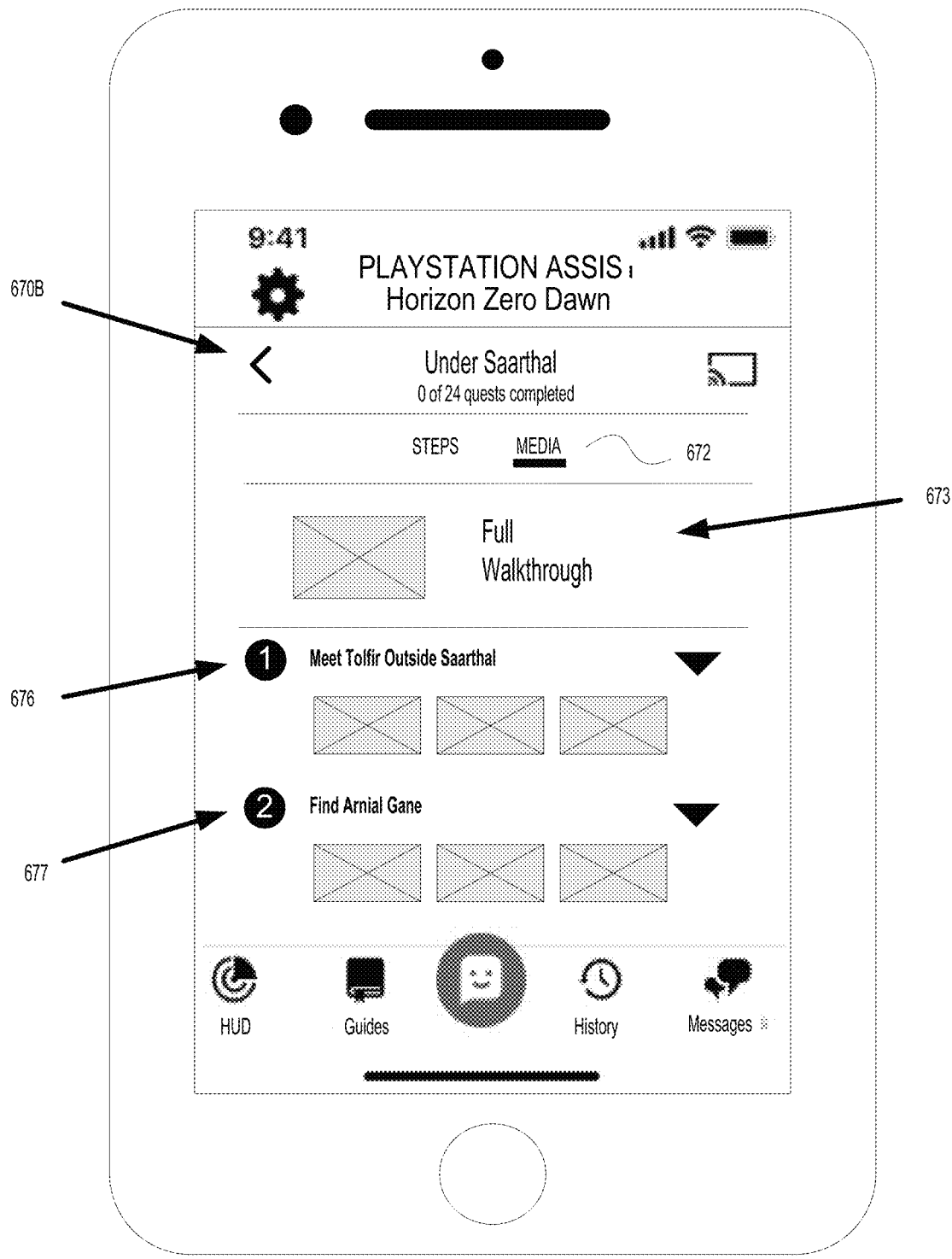

At another layer, FIG. 6F shows the individual actions required to be performed in the "Under Saarthal" step and its walkthrough. FIG. 1 shows the section of "STEPS" 671 to access step information. For example, step 1 of the walkthrough is shown (meet Tolfir), and step 2 is also shown (find Arnial). Additional parts may be shown to the player upon request (e.g., scroll down). At another layer, FIG. 6G shows the selection of "MEDIA" 672 in FIG. 6F to access option for viewing the walkthroughs. For example, a full walkthrough is accessible through envelope 673, wherein that envelope may be mailed to a separate device. Specific steps, or sub-steps also may be accessible for each step of the walkthrough. As shown, for step 1 (meet Tolfir), one or more sub-steps may be accessed through mailed envelopes (e.g., digital), and one or more sub-steps may be accessed for step 2 (find Arnial) through mailed envelopes.

Figure 7:
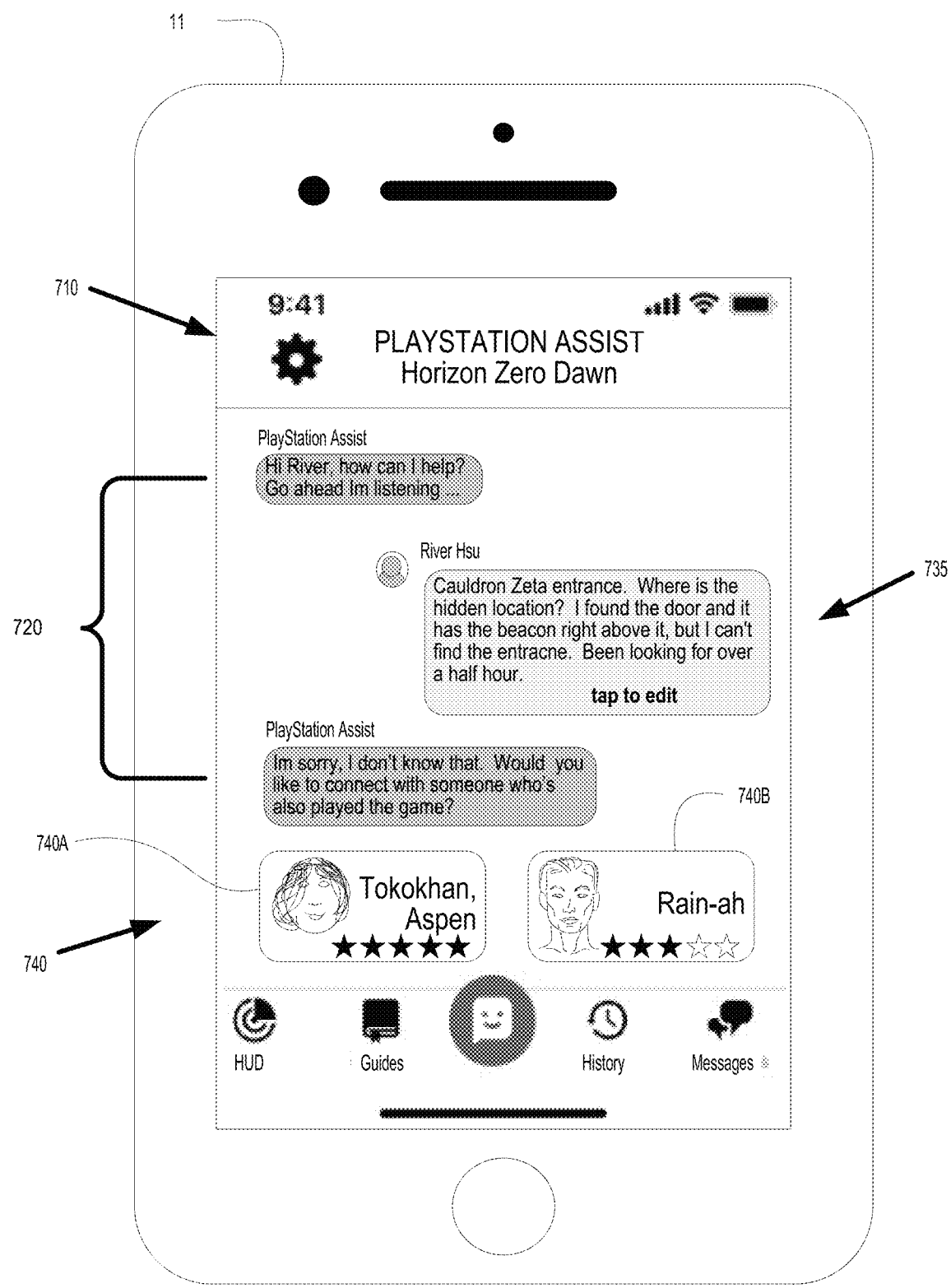
FIG. 7 illustrates the use of a companion mobile device for gaming assistance related to a player's game play of a gaming application presented on a separate display, wherein an option is presented to connect the player to an expert over a communication session, in accordance with one embodiment of the present disclosure.

FIG. 7 illustrates the use of a companion mobile device 11 for gaming assistance related to a player's game play of a gaming application presented on a separate display, wherein an option is presented to connect the player to an expert over a communication session, in accordance with one embodiment of the present disclosure. In particular, screen shot of the mobile device 11 includes a header 510 that indicates that the game play is for the gaming application Horizon Zero Dawn®, and that the information provided is from the PlayStation Assist application, and a footer region 520 providing links to various features provided by the PlayStation Assist, as previously described.

The player—River Hsu—has already triggered the PlayStation Assist application, such as through a trigger word, as previously described. As such, communication 720 from the PlayStation Assist indicates that the application is ready to accept queries from the player. The player is playing the gaming application, wherein the game play may be presented on a separate display. As such, the query may be in support of the game play. In particular, the query 735 by the player asks for information about how to find the "Cauldron Zeta entrance."

The PlayStation Assist application as supported through a game assist server is unable to match the query to a modeled or generated response. Communication 720 from the PlayStation Assist application indicates that no response is available. However, an expert is available for a live help session, should the player wish to accept that form of help.

For example, the PlayStation Assist application may connect the player to expert Aspen Tokokhan (5 star rating) through button interface 740A, or to expert Rain-ah (3 star rating) through button interface 740B. Selection of an expert for presentation as an option was previously described, and may involve matching a current context (e.g., global and/or game contexts) of the player to similar contexts of experts who preferably have played the game.

FIGS. 8A-8G illustrate the use of a display presenting a player's game play of a gaming application and the navigation through a series of connected layers of information provided in response to a query to acquire an asset, in accordance with one embodiment of the present disclosure. In particular, FIGS. 8A-8G show an acquire intent process, wherein the player is requesting information about how to obtain an asset, for example. The information may be generated and/or matched through a game assist server, such as through the PlayStation Assist application, and provided in a window of a display that is also showing a video/image of the game play, as previously described. As shown, the player is playing a gaming application, such as Skyrim®. The queries and responses shown in FIGS. 8A-8G relate to the gaming application.

Figure 8A:
FIGS. 8A-8G illustrate the use of a display presenting a player's game play of a gaming application and the navigation through a series of connected layers of information provided in response to a query to acquire an asset, in accordance with one embodiment of the present disclosure.
Figure 8B:
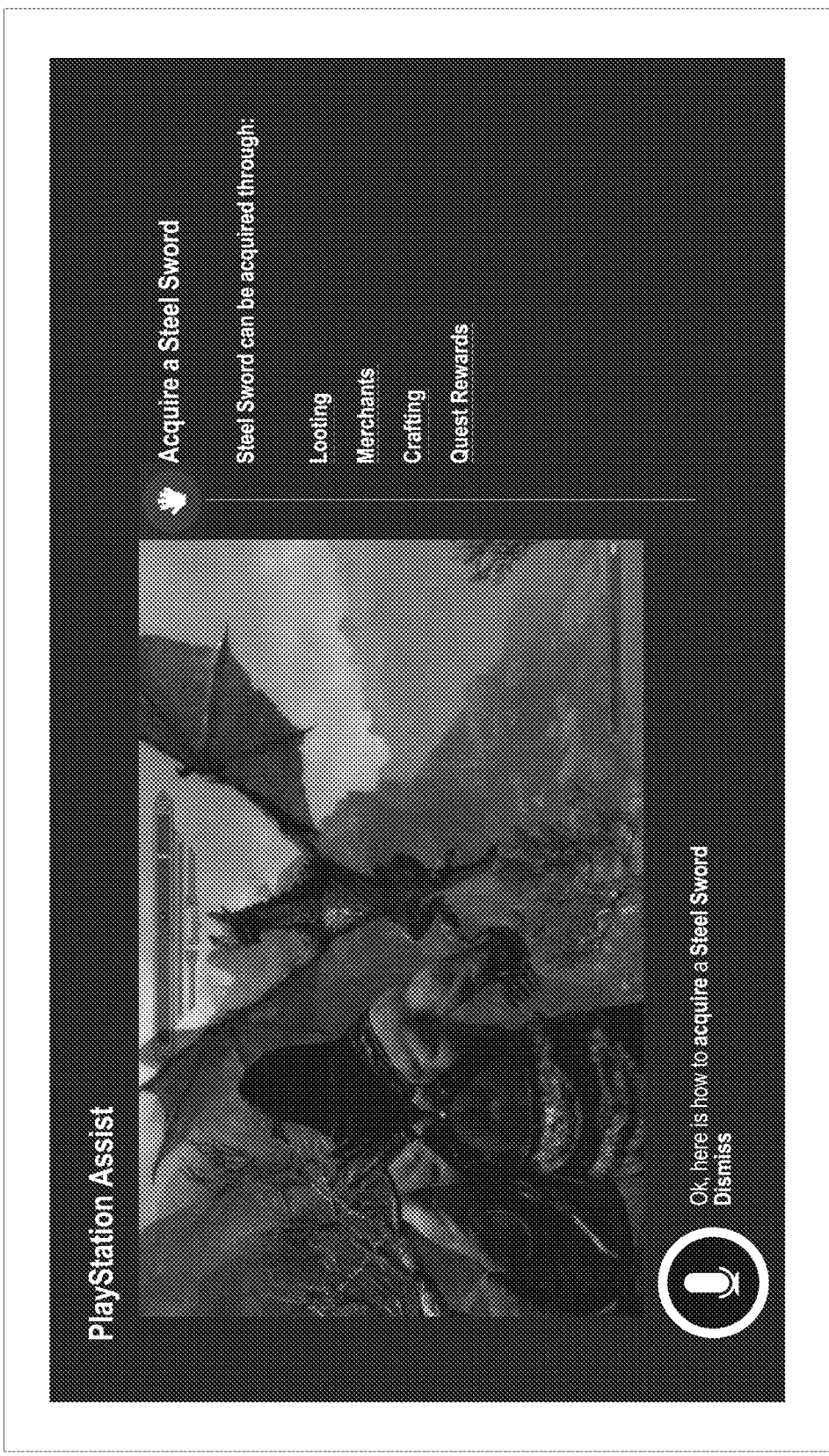
Figure 8B:
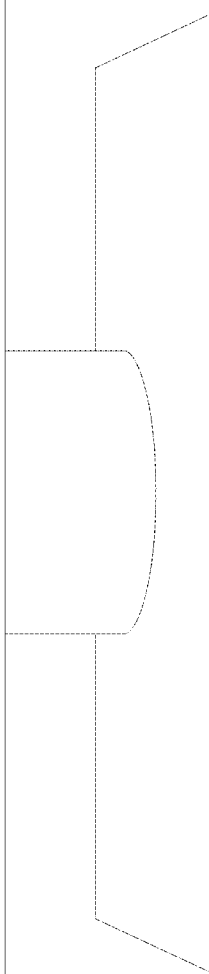

In particular, FIG. 8A shows a window presenting the Skyrim emblem (e.g., a flying dragon). The game play of the player is also shown in a different window (e.g., character approaching a flying beast). The game assist feature is available to the user, wherein the player may enter queries through a microphone, as shown by microphone icon 410. The player is shown triggering the PlayStation Assist application, such as through a trigger word "Hey PlayStation." The query entered relates to information about obtaining a steel sword. After matching the query to an appropriate response, for example given the context of the gaming application to include global context, gaming context, and current gaming context, the game assist server supporting the PlayStation Assist application may match the query to a response. The response is shown in FIG. 8B, wherein information about how to acquire a steel sword is shown. For example, the steel sword can be acquired through various techniques, including looting, through merchants, crafting, and through finishing quests.

Figure 8C:
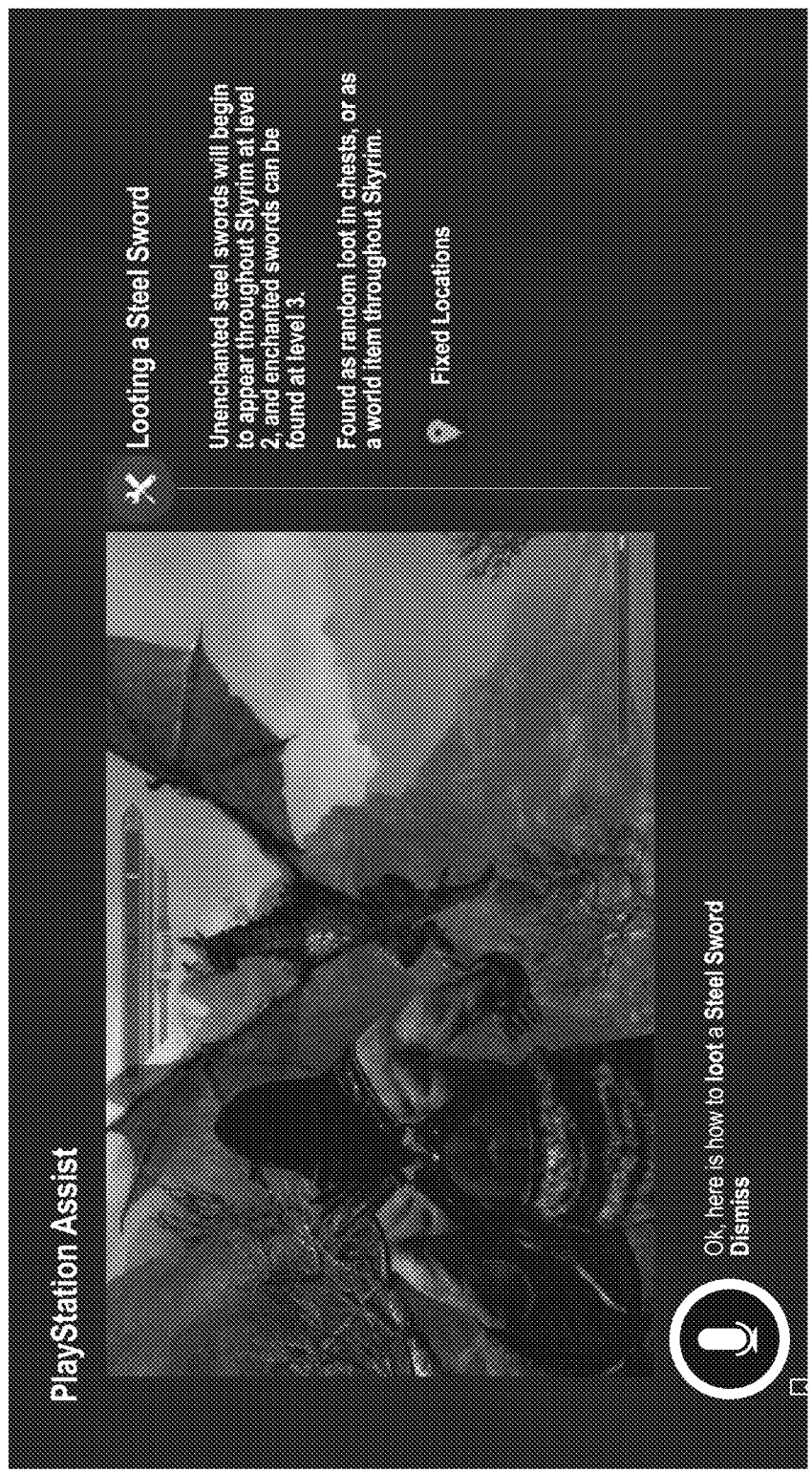
Figure 8C:
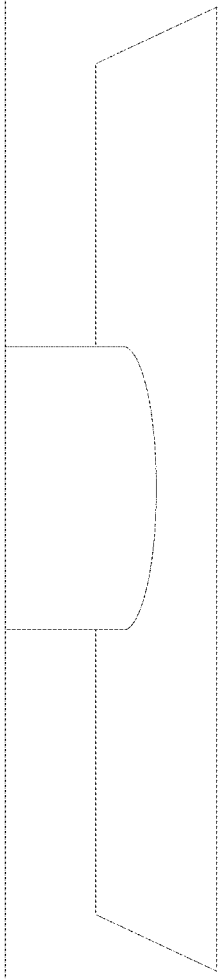
Figure 8D:
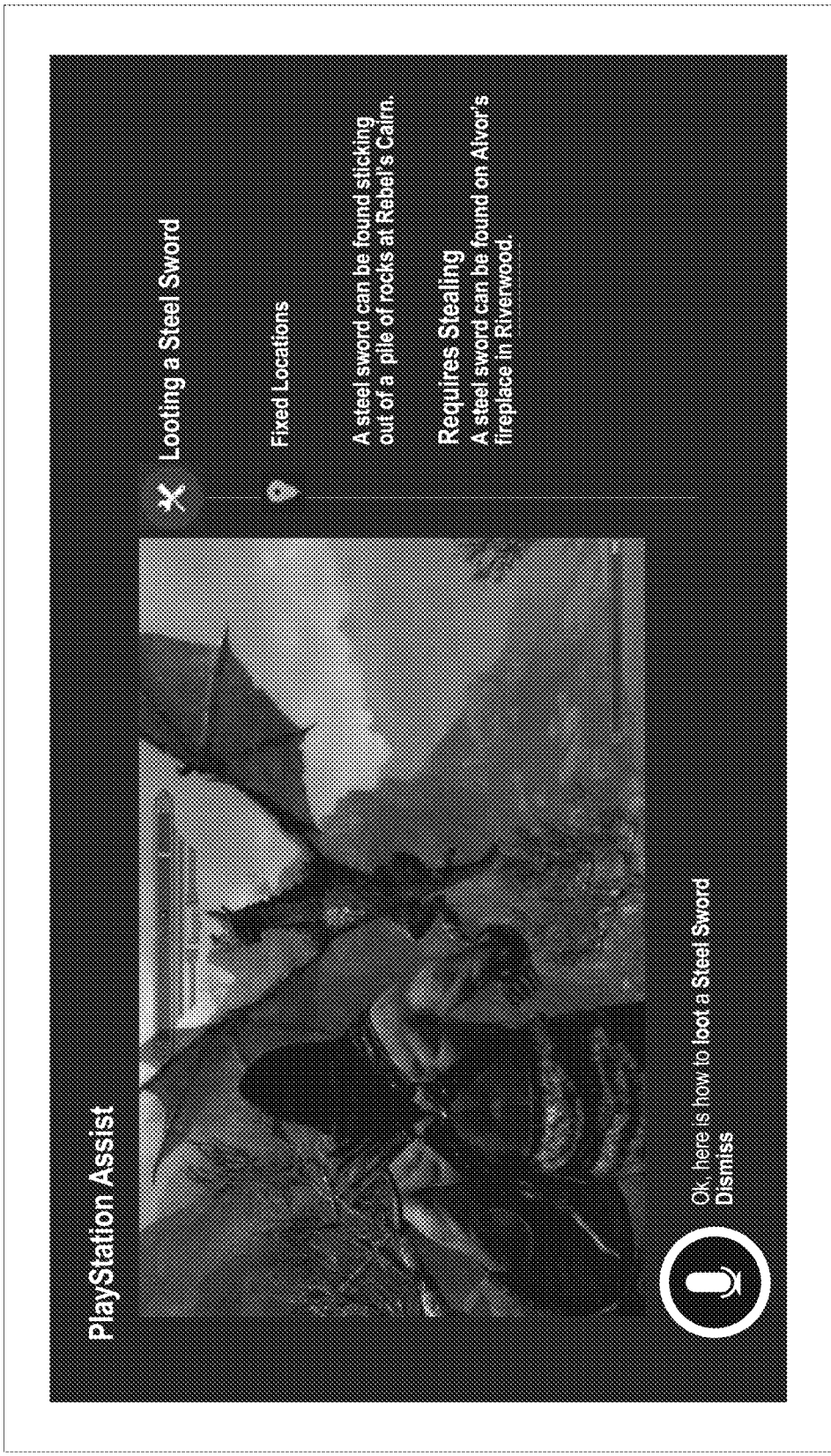
Figure 8D:
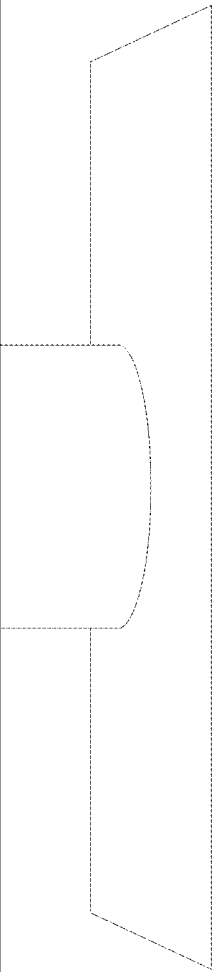

The player may make a follow-on or supplementary request that supplements the initial query. For instance, the player may make a query (e.g., verbal) asking how to loot a steel sword. FIG. 8C shows the game assist server supporting the PlayStation Assist application presenting a response to the follow-on query. The game assist server may perform matching through application of a deep learning engine to match the query to an appropriate response. For example, in FIG. 8C information on how to loot the sword may include locations where the sword may be found, such as in treasure chests at various levels. An option for obtaining more information about fixed locations where a sword can be looted is provided in FIG. 8C. After selection, specific loot locations are provided in FIG. 8D to include a rock cairn or Alvor's fireplace.

Figure 8E:
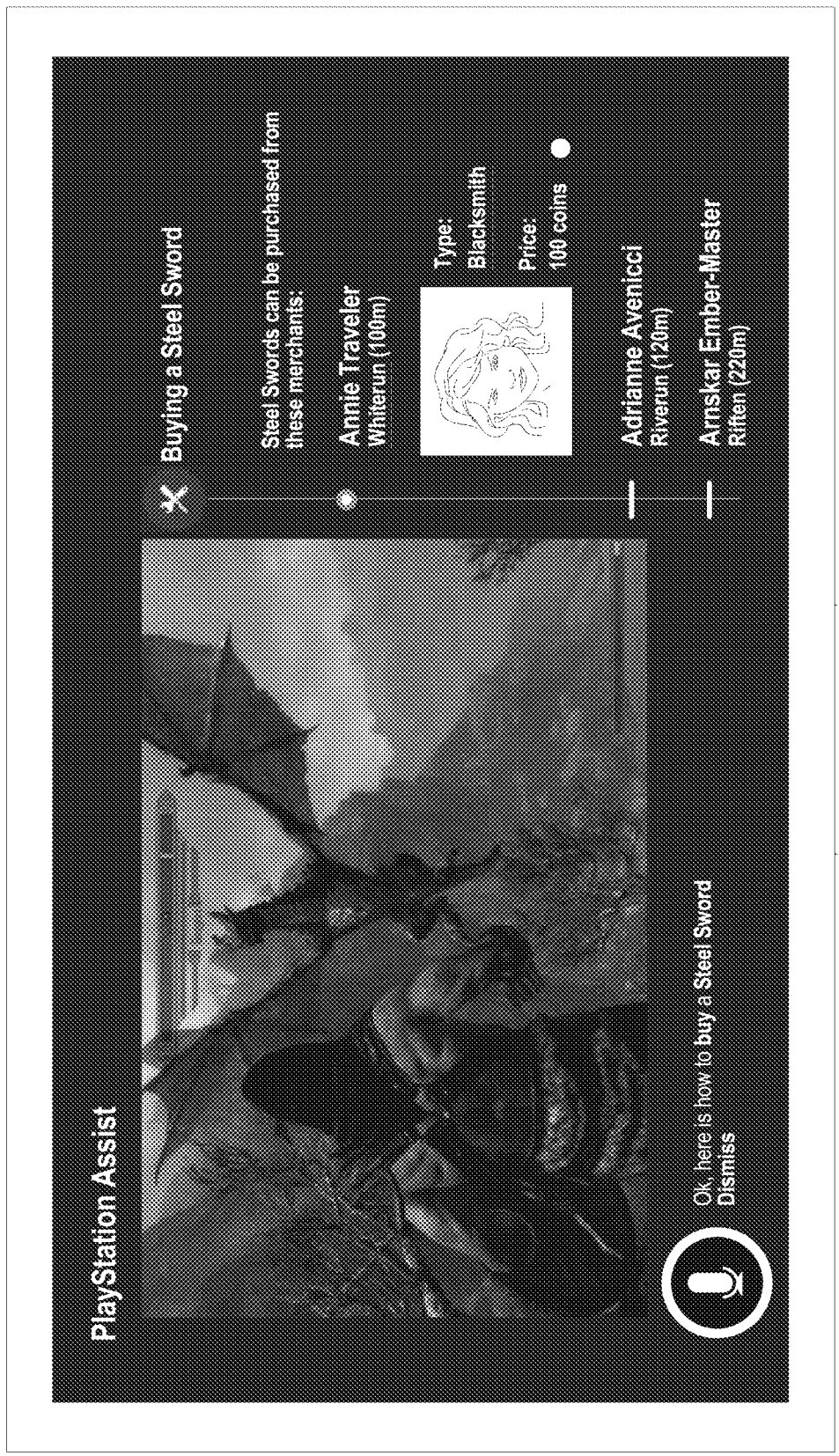

FIG. 8E illustrates a response presented in association with another follow-on or supplementary request based on the initial query, or intermediate queries. For instance, the player may make a query (e.g., verbal) asking how to purchase a steel sword. Information about merchants selling the sword is provided, and includes the closest merchant, Annie Traveler in the town of Whiterun, and the price of the sword—100 coins. Other merchants are shown including Adrianne Avenicci, and Arnskar Ember-Master.

Figure 8F:
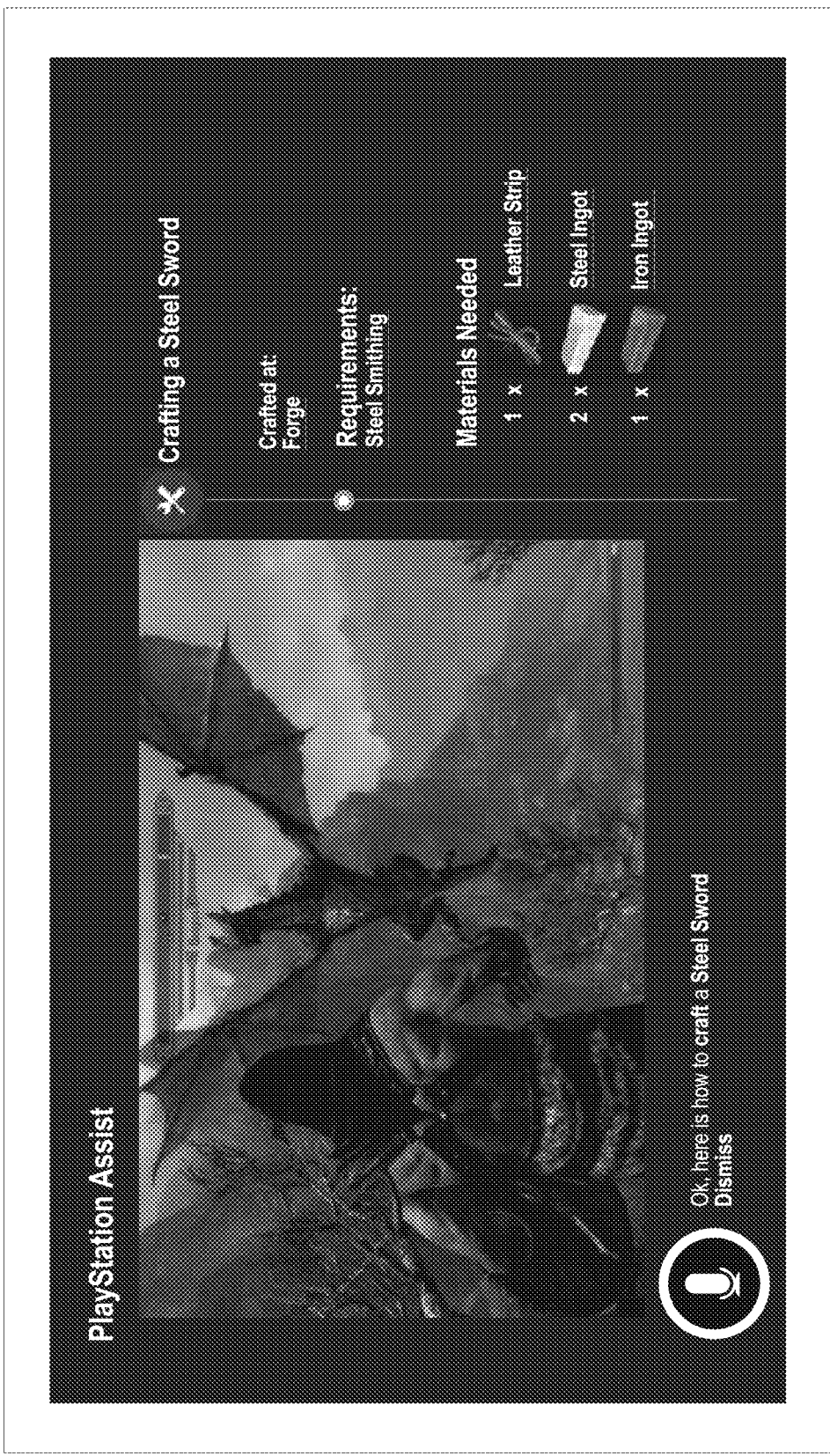
Figure 8F:
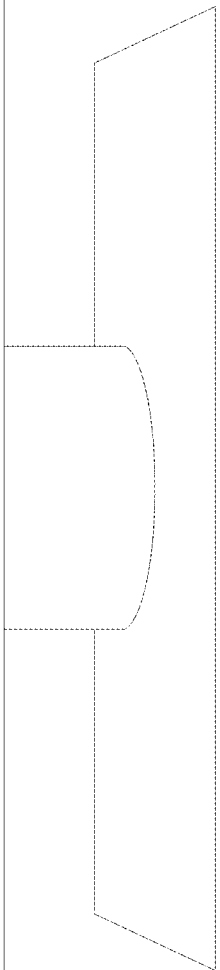

The player may make a follow-on or supplementary request that supplements the initial query. For instance, the player may make a query (e.g., verbal) asking how to craft a steel sword. FIG. 8F shows the game assist server supporting the PlayStation Assist application presenting a response to the follow-on query, such as through matching to a modeled response as implemented through deep learning. Information about how to craft the sword includes materials needed, and the location to build the sword—at the forge.

Figure 8G:

FIG. 8G illustrates a response presented in association with another follow-on or supplementary request based on the initial query, or intermediate queries. For instance, the player may make a query (e.g., verbal) asking how to obtain a steel sword through quests. Information about one or more quests that provide rewards of a steel sword are provided, to include the Wolf Queen Awakened quest, and the Laid to Rest quest. Walkthroughs for each of the quests may be accessed through links, as is shown.

Figure 9A:
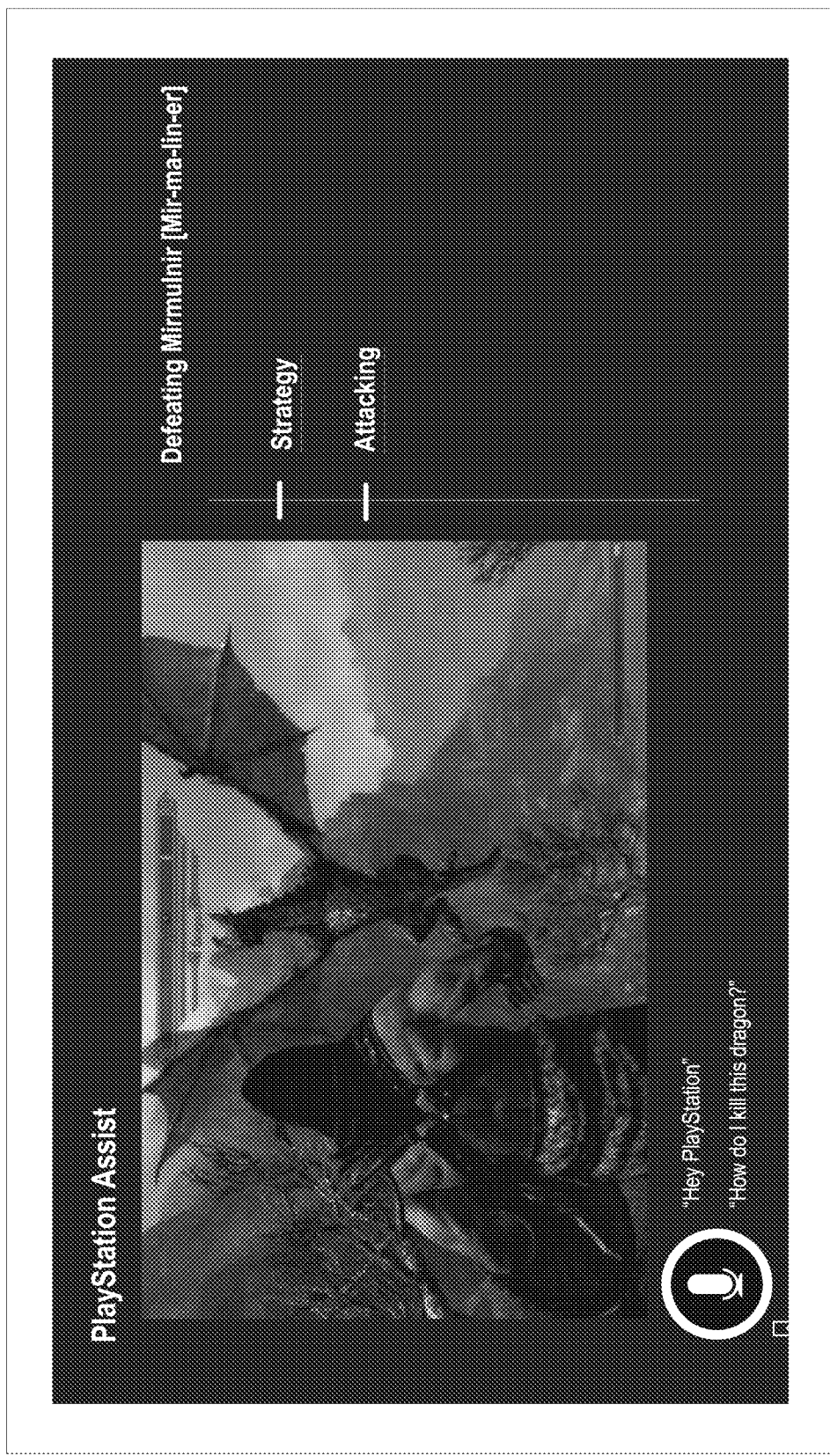
FIGS. 9A-9C illustrate the use of a display presenting a player's game play of a gaming application and the navigation through a series of connected layers of information provided in response to a query to defeat an opponent, in accordance with one embodiment of the present disclosure.
Figure 9B:
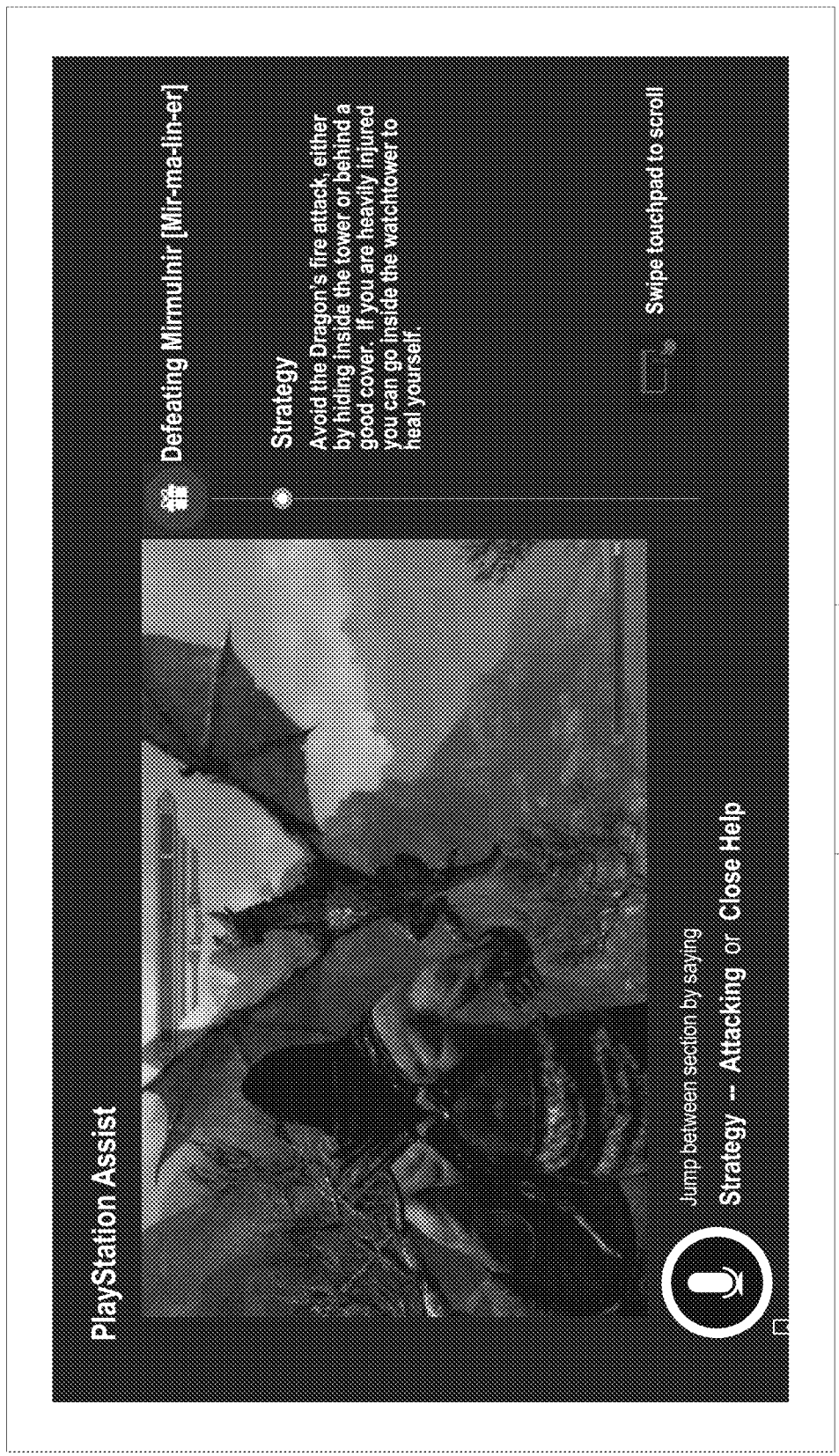
Figure 9B:
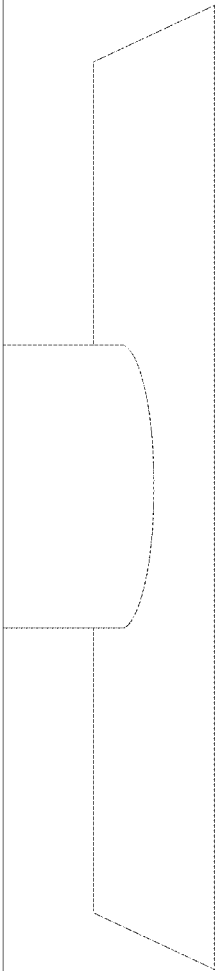
Figure 9C:

FIGS. 9A-9C illustrate the use of a display presenting a player's game play of a gaming application and the navigation through a series of connected layers of information provided in response to a query requesting information on how to defeat an opponent, in accordance with one embodiment of the present disclosure. In particular, FIGS. 8A-8G show a defeat intent process, wherein the player is requesting information about how to defeat a beast or opponent, for example. The information may be generated and/or matched through a game assist server, such as through the PlayStation Assist application, as previously described. As shown, the player is playing a gaming application, such as Skyrim®. The queries and responses shown in FIGS. 9A-9C relate to the gaming application.

In particular, FIG. 9A shows a window presenting the game play of the player (e.g., character approaching a flying beast—the dragon Mirmulni). The game assist feature is available to the user, wherein the player may enter queries through a microphone, as shown by microphone icon 410. The player is shown triggering the PlayStation Assist application, such as through a trigger word "Hey PlayStation." The query entered relates to information about defeating a dragon (Mirmulni) shown in the game play. After matching the query to an appropriate response, for example given the context of the gaming application to include global context, gaming context, and current gaming context, the game assist server supporting the PlayStation Assist application may match the query to a response. The response is shown in FIG. 9A, wherein information about how to defeat the dragon Mirmulni is shown. For example, two sections/categories of information can be accessed on learning about how to defeat the dragon, including a strategy category and an attacking category.

The player may select the strategy category (e.g., verbally). Information about a good strategy to use when battling the dragon Mirmulni is shown, and incudes helpful tips (e.g., hiding to recover health, etc.). In addition, FIG. 9B shows that the player can jump between sections by stating the name of the requested section (e.g., either Strategy, or Attacking). In addition, the player can close the PlayStation Assist application at any time by stating "close help."

FIG. 9C includes information under the attacking section which is provided in response to the player selecting that category (e.g., through verbal instruction) in a query. The information for attacking includes a melee attack (e.g., attack for side), using magic (e.g., avoid fire spells), and information about bow and arrow weaponry (shoot when the dragon is landing).

FIGS. 10A-10D illustrate the use of a display presenting a player's game play of a gaming application and the navigation through a series of connected layers of information provided in response to a query to find an object or location, in accordance with one embodiment of the present disclosure. In particular, FIGS. 10A-10D show a find intent process, wherein the player is requesting directions to a location, for example. The information may be generated and/or matched through a game assist server, such as through the PlayStation Assist application, as previously described. As shown, the player is playing a gaming application, such as Skyrim®. The queries and responses shown in FIGS. 10A-10D relate to the gaming application.

Figure 10A:
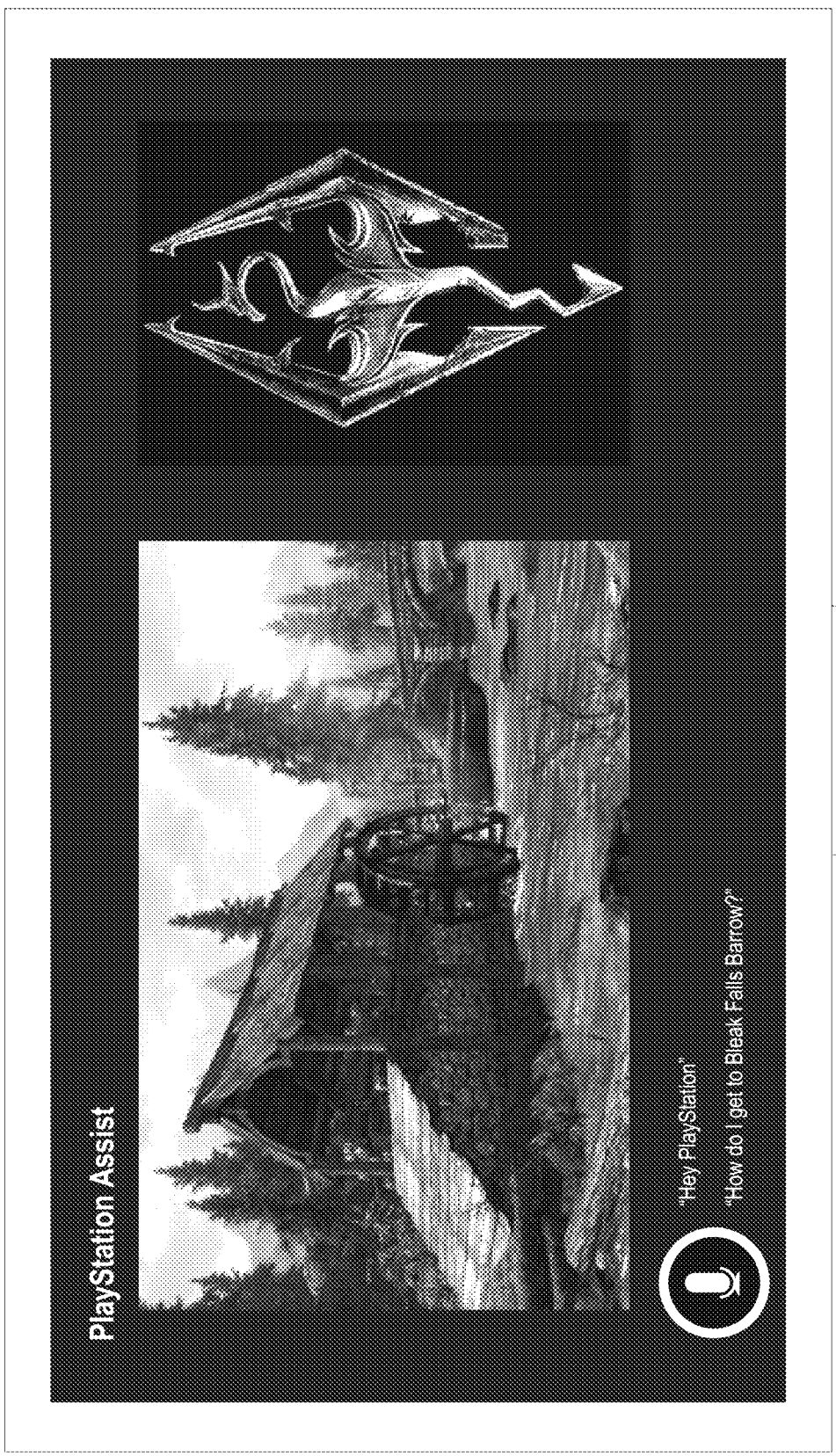
FIGS. 10A-10D illustrate the use of a display presenting a player's game play of a gaming application and the navigation through a series of connected layers of information provided in response to a query to find an object or location, in accordance with one embodiment of the present disclosure.
Figure 10A:
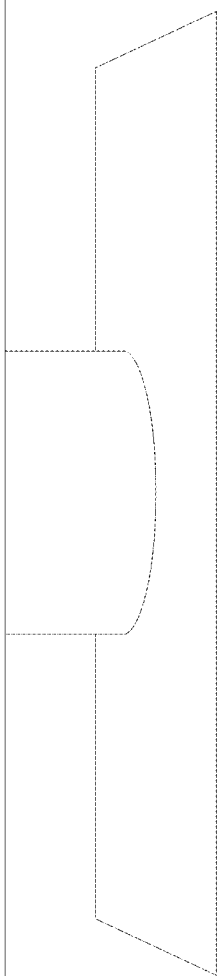

In particular, FIG. 10A shows a window presenting the game play of the player (e.g., character approaching a covered bridge over a river). The game assist feature is available to the user, wherein the player may enter queries through a microphone, as shown by microphone icon. The player is shown triggering the PlayStation Assist application, such as through a trigger word "Hey PlayStation." The query entered relates to information about obtaining directions to a specific location—Bleak Falls Barrow.

Figure 10B:
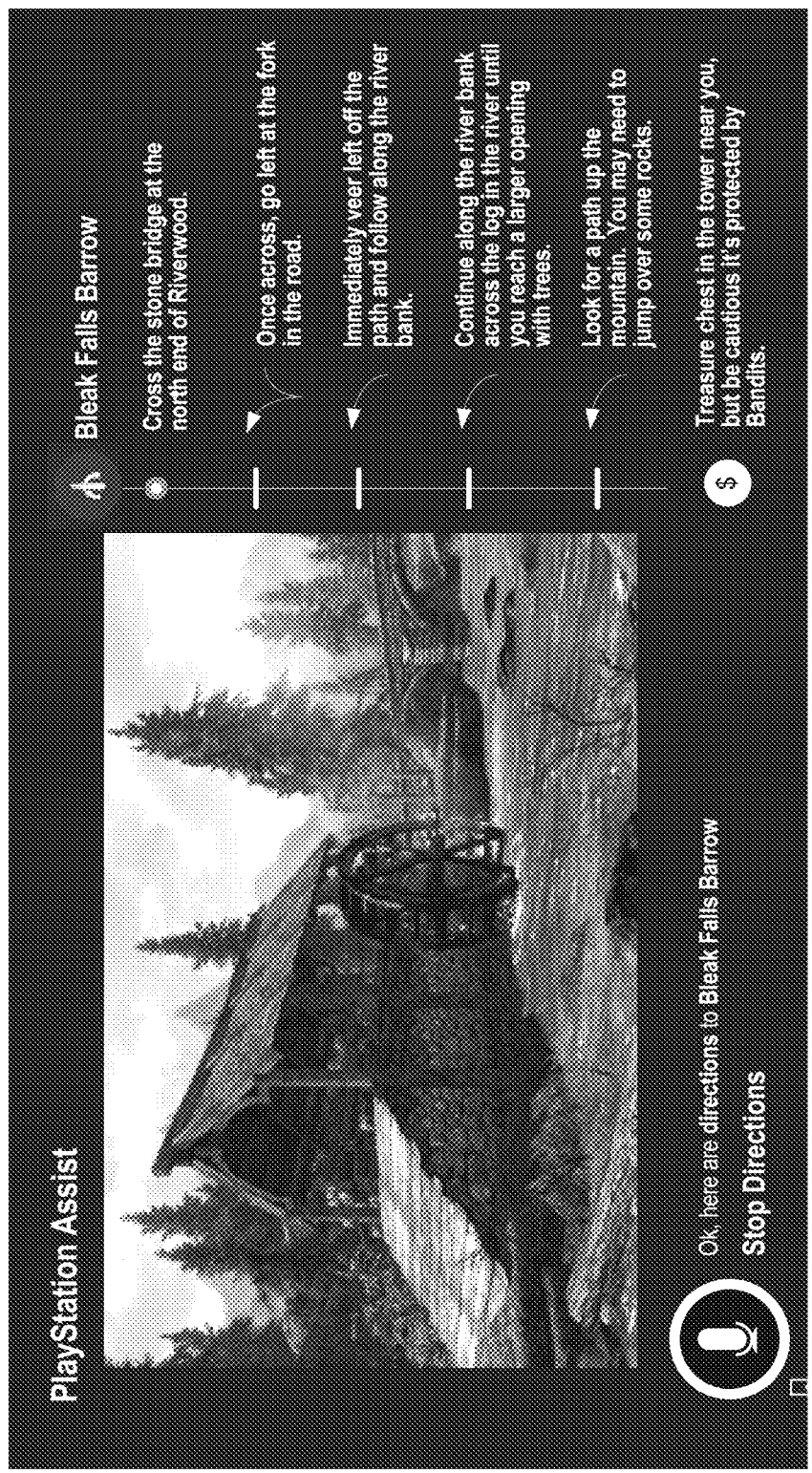
Figure 10B:
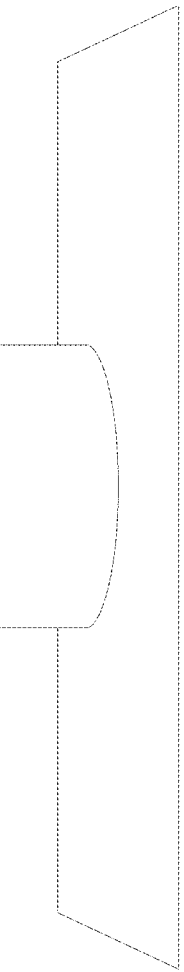

After matching the query to an appropriate response, for example given the context of the gaming application to include global context, gaming context, and current gaming context, the game assist server supporting the PlayStation Assist application may match the query to a response. The response is shown in FIG. 10B, wherein directional information is shown. For example, step-by-step instructions are provided to reach Bleak Falls Barrow from the current location shown in the game play. In addition, information about a nearby treasure chest may also be provided (e.g., in the tower).

Figure 10C:
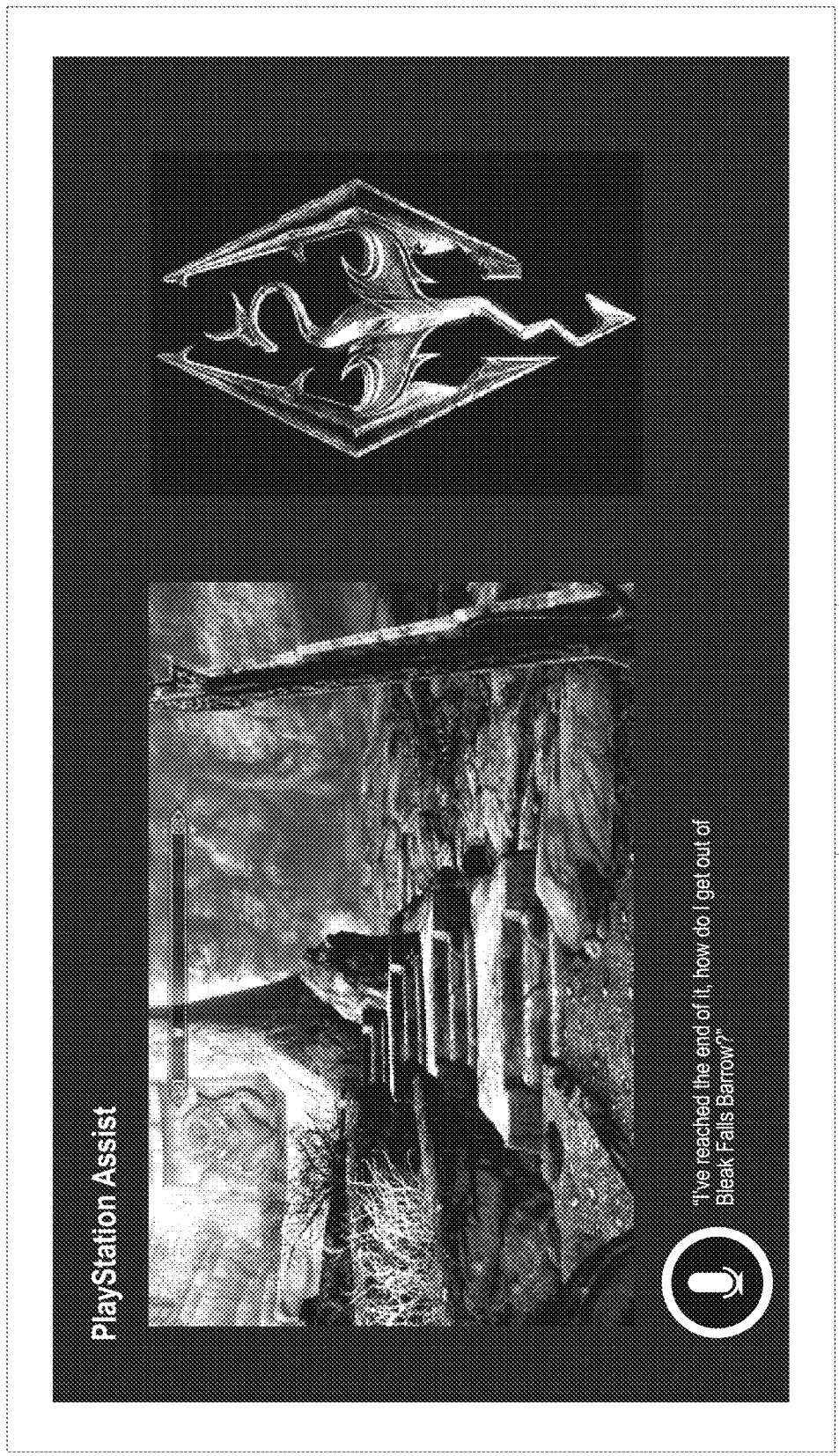
Figure 10C:
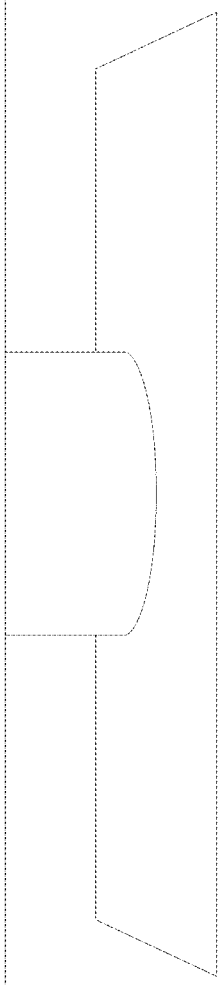
Figure 10D:
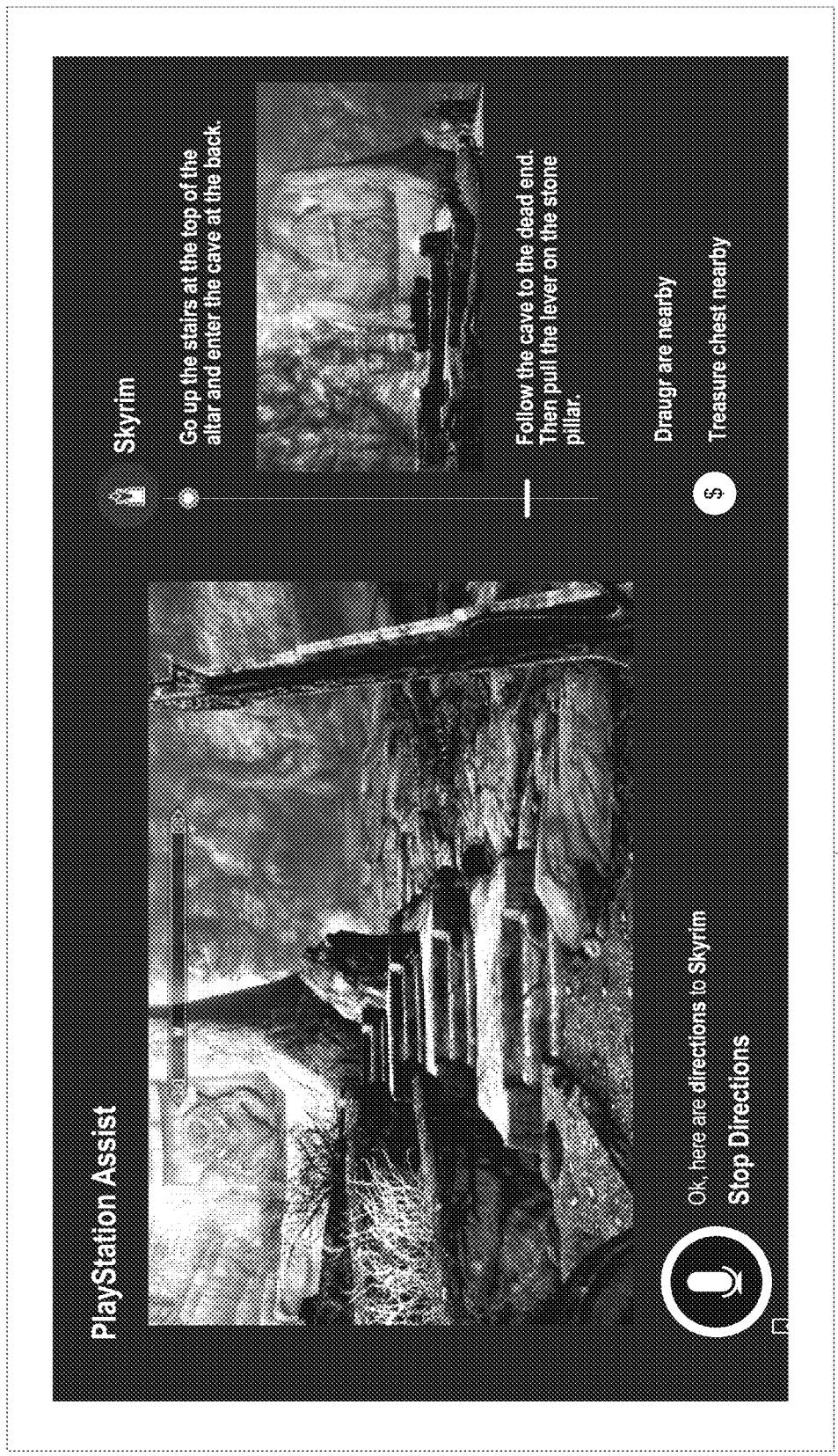

The player may make a follow-on or supplementary request that supplements the initial query. For instance, the player may make a query (e.g., verbal) asking how to exit the Bleak Falls Barrow region. FIG. 10C shows the game assist server supporting the PlayStation Assist application presenting a response to the follow-on query, such as through matching to a modeled response as implemented through deep learning. Information about how to exit is provided in FIG. 10D. Specifically, step-by-step instructions are provided on how to leave Bleak Falls Barrow by going up to a cave and entering by pulling a lever. Additional information is provided, including nearby enemies (e.g., Draugr), and information about nearby treasure. The PlayStation Assist application may have a running dialogue with the player, but indicating that a response is provided. In addition, the player can quit the PlayStation Assist application at any time by verbally instructing to stop.

Figure 11A:
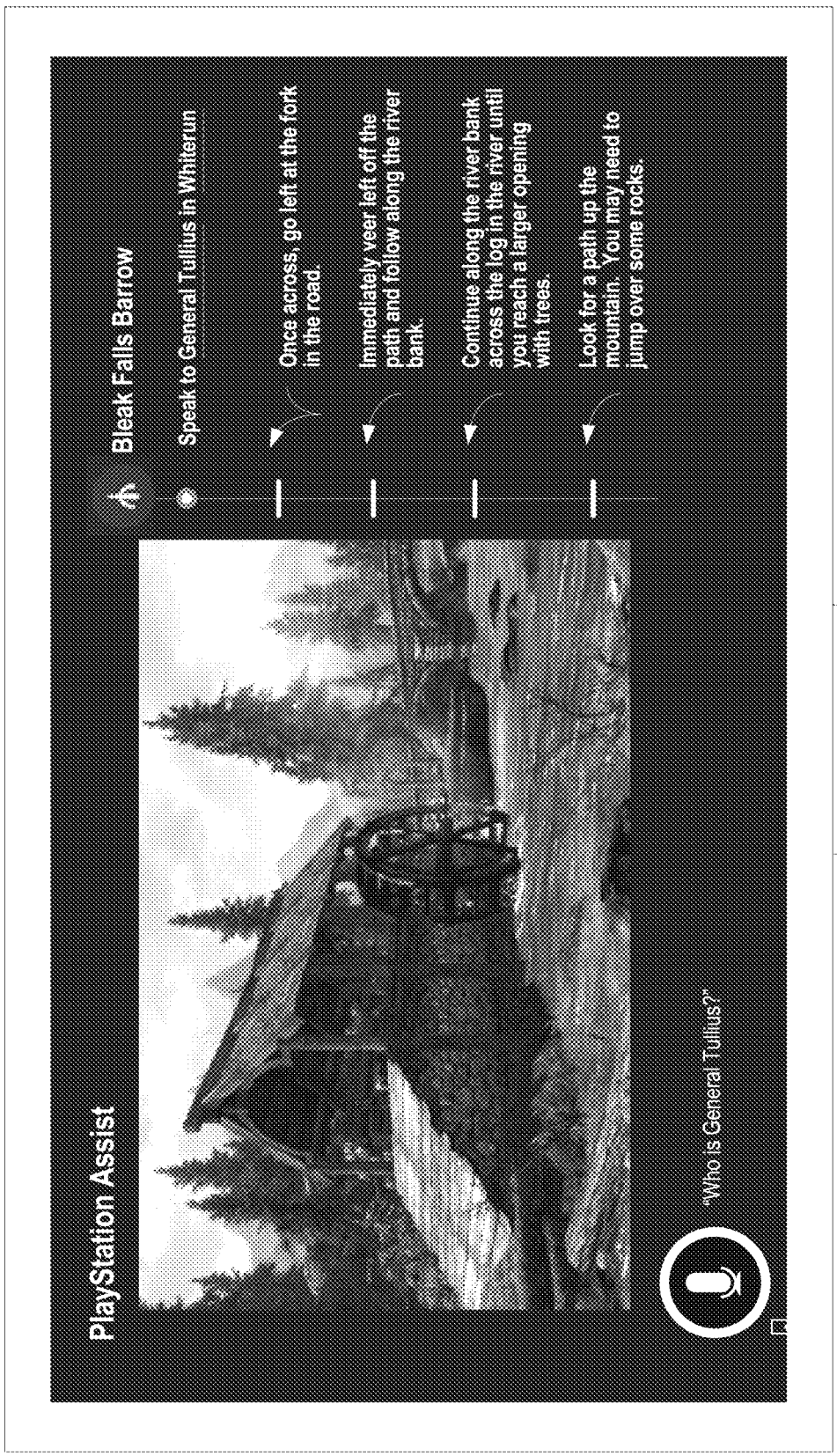
FIGS. 11A-11B illustrate the use of a display presenting a player's game play of a gaming application and the navigation through a series of connected layers of information provided in response to a query having a primary intent and a secondary intent, such as the requirement to accomplish a task (e.g., meet General Tullius), in accordance with one embodiment of the present disclosure.
Figure 11B:
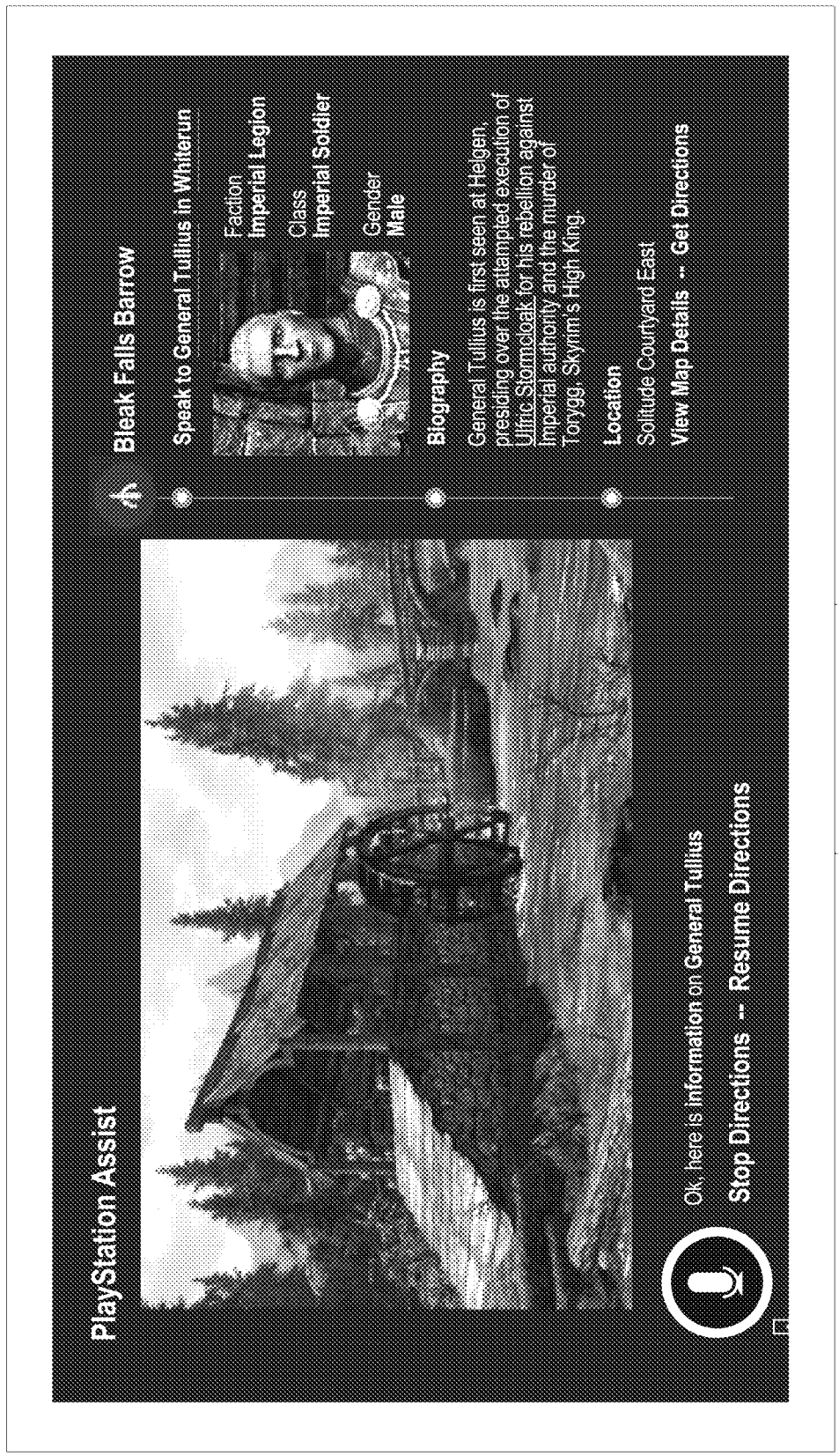
Figure 11B:
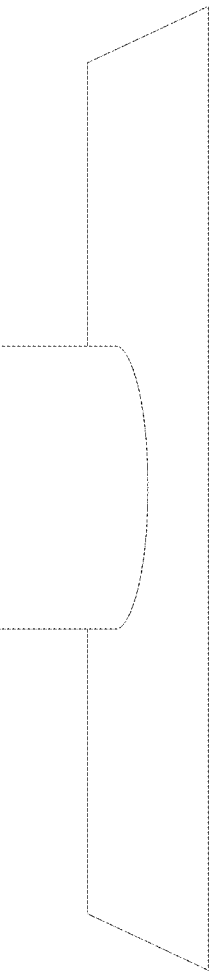

FIGS. 11A-11B illustrate the use of a display presenting a player's game play of a gaming application and the navigation through a series of connected layers of information provided in response to a query having a primary intent and a secondary intent, such as the requirement to accomplish a task (e.g., meet General Tullius in Whiterun), in accordance with one embodiment of the present disclosure. For example, during the search for the Bleak Falls Barrow, the player may also be tasked with a secondary quest. This may be indicated through an icon. For example, one of the steps provided in the directions to Bleak Falls Barrow may require the character to approach General Tullius in the game play. The player may enter a query asking who is General Tullius. The game assist server supporting the PlayStation Assist application may indicate that a response is provided. In addition, the player can exit the directions or resume directions to enter and exit the secondary intent (e.g., meet General Tullius). As shown in FIG. 11B, information about General Tullius is provided to include biographical information, and his current location. Further, the player may request access to a map showing the location of Whiterun, and more specifically the location of General Tullius.

Figure 12A:
FIGS. 12A-12C illustrate the use of a display presenting a player's game play of a gaming application and the navigation through a series of connected layers of information provided in response to a query to learn how to accomplish a task, in accordance with one embodiment of the present disclosure.
Figure 12A:
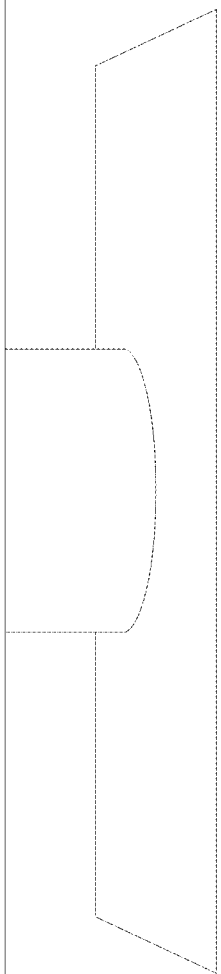
Figure 12B:
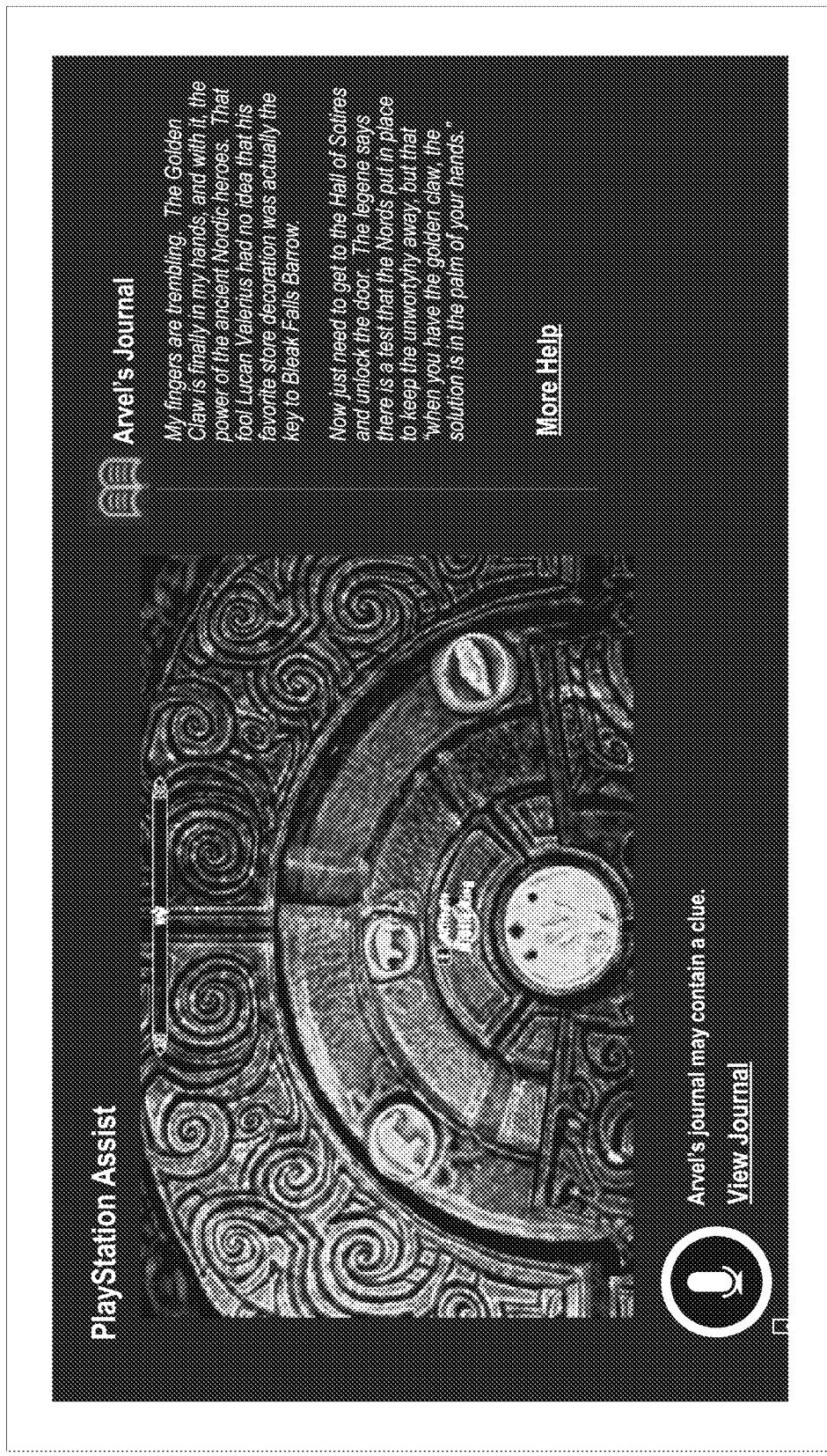
Figure 12B:
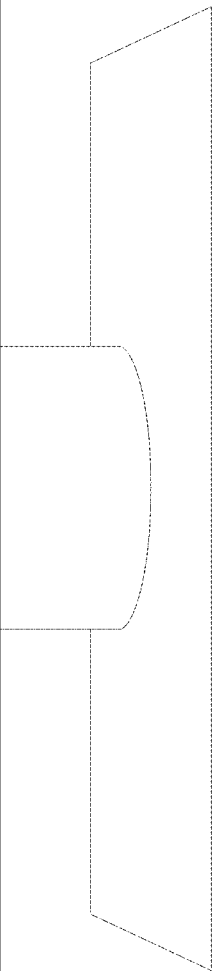
Figure 12C:
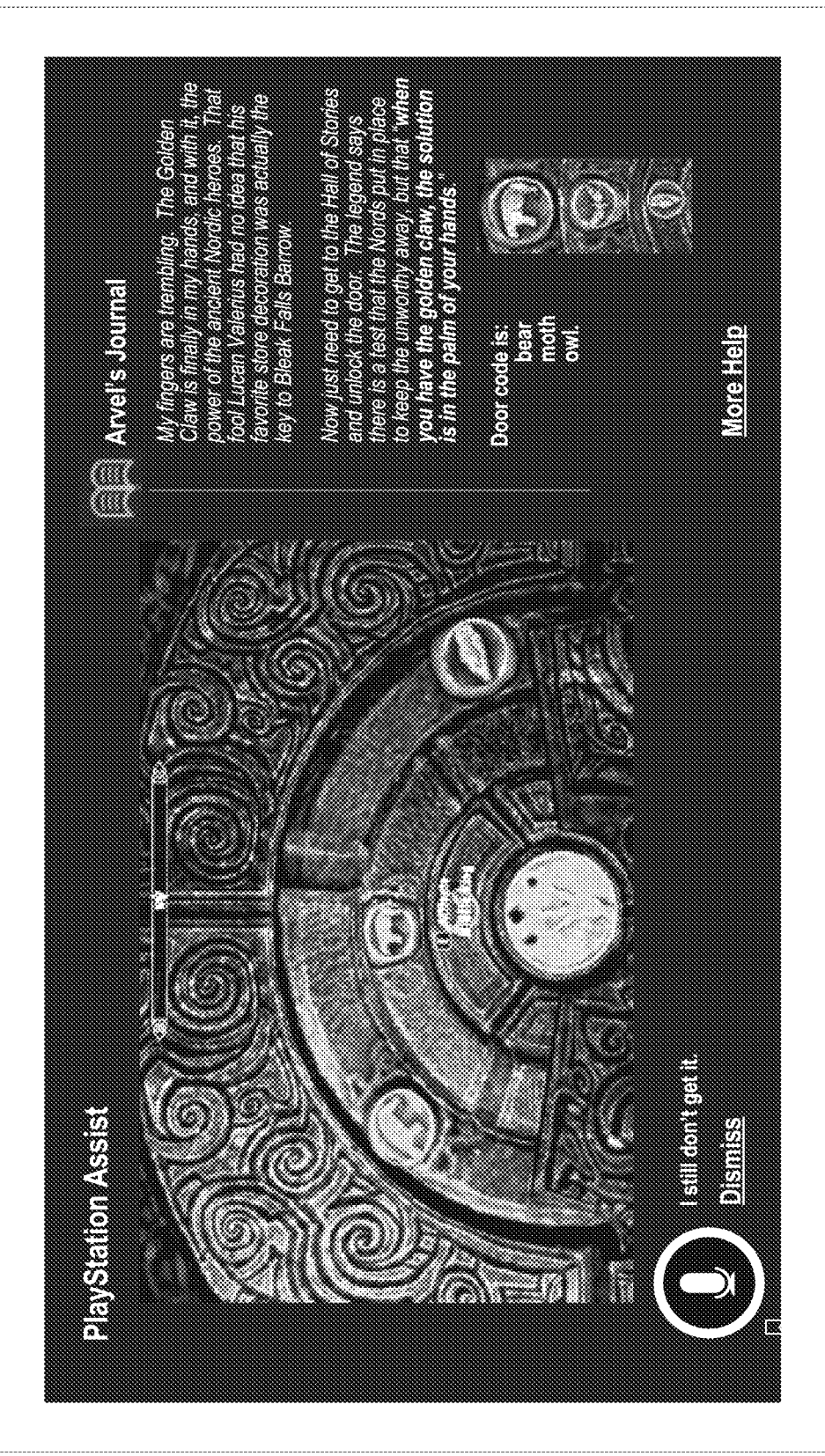
Figure 12C:
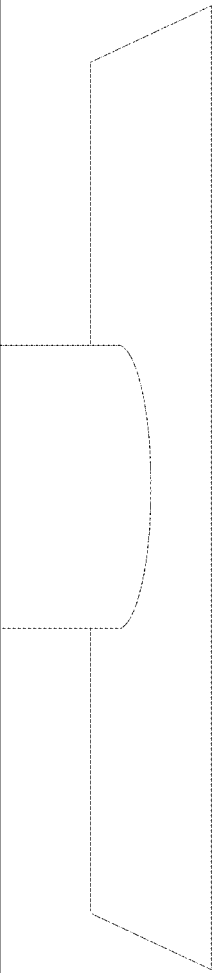

FIGS. 12A-12C illustrate the use of a display presenting a player's game play of a gaming application and the navigation through a series of connected layers of information provided in response to a query to learn how to accomplish a task, in accordance with one embodiment of the present disclosure. In particular, FIGS. 12A-12C show a learn intent process, wherein the player is requesting how to solve a puzzle, for example. The information may be generated and/or matched through a game assist server, such as through the PlayStation Assist application, as previously described. As shown, the player is playing a gaming application, such as Skyrim®. The queries and responses shown in FIGS. 12A-12C relate to the gaming application.

In particular, FIG. 12A shows a window presenting the game play of the player (e.g., character presented with a keystone lock). The game assist feature is available to the user, wherein the player may enter queries through a microphone, as shown by microphone icon. The player is shown triggering the PlayStation Assist application, such as through a trigger word "Hey PlayStation." The query entered relates to information about how to unlock the keystone shown in the game play. After matching the query to an appropriate response, for example given the context of the gaming application to include global context, gaming context, and current gaming context, the game assist server supporting the PlayStation Assist application may match the query to a response. The response is shown in FIG. 12B, wherein information about how to unlock the keystone is shown. For example, the game assist server supporting the PlayStation Assist application may indicate that a response is provided, and provides a shorthand clue—"look in Arvel's journal." A link to Arvel's journal is also provided, and when selected shows the appropriate journal entry.

The player may make a follow-on or supplementary request that supplements the initial query. For instance, the player may make a query (e.g., verbal) asking specifically what is important in Arvel's journal entry. FIG. 12C shows the game assist server supporting the PlayStation Assist application presenting a response to the follow-on query, such as through matching to a modeled response as implemented through deep learning. Information about how the golden claw is the solution is provided. In addition, the door code is also provided (e.g., bear—moth—owl).

Figure 13A:
FIGS. 13A-13B illustrate the use of a display presenting a player's game play of a gaming application and the navigation through a series of connected layers of information provided in response to a query to understand something about the gaming application (e.g., information about an enemy combatant), in accordance with one embodiment of the present disclosure.
Figure 13A:
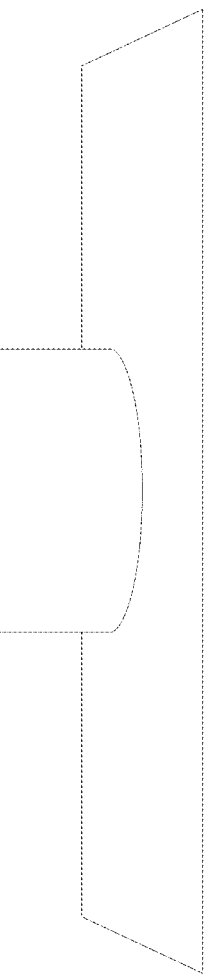
Figure 13B:
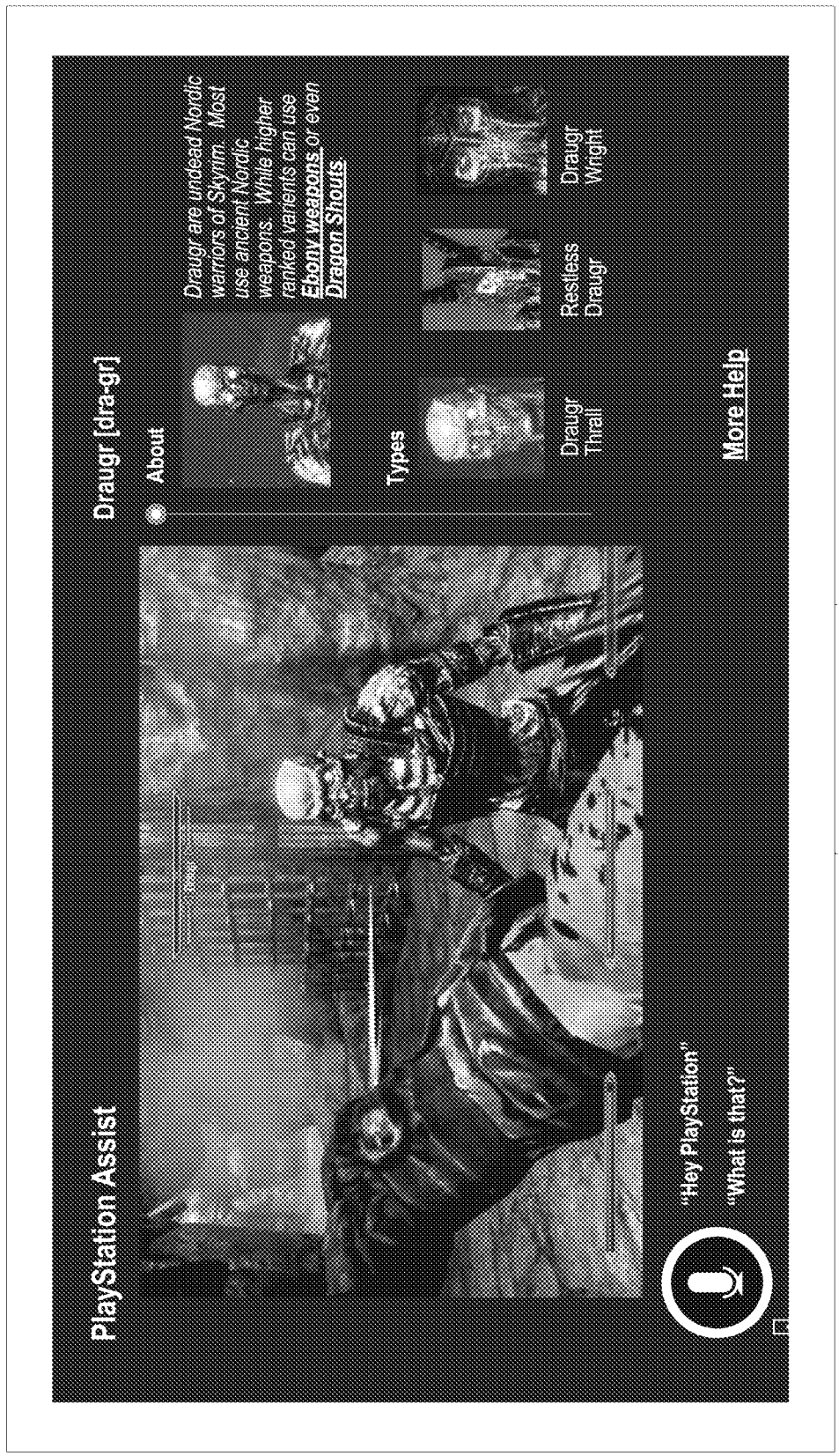

FIGS. 13A-13B illustrate the use of a display presenting a player's game play of a gaming application and the navigation through a series of connected layers of information provided in response to a query to understand something about the gaming application (e.g., information about an enemy combatant), in accordance with one embodiment of the present disclosure. In particular, FIGS. 13A-13B show understand intent process, wherein the player is requesting information about an object, for example. The information may be generated and/or matched through a game assist server, such as through the PlayStation Assist application, as previously described. As shown, the player is playing a gaming application, such as Skyrim®. The queries and responses shown in FIGS. 13A-13B relate to the gaming application.

In particular, FIG. 13A shows a window presenting the game play of the player (e.g., character encountering an unknown creature). The game assist feature is available to the user, wherein the player may enter queries through a microphone, as shown by microphone icon. The player is shown triggering the PlayStation Assist application, such as through a trigger word "Hey PlayStation." The query entered relates to information about information about the unknown object—"what is that!". Urgency is implied as the creature and the character of the player are engaged in battle. After matching the query to an appropriate response, for example given the context of the gaming application to include global context, gaming context, and current gaming context, the game assist server supporting the PlayStation Assist application may match the query to a response. The response is shown in FIG. 13B, wherein information about the creature (e.g., Draugr) is shown. For example, the information includes general information about the creature as well as image of different types of Draugrs, including a Draugr Thrall, a Restless Draugr, etc. Additional information may also be requested.

Figure 14:
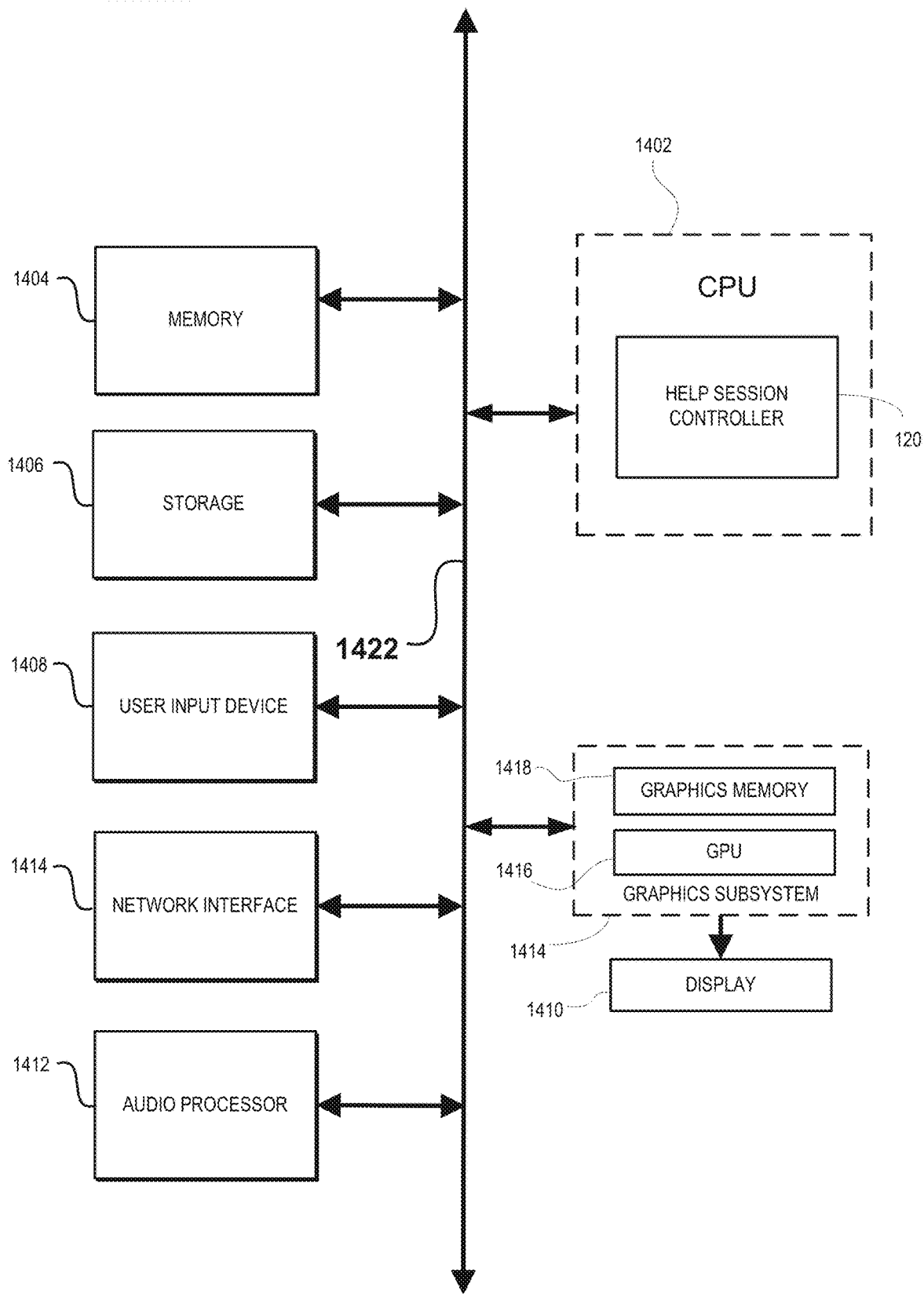
FIG. 14 illustrates components of an example device that can be used to perform aspects of the various embodiments of the present disclosure.
Figure 15:
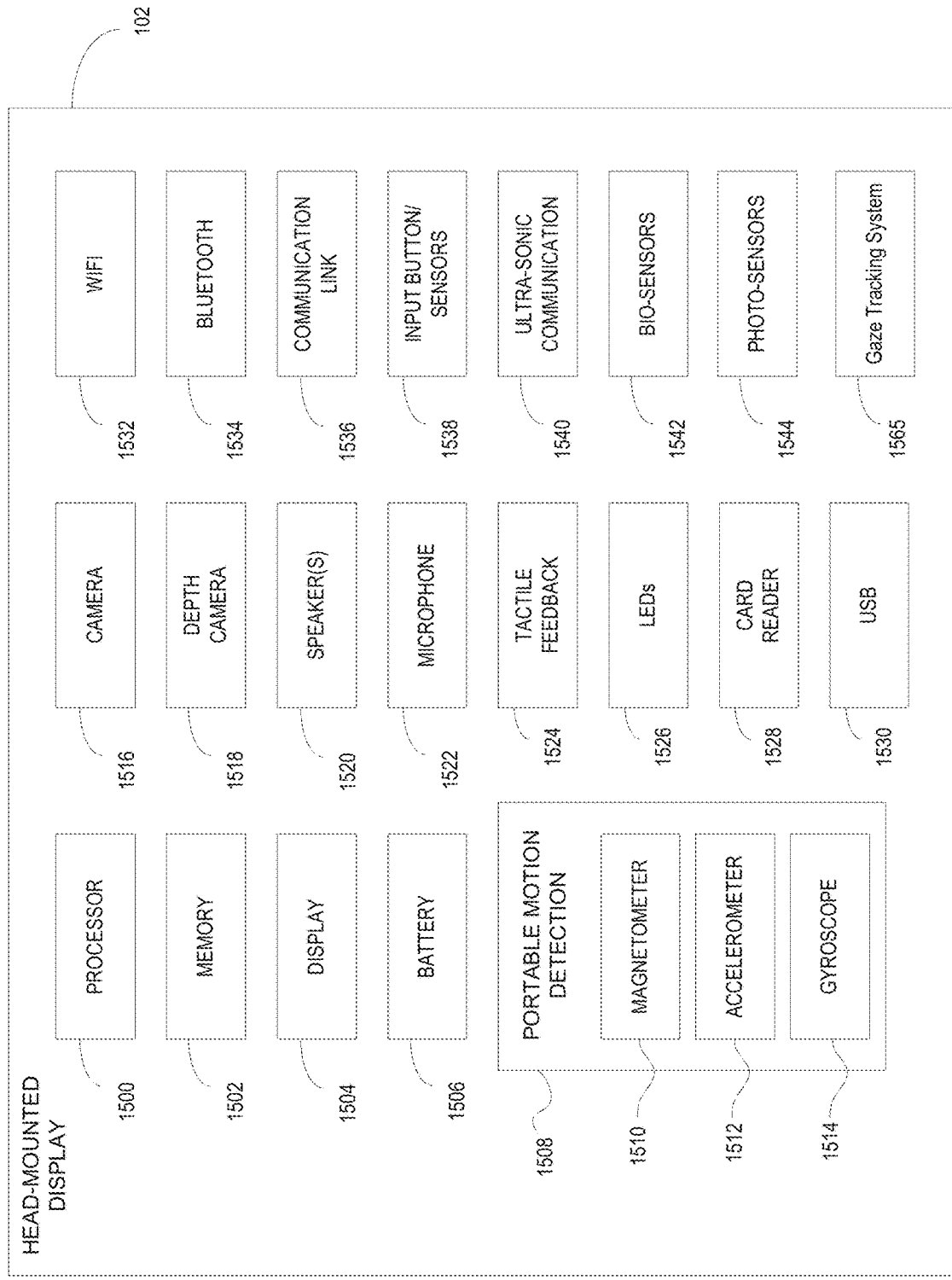
FIG. 15 is a diagram illustrating components of a head-mounted display is shown, in accordance with an embodiment of the disclosure.

FIG. 14 illustrates components of an example device 1400 that can be used to perform aspects of the various embodiments of the present disclosure. For example, FIG. 14 illustrates an exemplary hardware system suitable for implementing a device that provides services in support of a user, such as providing gaming assistance in response to a user's query relating to a gaming application, wherein the query is matched to a modeled response using a deep learning engine, in accordance with one embodiment. This block diagram illustrates a device 1400 that can incorporate or can be a personal computer, video game console, personal digital assistant, or other digital device, suitable for practicing an embodiment of the disclosure. Device 1400 includes a central processing unit (CPU) 1402 for running software applications and optionally an operating system. CPU 1402 may be comprised of one or more homogeneous or heterogeneous processing cores. For example, CPU 1402 is one or more general-purpose microprocessors having one or more processing cores. Further embodiments can be implemented using one or more CPUs with microprocessor architectures specifically adapted for highly parallel and computationally intensive applications, such as media and interactive entertainment applications, or applications configured for providing gaming assistance in response to a user's query relating to a gaming application, as previously described. Device 1400 may be a localized to a player requesting assistance (e.g., game console), or remote from the player (e.g., back-end game assist processor).

Memory 1404 stores applications and data for use by the CPU 1402. Storage 1406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1408 communicate user inputs from one or more users to device 1400, examples of which may include keyboards, mice, joysticks, touch pads, touch screens, still or video recorders/cameras, tracking devices for recognizing gestures, and/or microphones. Network interface 1414 allows device 1400 to communicate with other computer systems via an electronic communications network, and may include wired or wireless communication over local area networks and wide area networks such as the internet. An audio processor 1412 is adapted to generate analog or digital audio output from instructions and/or data provided by the CPU 1402, memory 1404, and/or storage 1406. The components of device 1400, including CPU 1402, memory 1404, data storage 1406, user input devices 1408, network interface 1410, and audio processor 1412 are connected via one or more data buses 1422

A graphics subsystem 1414 is further connected with data bus 1422 and the components of the device 1400. The graphics subsystem 1414 includes a graphics processing unit (GPU) 1416 and graphics memory 1418. Graphics memory 1418 includes a display memory (e.g., a frame buffer) used for storing pixel data for each pixel of an output image. Graphics memory 1418 can be integrated in the same device as GPU 1416, connected as a separate device with GPU 1416, and/or implemented within memory 1404. Pixel data can be provided to graphics memory 1418 directly from the CPU 1402. Alternatively, CPU 1402 provides the GPU 1416 with data and/or instructions defining the desired output images, from which the GPU 1416 generates the pixel data of one or more output images. The data and/or instructions defining the desired output images can be stored in memory 1404 and/or graphics memory 1418. In an embodiment, the GPU 1416 includes 3D rendering capabilities for generating pixel data for output images from instructions and data defining the geometry, lighting, shading, texturing, motion, and/or camera parameters for a scene. The GPU 1416 can further include one or more programmable execution units capable of executing shader programs.

The graphics subsystem 1414 periodically outputs pixel data for an image from graphics memory 1418 to be displayed on display device 1410, or to be projected by projection system 1440. Display device 1410 can be any device capable of displaying visual information in response to a signal from the device 1400, including CRT, LCD, plasma, and OLED displays. Device 1400 can provide the display device 1410 with an analog or digital signal, for example.

While specific embodiments have been provided to demonstrate the providing of real-time assistance during game play of a player playing a gaming application through live help sessions (e.g., connecting player to an expert through a communication session), or through recorded help sessions (e.g., connecting player to a recorded help session transmitted over a communication session), these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the embodiments described herein may be executed on any type of client device. In some embodiments, the client device is a head mounted display (HMD), or projection system. FIG. 9, a diagram illustrating components of a head-mounted display 102 is shown, in accordance with an embodiment of the disclosure. The HMD 102 may be configured to provide and receive gaming assistance in response to a user's query relating to a gaming application, wherein the query is matched to a modeled response using a deep learning engine associated with a back-end game assist server.

The head-mounted display 102 includes a processor 1500 for executing program instructions. A memory 1502 is provided for storage purposes, and may include both volatile and non-volatile memory. A display 1504 is included which provides a visual interface that a user may view. A battery 1506 is provided as a power source for the head-mounted display 102. A motion detection module 1508 may include any of various kinds of motion sensitive hardware, such as a magnetometer 1510, an accelerometer 1512, and a gyroscope 1514.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1512 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1510 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1512 is used together with magnetometer 1510 to obtain the inclination and azimuth of the head-mounted display 102.

A gyroscope is a device for measuring or maintaining orientation, based on the principles of angular momentum. In one embodiment, three gyroscopes 1514 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1516 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1518 may be included in the head-mounted display 102 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 102 includes speakers 1520 for providing audio output. Also, a microphone 1522 may be included for capturing audio from the real environment, including sounds from the ambient environment, speech made by the user, etc. The head-mounted display 102 includes tactile feedback module 1524 for providing tactile feedback to the user. In one embodiment, the tactile feedback module 1524 is capable of causing movement and/or vibration of the head-mounted display 102 so as to provide tactile feedback to the user.

LEDs 1526 are provided as visual indicators of statuses of the head-mounted display 102. For example, an LED may indicate battery level, power on, etc. A card reader 1528 is provided to enable the head-mounted display 102 to read and write information to and from a memory card. A USB interface 1530 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A Wi-Fi module 1532 is included for enabling connection to the Internet via wireless networking technologies. Also, the head-mounted display 102 includes a Bluetooth module 1534 for enabling wireless connection to other devices. A communications link 1536 may also be included for connection to other devices. In one embodiment, the communications link 1536 utilizes infrared transmission for wireless communication. In other embodiments, the communications link 1536 may utilize any of various wireless or wired transmission protocols for communication with other devices.

Input buttons/sensors 1538 are included to provide an input interface for the user. Any of various kinds of input interfaces may be included, such as buttons, touchpad, joystick, trackball, etc. An ultra-sonic communication module 1540 may be included in head-mounted display 102 for facilitating communication with other devices via ultrasonic technologies.

Bio-sensors 1542 are included to enable detection of physiological data from a user. In one embodiment, the bio-sensors 1542 include one or more dry electrodes for detecting bio-electric signals of the user through the user's skin.

Photo-sensors 1544 are included to respond to signals from emitters (e.g., infrared base stations) placed in a 3-dimensional physical environment. The gaming console analyzes the information from the photo-sensors 1544 and emitters to determine position and orientation information related to the head-mounted display 102.

In addition, gaze tracking system 1565 is included and configured to enable tracking of the gaze of the user. For example, system 1565 may include gaze tracking cameras which captures images of the user's eyes, which are then analyzed to determine the gaze direction of the user. In one embodiment, information about the gaze direction of the user can be utilized to affect the video rendering. Video rendering in the direction of gaze can be prioritized or emphasized, such as by providing greater detail, higher resolution through foveated rendering, higher resolution of a particle system effect displayed in the foveal region, lower resolution of a particle system effect displayed outside the foveal region, or faster updates in the region where the user is looking.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

It will be appreciated by those skilled in the art that in various embodiments of the disclosure, the aforementioned head mounted device may be utilized in conjunction with an interactive application displayed on a display to provide various interactive functions. The exemplary embodiments described herein are provided by way of example only, and not by way of limitation.

Figure 16:
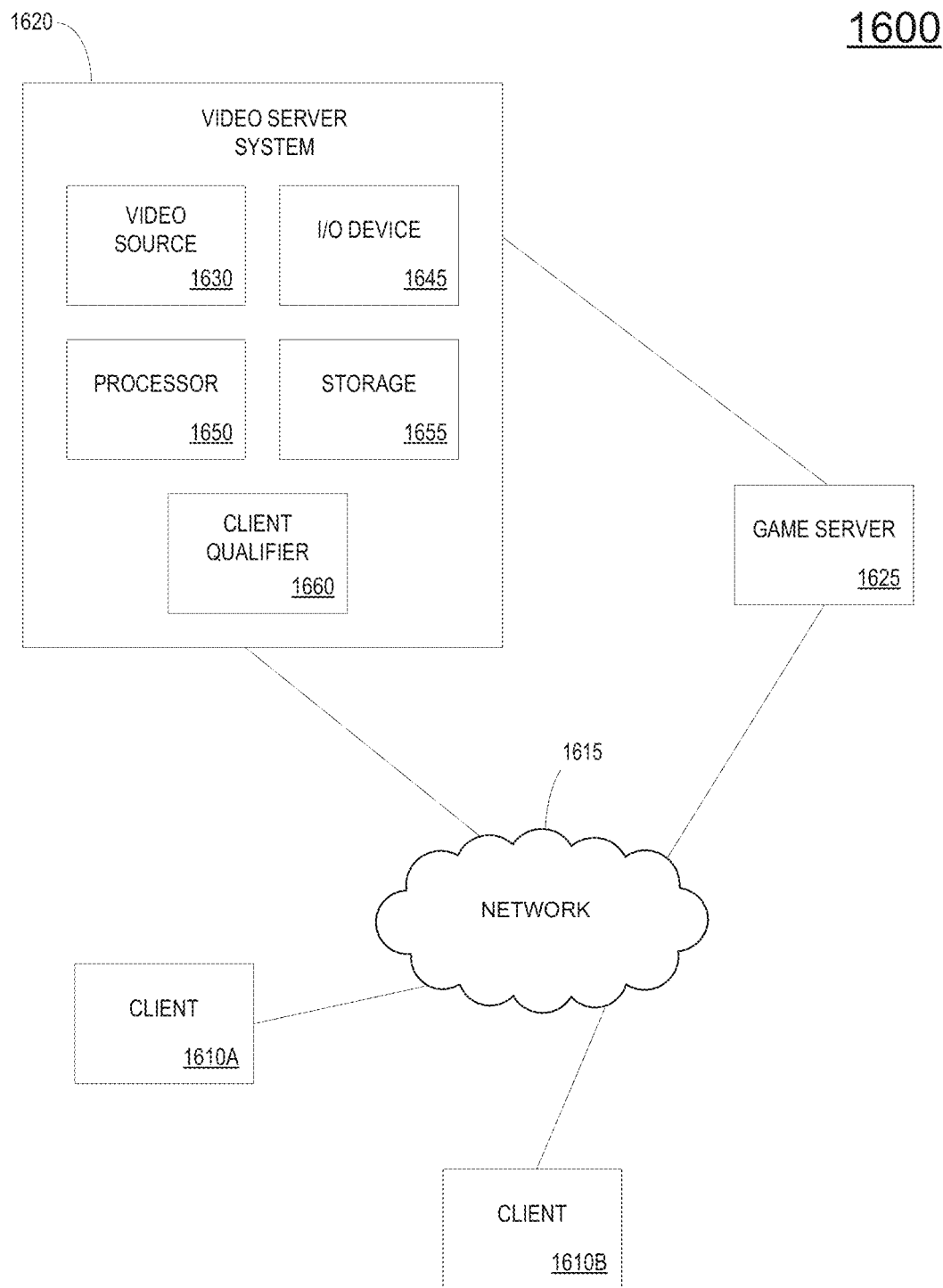
FIG. 16 is a block diagram of a Game System, according to various embodiments of the disclosure.

FIG. 16 is a block diagram of a Game System 1600, according to various embodiments of the disclosure. Game System 1600 is configured to provide a video stream to one or more Clients 1610 via a Network 1615, such as in a single-player mode or multi-player mode. Game System 1600 typically includes a Video Server System 1620 and an optional game server 1625. Video Server System 1620 is configured to provide the video stream to the one or more Clients 1610 with a minimal quality of service. For example, Video Server System 1620 may receive a game command that changes the state of or a point of view within a video game, and provide Clients 1610 with an updated video stream reflecting this change in state with minimal lag time. The Video Server System 1620 may be configured to provide the video stream in a wide variety of alternative video formats, including formats yet to be defined. Further, the video stream may include video frames configured for presentation to a user at a wide variety of frame rates. Typical frame rates are 30 frames per second, 80 frames per second, and 820 frames per second. Although higher or lower frame rates are included in alternative embodiments of the disclosure.

Clients 1610, referred to herein individually as 1610A, 1610B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1610 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1610 or on a separate device such as a monitor or television. Clients 1610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1610 are optionally geographically dispersed. The number of clients included in Game System 1600 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1620 to deliver a game viewed through the HMD. In one embodiment, the game console receives the video stream from the video server system 1620, and the game console forwards the video stream, or updates to the video stream, to the HMD for rendering.

Clients 1610 are configured to receive video streams via Network 1615. Network 1615 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1610 may, but are not required to, further include systems configured for modifying received video. For example, a client may be configured to perform further rendering, to overlay one video image on another video image, to crop a video image, and/or the like. For example, Clients 1610 may be configured to receive various types of video frames, such as I-frames, P-frames and B-frames, and to process these frames into images for display to a user. In some embodiments, a member of Clients 1610 is configured to perform further rendering, shading, conversion to 3-D, or like operations on the video stream. A member of Clients 1610 is optionally configured to receive more than one audio or video stream. Input devices of Clients 1610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1610 is generated and provided by Video Server System 1620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1610 are typically configured to receive inputs from a user. These inputs may include game commands configured to change the state of the video game or otherwise affect gameplay. The game commands can be received using input devices and/or may be automatically generated by computing instructions executing on Clients 1610. The received game commands are communicated from Clients 1610 via Network 1615 to Video Server System 1620 and/or Game Server 1625. For example, in some embodiments, the game commands are communicated to Game Server 1625 via Video Server System 1620. In some embodiments, separate copies of the game commands are communicated from Clients 1610 to Game Server 1625 and Video Server System 1620. The communication of game commands is optionally dependent on the identity of the command Game commands are optionally communicated from Client 1610A through a different route or communication channel that that used to provide audio or video streams to Client 1610A.

Game Server 1625 is optionally operated by a different entity than Video Server System 1620. For example, Game Server 1625 may be operated by the publisher of a multi-player game. In this example, Video Server System 1620 is optionally viewed as a client by Game Server 1625 and optionally configured to appear from the point of view of Game Server 1625 to be a prior art client executing a prior art game engine. Communication between Video Server System 1620 and Game Server 1625 optionally occurs via Network 1615. As such, Game Server 1625 can be a prior art multiplayer game server that sends game state information to multiple clients, one of which is game server system 1620. Video Server System 1620 may be configured to communicate with multiple instances of Game Server 1625 at the same time. For example, Video Server System 1620 can be configured to provide a plurality of different video games to different users. Each of these different video games may be supported by a different Game Server 1625 and/or published by different entities. In some embodiments, several geographically distributed instances of Video Server System 1620 are configured to provide game video to a plurality of different users. Each of these instances of Video Server System 1620 may be in communication with the same instance of Game Server 1625. Communication between Video Server System 1620 and one or more Game Server 1625 optionally occurs via a dedicated communication channel For example, Video Server System 1620 may be connected to Game Server 1625 via a high bandwidth channel that is dedicated to communication between these two systems.

Video Server System 1620 comprises at least a Video Source 1630, an I/O Device 1645, a Processor 1650, and non-transitory Storage 1655. Video Server System 1620 may include one computing device or be distributed among a plurality of computing devices. These computing devices are optionally connected via a communications system such as a local area network.

Video Source 1630 is configured to provide a video stream, e.g., streaming video or a series of video frames that form a moving picture. In some embodiments, Video Source 1630 includes a video game engine and rendering logic. The video game engine is configured to receive game commands from a player and to maintain a copy of the state of the video game based on the received commands This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1625. Game Server 1625 may maintain a copy of the state of the game based on game commands received from multiple players using geographically disperse clients. In these cases, the game state is provided by Game Server 1625 to Video Source 1630, wherein a copy of the game state is stored and rendering is performed. Game Server 1625 may receive game commands directly from Clients 1610 via Network 1615, and/or may receive game commands via Video Server System 1620.

Video Source 1630 typically includes rendering logic, e.g., hardware, firmware, and/or software stored on a computer readable medium such as Storage 1655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1610. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1630 includes a video recording device such as a camera. This camera may be used to generate delayed or live video that can be included in the video stream of a computer game. The resulting video stream optionally includes both rendered images and images recorded using a still or video camera. Video Source 1630 may also include storage devices configured to store previously recorded video to be included in a video stream. Video Source 1630 may also include motion or positioning sensing devices configured to detect motion or position of an object, e.g., person, and logic configured to determine a game state or produce video-based on the detected motion and/or position.

Video Source 1630 is optionally configured to provide overlays configured to be placed on other video. For example, these overlays may include a command interface, log in instructions, messages to a game player, images of other game players, video feeds of other game players (e.g., webcam video). In embodiments of Client 1610A including a touch screen interface or a gaze detection interface, the overlay may include a virtual keyboard, joystick, touch pad, and/or the like. In one example of an overlay a player's voice is overlaid on an audio stream. Video Source 1630 optionally further includes one or more audio sources.

In embodiments wherein Video Server System 1620 is configured to maintain the game state based on input from more than one player, each player may have a different point of view comprising a position and direction of view. Video Source 1630 is optionally configured to provide a separate video stream for each player based on their point of view. Further, Video Source 1630 may be configured to provide a different frame size, frame data size, and/or encoding to each of Client 1610. Video Source 1630 is optionally configured to provide 3-D video.

I/O Device 1645 is configured for Video Server System 1620 to send and/or receive information such as video, commands, requests for information, a game state, gaze information, device motion, device location, user motion, client identities, player identities, game commands, security information, audio, and/or the like. I/O Device 1645 typically includes communication hardware such as a network card or modem. I/O Device 1645 is configured to communicate with Game Server 1625, Network 1615, and/or Clients 1610.

Processor 1650 is configured to execute logic, e.g. software, included within the various components of Video Server System 1620 discussed herein. For example, Processor 1650 may be programmed with software instructions in order to perform the functions of Video Source 1630, Game Server 1625, and/or a Client Qualifier 1660. Video Server System 1620 optionally includes more than one instance of Processor 1650. Processor 1650 may also be programmed with software instructions in order to execute commands received by Video Server System 1620, or to coordinate the operation of the various elements of Game System 1600 discussed herein. Processor 1650 may include one or more hardware device. Processor 1650 is an electronic processor.

Storage 1655 includes non-transitory analog and/or digital storage devices. For example, Storage 1655 may include an analog storage device configured to store video frames. Storage 1655 may include a computer readable digital storage, e.g., a hard drive, an optical drive, or solid state storage. Storage 1655 is configured (e.g., by way of an appropriate data structure or file system) to store video frames, artificial frames, a video stream including both video frames and artificial frames, audio frame, an audio stream, and/or the like. Storage 1655 is optionally distributed among a plurality of devices. In some embodiments, Storage 1655 is configured to store the software components of Video Source 1630 discussed elsewhere herein. These components may be stored in a format ready to be provisioned when needed.

Video Server System 1620 optionally further comprises Client Qualifier 1660. Client Qualifier 1660 is configured for remotely determining the capabilities of a client, such as Clients 1610A or 1610B. These capabilities can include both the capabilities of Client 1610A itself as well as the capabilities of one or more communication channels between Client 1610A and Video Server System 1620. For example, Client Qualifier 1660 may be configured to test a communication channel through Network 1615.

Client Qualifier 1660 can determine (e.g., discover) the capabilities of Client 1610A manually or automatically. Manual determination includes communicating with a user of Client 1610A and asking the user to provide capabilities. For example, in some embodiments, Client Qualifier 1660 is configured to display images, text, and/or the like within a browser of Client 1610A. In one embodiment, Client 1610A is an HMD that includes a browser. In another embodiment, client 1610A is a game console having a browser, which may be displayed on the HMD. The displayed objects request that the user enter information such as operating system, processor, video decoder type, type of network connection, display resolution, etc., of Client 1610A. The information entered by the user is communicated back to Client Qualifier 1660.

Automatic determination may occur, for example, by execution of an agent on Client 1610A and/or by sending test video to Client 1610A. The agent may comprise computing instructions, such as java script, embedded in a web page or installed as an add-on. The agent is optionally provided by Client Qualifier 1660. In various embodiments, the agent can find out processing power of Client 1610A, decoding and display capabilities of Client 1610A, lag time reliability and bandwidth of communication channels between Client 1610A and Video Server System 1620, a display type of Client 1610A, firewalls present on Client 1610A, hardware of Client 1610A, software executing on Client 1610A, registry entries within Client 1610A, and/or the like.

Client Qualifier 1660 includes hardware, firmware, and/or software stored on a computer readable medium. Client Qualifier 1660 is optionally disposed on a computing device separate from one or more other elements of Video Server System 1620. For example, in some embodiments, Client Qualifier 1660 is configured to determine the characteristics of communication channels between Clients 1610 and more than one instance of Video Server System 1620. In these embodiments the information discovered by Client Qualifier can be used to determine which instance of Video Server System 1620 is best suited for delivery of streaming video to one of Clients 1610.

While specific embodiments have been provided to demonstrate the predicting and updating of targeted landing points on a display such that movement of the eye(s) of a user coincides with the presentation of a foveal region on the display at the updated targeted landing point, these are described by way of example and not by way of limitation. Those skilled in the art having read the present disclosure will realize additional embodiments falling within the spirit and scope of the present disclosure.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for providing gaming assistance, comprising:
    receiving over a network at a back-end server information related to a plurality of game plays of players for a gaming application;
    determining a plurality of game contexts of the plurality of game plays of the players based on the information related to the plurality of game plays of the players;
    training a machine learning engine to generate a plurality of modeled responses based on the information related to the plurality of game plays of the players, the plurality of game contexts, and a plurality of queries for the plurality of game plays of the players originating from the players;
    receiving a query from a first player playing the gaming application, the query related to a first game play of the first player;
    receiving information related to the first game play of the first player;
    determining a current game context of the first game play based on the information related to the first game play of the first player and the information related to the plurality of game plays of the players;
    matching for the first game play a modeled response from the plurality of modeled responses to the query and the current game context using the machine learning engine based on the information related to the plurality of game plays of the players and the information related to the first game play of the first player used to match one or more game contexts of the plurality of game plays of the players to the current game context of the first player, wherein each of the one or more game contexts of the plurality of game plays of the players that are matched to the current game context have a corresponding matching vector with a corresponding matching value that indicates similarity between a corresponding game context and the current game context, the corresponding matching value exceeding a threshold; and
    sending the modeled response to a device of the first player.

2. The method of claim 1, wherein the matching for the first game play the modeled response includes:
    interpreting the query; and
    providing as input the query that is interpreted and the current game context for the gaming application into the machine learning engine configured to match the query that is interpreted and the current game context to the modeled response, the modeled response being one of the plurality of modeled responses for the gaming application.

3. The method of claim 2, further comprising:
    sending the query and the current game context to a third party artificial intelligence engine configured for interpreting the query and matching the query that is interpreted and current game context to the modeled response.

4. The method of claim 2, further comprising:
    translating the query from a first format to a second format, wherein the first format is audio and the second format is text.

5. The method of claim 1, wherein the query is presented in a format including at least one of audio, text, and video.

6. The method of claim 1, wherein the modeled response is presented in a format including at least one of audio, text, and video.

7. The method of claim 1 wherein the device comprises a companion mobile device, wherein the first game play is presented on a display.

8. The method of claim 1, wherein the device comprises a display configured for presenting the first game play and the modeled response.

9. The method of claim 1, further comprising:
    assigning to the first player an expert for obtaining assistance; and
    generating a communication session between the device of the first player and a device of the expert to enable the expert to render the assistance to the first player.

10. The method of claim 1, wherein the information related to the first game play of the first player includes game context data and global context data.

11. The method of claim 10, wherein the game context data includes game state data and operating system (OS) level data.

12. The method of claim 11, wherein the game state data includes at least one of the following:
    character;
    character race or type;
    current quest for a first character in the first game play;
    next quest for the first character in the first game play;
    location of the first game play in a gaming environment;
    level of game playing the gaming environment;
    assets;
    loadout; and
    skill set of the first character.

13. The method of claim 11, wherein the OS level data includes at least one of the following:
    gaming input;
    controller input;
    timestamps of controller input.

14. The method of claim 10, wherein the global context data includes at least one of the following:
    player profile data;
    playing style of the first player;
    skill level of the first player;
    whether or not the first player is currently playing the gaming application;
    whether or not the first player is online;
    the title of the gaming application;
    co-players the first player is playing with;
    frequency of input controller actuation; and
    friends of the first player.

15. A non-transitory computer-readable medium storing a computer program for providing gaming assistance, the computer-readable medium comprising:
    program instructions for receiving over a network at a back-end server information related to a plurality of game plays of players for a gaming application;

program instructions for determining a plurality of game contexts of the plurality of game plays of the players based on the information related to the plurality of game plays of the players;

program instructions for training a machine learning engine to generate a plurality of modeled responses based on the information related to the plurality of game plays of the players, the plurality of game contexts, and a plurality of queries for the plurality of game plays of the players originating from the players;

program instructions for receiving a query from a first player playing the gaming application, the query related to a first game play of the first player;

program instructions for receiving information related to the first game play of the first player;

program instructions for determining a current game context of the first game play based on the information related to the first game play of the first player and the information related to the plurality of game plays of the players;

program instructions for matching for the first game play a modeled response from the plurality of modeled responses to the query and the current game context using the machine learning engine based on the information related to the plurality of game plays of the players and the information related to the first game play of the first player used to match one or more game contexts of the plurality of game plays of the players to the current game context of the first player, wherein each of the one or more game contexts of the plurality of game plays of the players that are matched to the current game context have a corresponding matching vector with a corresponding matching value that indicates similarity between a corresponding game context and the current game context, the corresponding matching value exceeding a threshold; and program instructions for sending the modeled response to a device of the first player.

16. The computer-readable medium of claim 15, wherein the program instructions for matching for the first game play the modeled response includes:

program instructions for interpreting the query; and program instructions for providing as input the query that is interpreted and the current game context for the gaming application into the machine learning engine configured to match the query that is interpreted and the current game context to the modeled response, the modeled response being one of the plurality of modeled responses for the gaming application.

17. The computer-readable medium of claim 16, further comprising:

program instructions for sending the query and the current game context to a third party artificial intelligence engine configured for interpreting the query and matching the query that is interpreted and current game context to the modeled response.

18. The computer-readable medium of claim 16, further comprising:

program instructions for translating the query from a first format to a second format, wherein the first format is audio and the second format is text.

19. A computer system comprising:

a processor; and memory coupled to the processor and having stored therein instructions that, if executed by the computer system, cause the computer system to execute a method for providing gaming assistance comprising:

receiving over a network at a back-end server information related to a plurality of game plays of players for a gaming application;

determining a plurality of game contexts of the plurality of game plays of the players based on the information related to the plurality of game plays of the players;

training a machine learning engine to generate a plurality of modeled responses based on the information related to the plurality of game plays of the players, the plurality of game contexts, and a plurality of queries for the plurality of game plays of the players originating from the players;

receiving a query from a first player playing the gaming application, the query related to a first game play of the first player;

receiving information related to the first game play of the first player;

determining a current game context of the first game play based on the information related to the first game play of the first player and the information related to the plurality of game plays of the players;

matching for the first game play a modeled response from the plurality of modeled responses to the query and the current game context using the machine learning engine based on the information related to the plurality of game plays of the players and the information related to the first game play of the first player used to match one or more game contexts of the plurality of game plays of the players to the current game context of the first player, wherein each of the one or more game contexts of the plurality of game plays of the players that are matched to the current game context have a corresponding matching vector with a corresponding matching value that indicates similarity between a corresponding game context and the current game context, the corresponding matching value exceeding a threshold; and sending the modeled response to a device of the first player.

20. The computer system of claim 19, wherein the matching for the first game play the modeled response in the method includes:

interpreting the query; and providing as input the query that is interpreted and the current game context for the gaming application into the deep learning engine configured to match the query that is interpreted and the current game context to the modeled response, the modeled response being one of the plurality of modeled responses for the gaming application.

21. The computer system of claim 20, the method further comprising:

sending the query and the current game context to a third party artificial intelligence engine configured for interpreting the query and matching the query that is interpreted and current game context to the modeled response.

22. The computer system of claim 20, the method further comprising:

translating the query from a first format to a second format, wherein the first format is audio and the second format is text.

* * * * *